United States Patent
Nakashima

(10) Patent No.: US 8,988,735 B2
(45) Date of Patent: Mar. 24, 2015

(54) IMAGE PROCESSING APPARATUS, METHOD, AND COMPUTER-READABLE STORAGE MEDIUM TO ELIMINATE UNEVENNESS DUE TO MISREGISTRATION CORRECTION BY ADJUSTING MIXTURE STATUS

(71) Applicant: Canon Kabushiki Kaisha, Tokyo (JP)

(72) Inventor: Satoshi Nakashima, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 13/854,846

(22) Filed: Apr. 1, 2013

(65) Prior Publication Data

US 2013/0265615 A1 Oct. 10, 2013

(30) Foreign Application Priority Data

Apr. 6, 2012 (JP) ................... 2012-087930

(51) Int. Cl.
| | | |
|---|---|---|
| *H04N 1/407* | (2006.01) | |
| *H04N 1/58* | (2006.01) | |
| *H04N 1/50* | (2006.01) | |
| G06K 9/00 | (2006.01) | |
| G03G 15/01 | (2006.01) | |

(52) U.S. Cl.
CPC ............. *H04N 1/58* (2013.01); *H04N 1/506* (2013.01); *G03G 15/011* (2013.01); *G03G 2215/0129* (2013.01)
USPC .......... 358/3.27; 358/3.26; 358/1.9; 382/165; 399/301

(58) Field of Classification Search
None
See application file for complete search history.

(56) References Cited

U.S. PATENT DOCUMENTS

| | | |
|---|---|---|
| 5,121,446 A | 6/1992 | Yamada et al. |
| 6,731,817 B2 | 5/2004 | Shibaki et al. |
| 7,097,270 B2 | 8/2006 | Yamazaki |
| 7,106,476 B1 | 9/2006 | Tonami et al. |
| 7,224,488 B2 | 5/2007 | Inoue |
| 7,256,910 B2 * | 8/2007 | Lee ................................ 358/1.9 |
| 7,426,352 B2 | 9/2008 | Moriyama et al. |
| 7,636,179 B2 | 12/2009 | Takahashi et al. |

(Continued)

FOREIGN PATENT DOCUMENTS

| | | |
|---|---|---|
| JP | 8-251430 A | 9/1996 |
| JP | 2003-241131 A | 8/2003 |

(Continued)

OTHER PUBLICATIONS

U.S. Appl. No. 13/851,445, filed Mar. 27, 2013.

*Primary Examiner* — Steven Kau
(74) *Attorney, Agent, or Firm* — Fitzpatrick, Cella, Harper & Scinto

(57) ABSTRACT

An image processing apparatus of one aspect of this invention detects a specific pattern corresponding to a fine pattern in the input image data, and detects pixels corresponding to the specific pattern. Furthermore, the image processing apparatus specifies a pixel, which corresponds to the detected specific pattern, and a degree of juxtaposition color mixture of which does not exhibit a value within a predetermined appropriate range, and executes, for the input image data, image processing (blur processing) for adjusting the degree of juxtaposition color mixture, which represents a color mixture state when dots of respective colors formed using pixel values of respective colors included in the input image data are superposed on each other, of the specified pixel to fall within the predetermined appropriate range.

18 Claims, 60 Drawing Sheets

(56) References Cited

U.S. PATENT DOCUMENTS

| | | |
|---|---|---|
| 7,760,400 B2 | 7/2010 | Ishii et al. |
| 8,130,410 B2 | 3/2012 | Gotoh |
| 8,208,175 B2 | 6/2012 | Xu et al. |
| 8,587,836 B2 | 11/2013 | Araki et al. |
| 8,610,962 B2 | 12/2013 | Fischer et al. |
| 8,625,150 B2 * | 1/2014 | Kondo ............................ 358/1.5 |
| 8,641,164 B2 * | 2/2014 | Kondo et al. .................... 347/19 |
| 8,705,124 B2 * | 4/2014 | Hirano ............................ 358/1.9 |
| 2007/0237531 A1 | 10/2007 | Maebashi |
| 2011/0216379 A1 | 9/2011 | Arakawa |

FOREIGN PATENT DOCUMENTS

| | | |
|---|---|---|
| JP | 2004-170755 A | 6/2004 |
| JP | 2007-279429 A | 10/2007 |
| JP | 2007-316154 A | 12/2007 |
| JP | 2009-056647 A | 3/2009 |
| JP | 2009-294381 A | 12/2009 |
| JP | 2011-180446 A | 9/2011 |

* cited by examiner

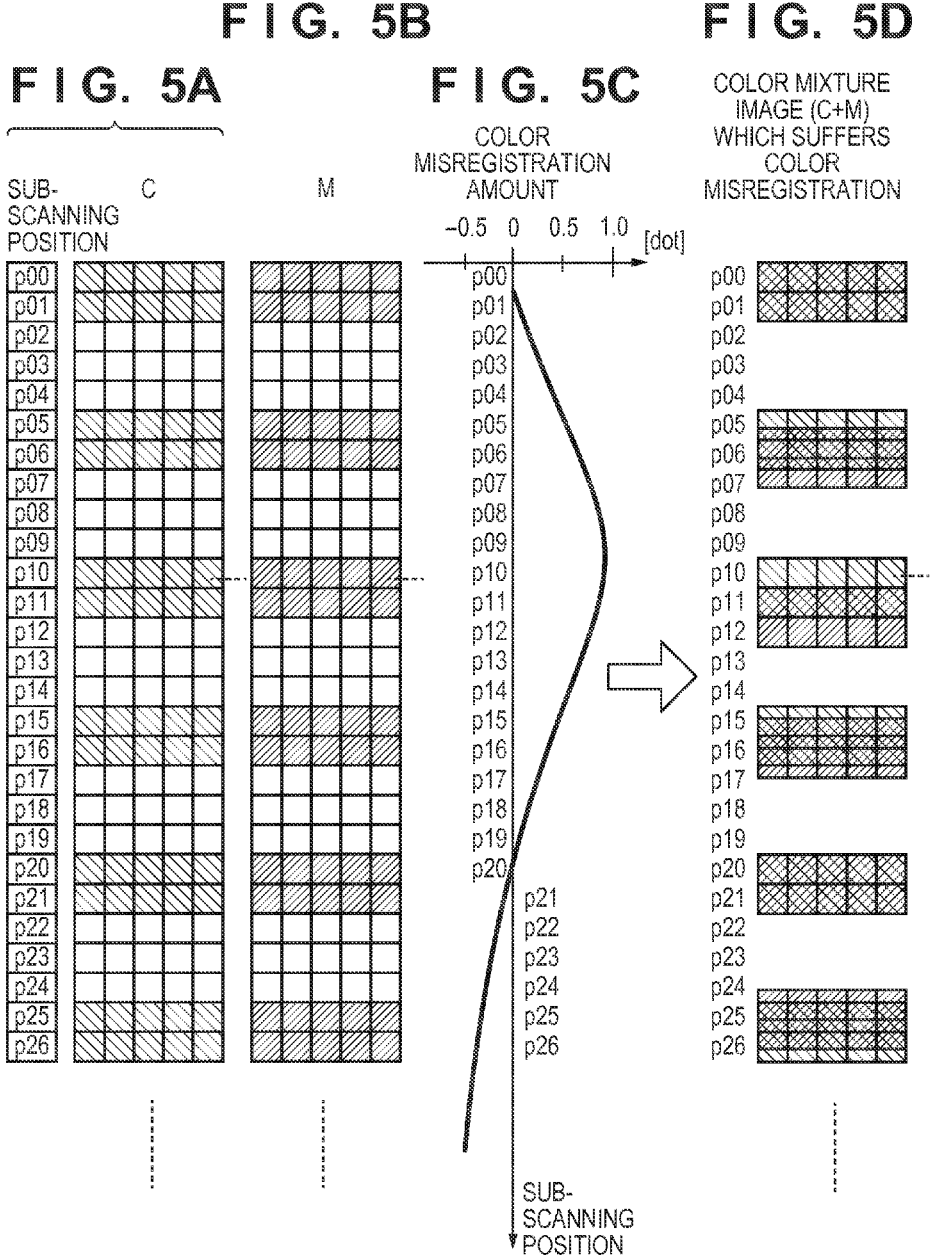

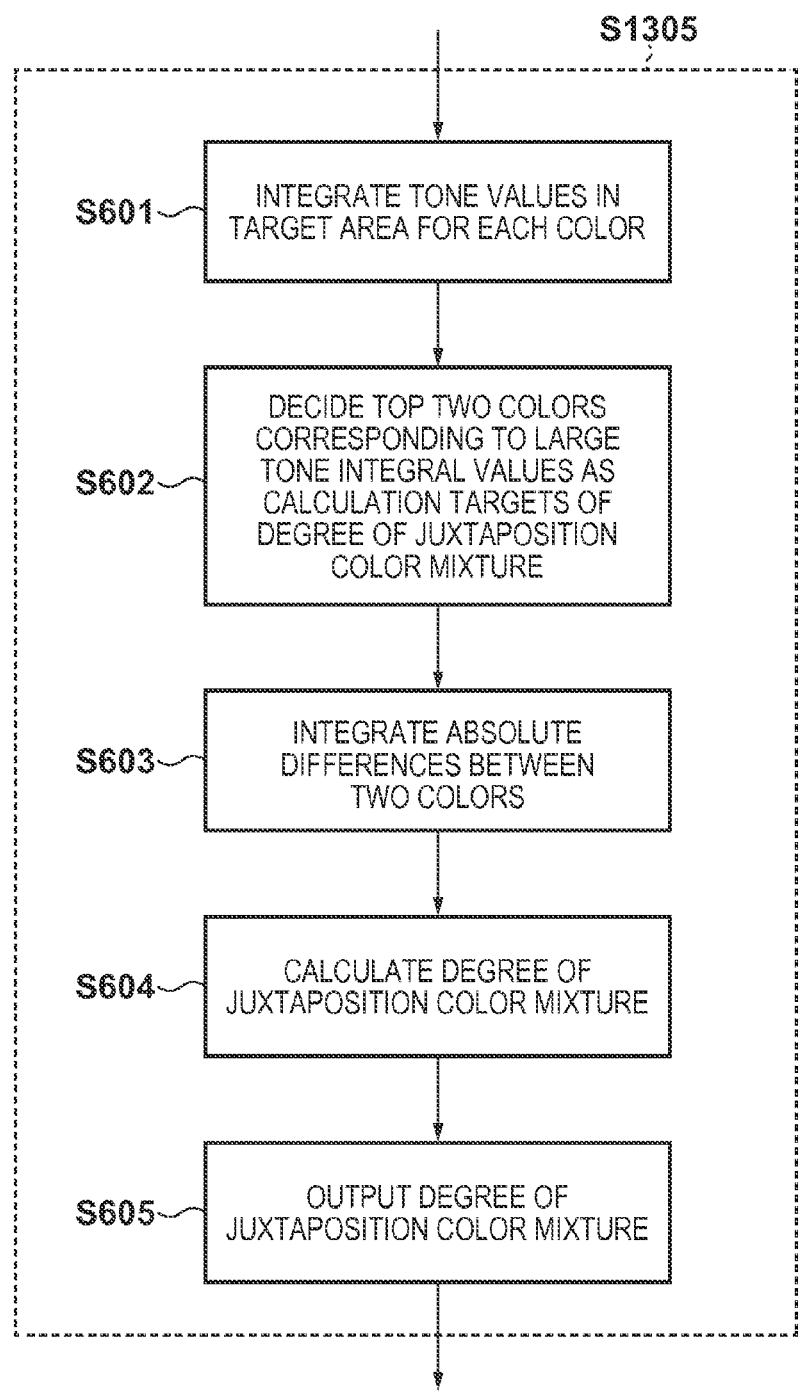

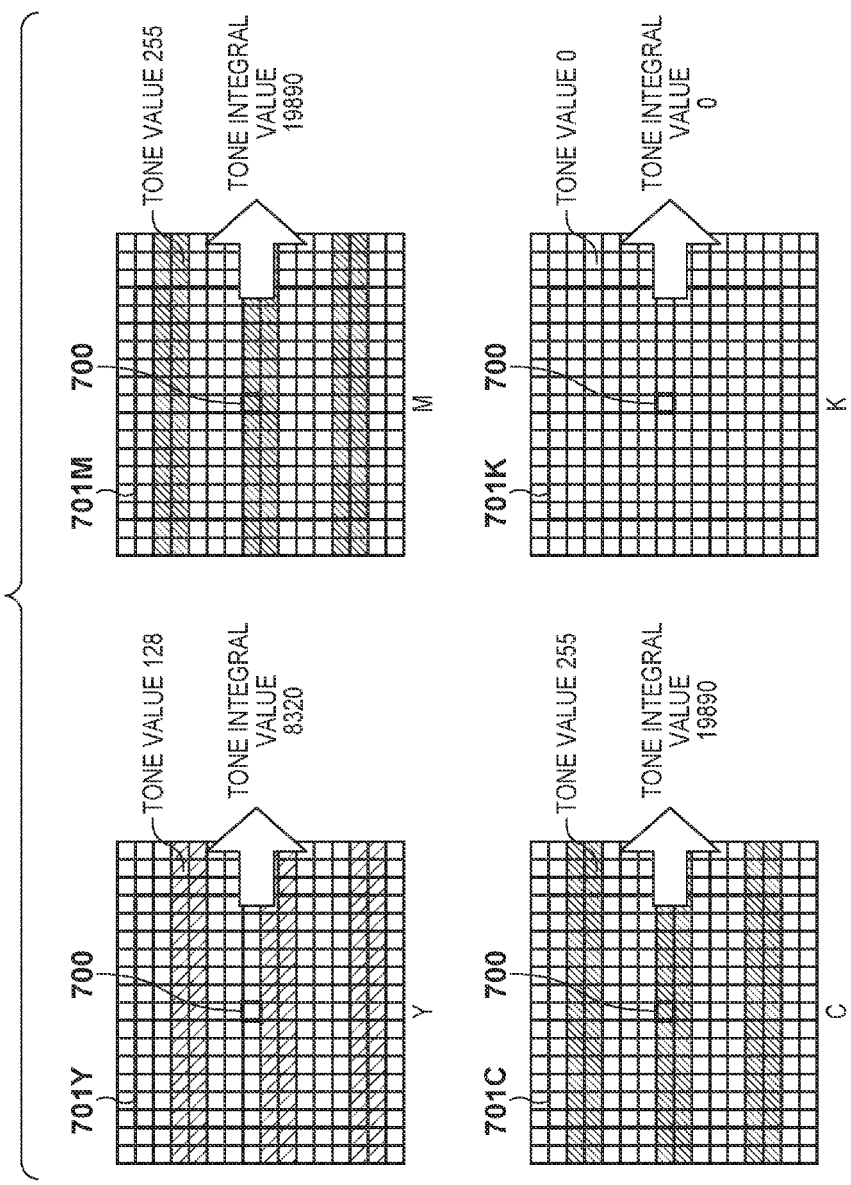

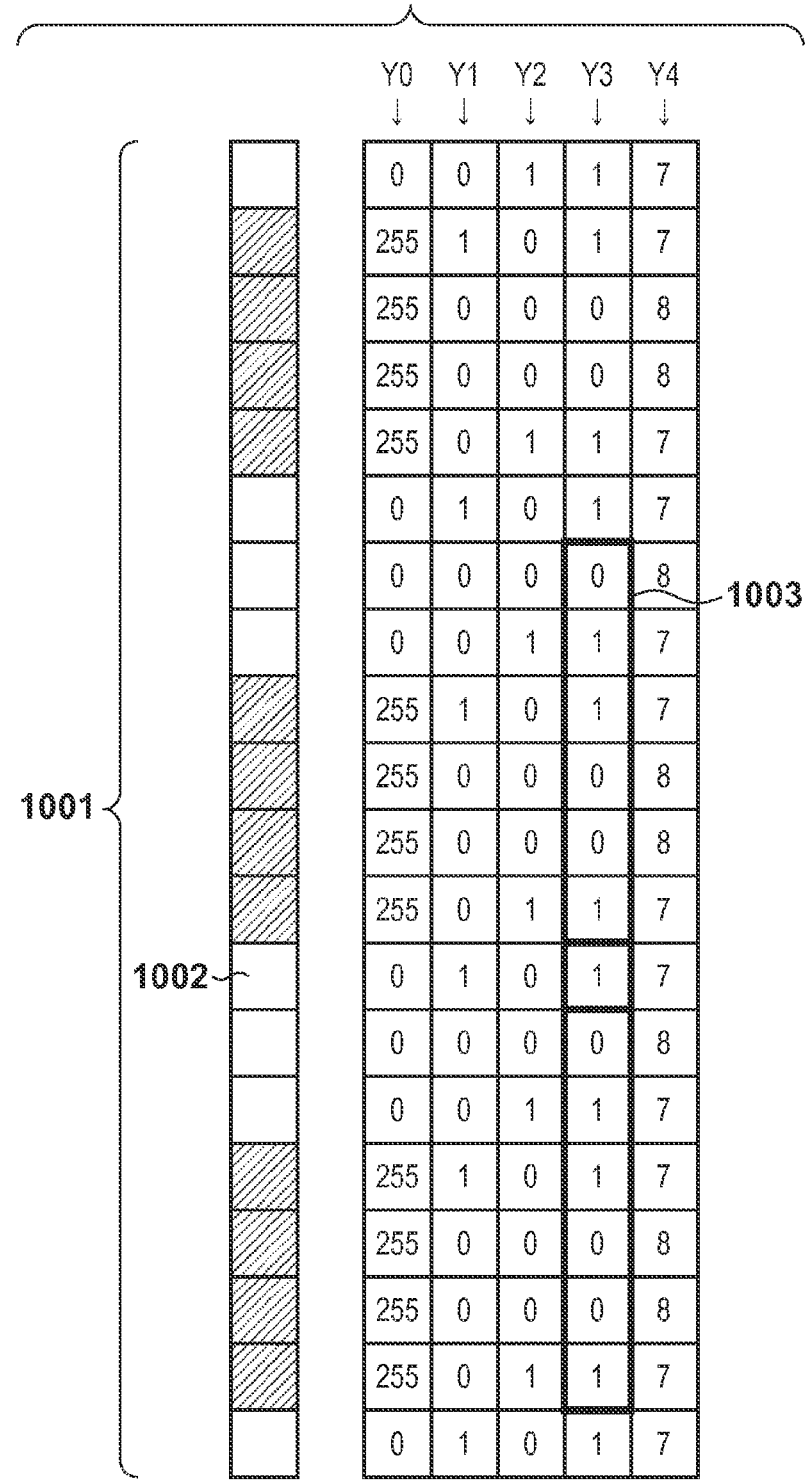

FIG. 11

| | Y0 | Y1 | Y2 | Y3 | Y4 |
|---|---|---|---|---|---|
| | 0 | 0 | 0 | 0 | 0 |
| | 0 | 0 | 0 | 0 | 1 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 3 |
| | 0 | 0 | 0 | 0 | 4 |
| | 0 | 0 | 1 | 1 | 4 |
| | 255 | 1 | 0 | 1 | 4 |
| | 255 | 0 | 0 | 0 | 4 |
| | 255 | 0 | 0 | 0 | 4 |
| | 255 | 0 | 1 | 1 | 4 |
| | 0 | 1 | 0 | 1 | 4 |
| | 0 | 0 | 0 | 0 | 4 |
| | 0 | 0 | 0 | 0 | 3 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 1 |
| | 0 | 0 | 0 | 0 | 0 |

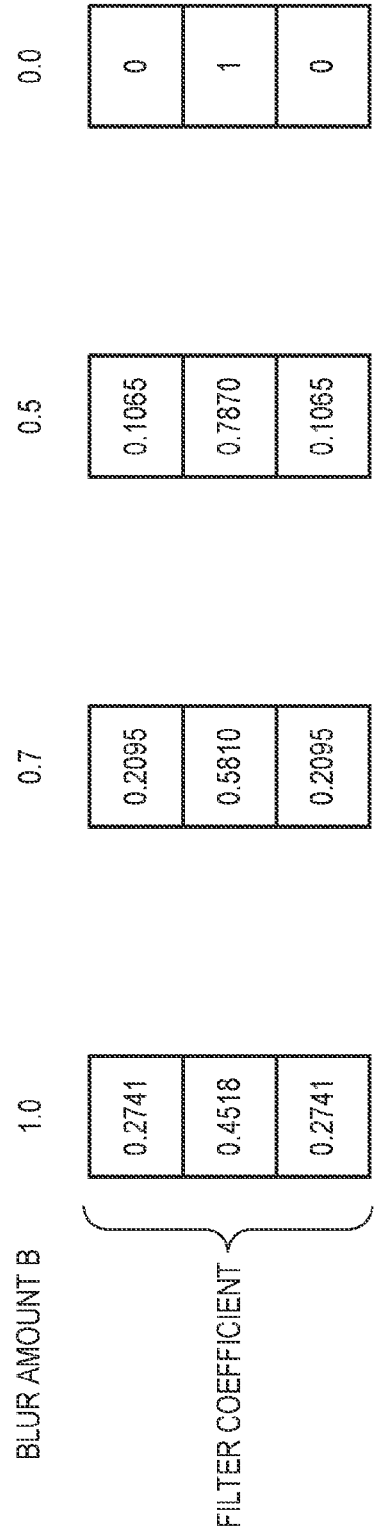

FIG.16A-1 FIG.16A-2 FIG.16A-3 FIG.16A-4 FIG.16A-5

BEFORE BLUR PROCESSING:

| 0 | 0 | 255 | 255 | 0 | 0 | 0 | 255 | 255 | 0 |
|---|---|---|---|---|---|---|---|---|---|
| 0 | 0 | 255 | 255 | 0 | 0 | 0 | 255 | 255 | 0 |
| 0 | 0 | 255 | 255 | 0 | 0 | 0 | 255 | 255 | 0 |

AFTER BLUR PROCESSING:

FIG.16A-2:

| 0 | 70 | 185 | 185 | 70 | 0 | 70 | 185 | 185 | 70 |
|---|---|---|---|---|---|---|---|---|---|
| 0 | 70 | 185 | 185 | 70 | 0 | 70 | 185 | 185 | 70 |
| 0 | 70 | 185 | 185 | 70 | 0 | 70 | 185 | 185 | 70 |

FIG.16A-3:

| 0 | 53 | 202 | 202 | 53 | 0 | 53 | 202 | 202 | 53 |
|---|---|---|---|---|---|---|---|---|---|
| 0 | 53 | 202 | 202 | 53 | 0 | 53 | 202 | 202 | 53 |
| 0 | 53 | 202 | 202 | 53 | 0 | 53 | 202 | 202 | 53 |

FIG.16A-4:

| 0 | 27 | 228 | 228 | 27 | 0 | 27 | 228 | 228 | 27 |
|---|---|---|---|---|---|---|---|---|---|
| 0 | 27 | 228 | 228 | 27 | 0 | 27 | 228 | 228 | 27 |
| 0 | 27 | 228 | 228 | 27 | 0 | 27 | 228 | 228 | 27 |

FIG.16A-5:

| 0 | 0 | 255 | 255 | 0 | 0 | 0 | 255 | 255 | 0 |
|---|---|---|---|---|---|---|---|---|---|
| 0 | 0 | 255 | 255 | 0 | 0 | 0 | 255 | 255 | 0 |
| 0 | 0 | 255 | 255 | 0 | 0 | 0 | 255 | 255 | 0 |

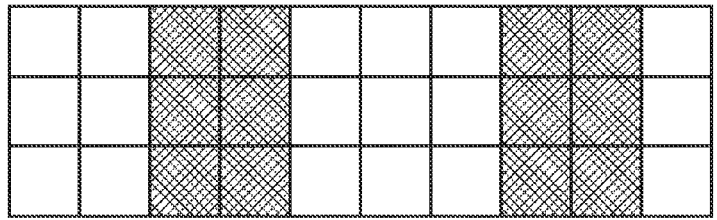
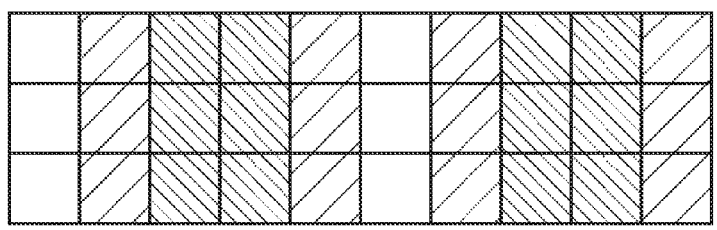
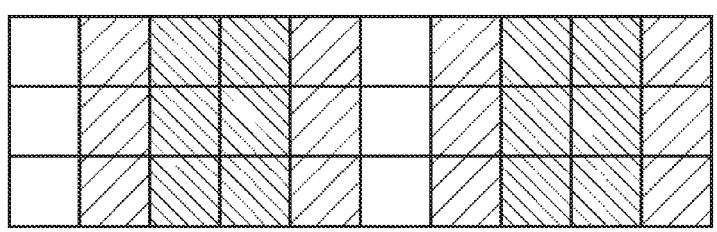
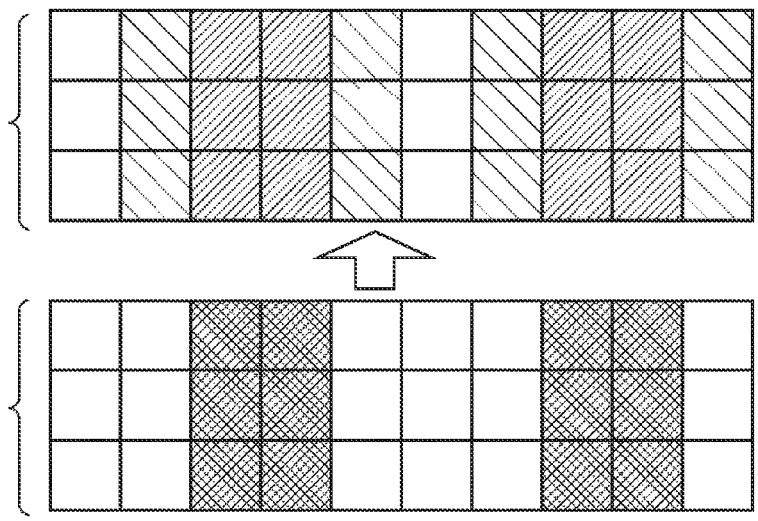
FIG.16B-1 FIG.16B-2 FIG.16B-3 FIG.16B-4 FIG.16B-5

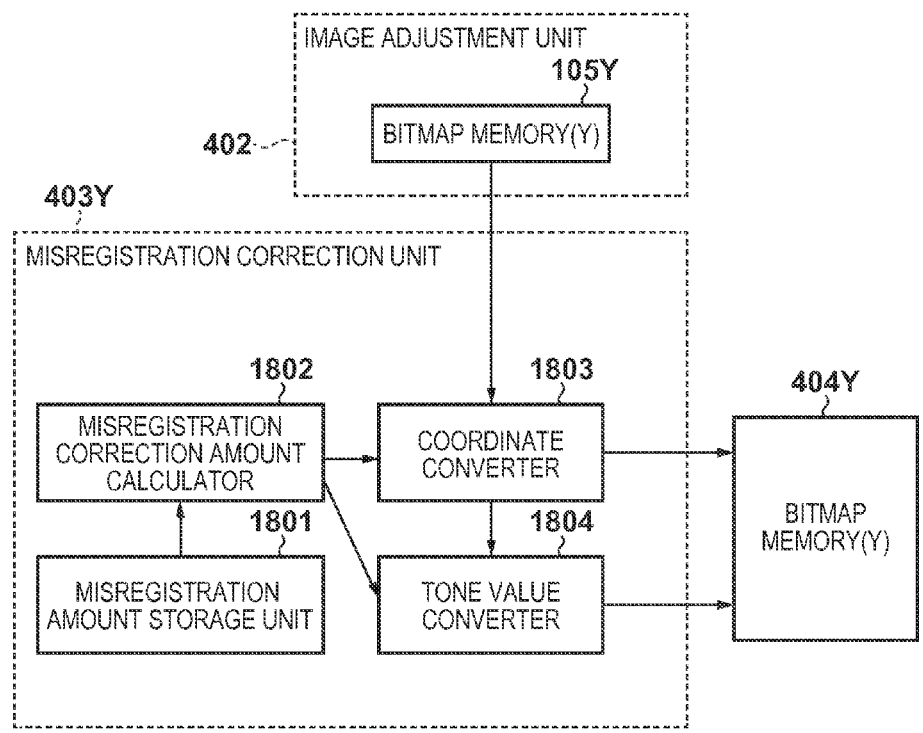

FIG. 19
| MAIN SCANNING POSITION | MISREGISTRATION AMOUNT(Y) |
|---|---|
| −L1 | 0 |
| 0 | eY1 |
| L2 | eY2 |
FIG. 20A
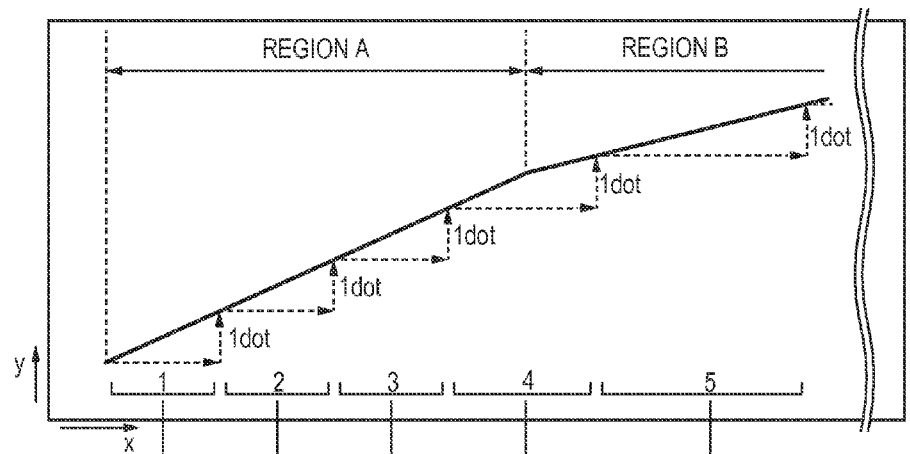
FIG. 20B
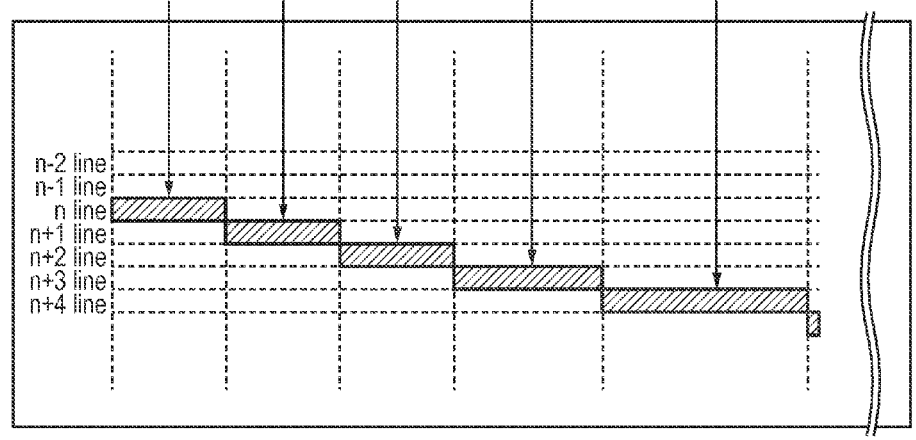

FIG. 21D

| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=Δy−k | 0 | 0.25 | 0.5 | 0.75 | 0 | 0.25 | 0.5 | 0.75 | 0 |
| α=1−β | 1 | 0.75 | 0.5 | 0.25 | 1 | 0.75 | 0.5 | 0.25 | 1 |

FIG. 22

|     |     |     |     |
|-----|-----|-----|-----|
| 226 | 61  | 121 | 181 |
| 166 | 1   | 16  | 76  |
| 106 | 31  | 46  | 136 |
| 211 | 151 | 91  | 196 |

2201 — table1

|     |     |     |     |
|-----|-----|-----|-----|
| 227 | 62  | 122 | 182 |
| 167 | 2   | 17  | 77  |
| 107 | 32  | 47  | 137 |
| 212 | 152 | 92  | 197 |

2202 — table2

|     |     |     |     |
|-----|-----|-----|-----|
| 240 | 75  | 135 | 195 |
| 180 | 15  | 30  | 90  |
| 120 | 45  | 60  | 150 |
| 225 | 165 | 105 | 210 |

2215 — table15

FIG. 23

| 0 | 0  | 0  | 0 | 0 | 0  | 0  | 0 | 0 | 0  | 0  | 0 |
|---|----|----|---|---|----|----|---|---|----|----|---|
| 0 | 15 | 15 | 0 | 0 | 15 | 15 | 0 | 0 | 15 | 15 | 0 |
| 0 | 15 | 8  | 0 | 0 | 15 | 8  | 0 | 0 | 15 | 8  | 0 |
| 0 | 0  | 0  | 0 | 0 | 0  | 0  | 0 | 0 | 0  | 0  | 0 |
| 0 | 0  | 0  | 0 | 0 | 0  | 0  | 0 | 0 | 0  | 0  | 0 |
| 0 | 15 | 15 | 0 | 0 | 15 | 15 | 0 | 0 | 15 | 15 | 0 |
| 0 | 15 | 8  | 0 | 0 | 15 | 8  | 0 | 0 | 15 | 8  | 0 |
| 0 | 0  | 0  | 0 | 0 | 0  | 0  | 0 | 0 | 0  | 0  | 0 |
| 0 | 0  | 0  | 0 | 0 | 0  | 0  | 0 | 0 | 0  | 0  | 0 |
| 0 | 15 | 15 | 0 | 0 | 15 | 15 | 0 | 0 | 15 | 15 | 0 |
| 0 | 15 | 8  | 0 | 0 | 15 | 8  | 0 | 0 | 15 | 8  | 0 |
| 0 | 0  | 0  | 0 | 0 | 0  | 0  | 0 | 0 | 0  | 0  | 0 |

FIG. 24A
| 0 | 0 | 0 | 0 | 0 | 0 | 0 | 0 | 0 | 0 | 0 |
|---|---|---|---|---|---|---|---|---|---|---|
| 100 | 100 | 100 | 100 | 100 | 100 | 100 | 100 | 100 | 100 | 100 |
| 100 | 100 | 100 | 100 | 100 | 100 | 100 | 100 | 100 | 100 | 100 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
FIG. 24B
SCANNING POSITION
| | p0 | p1 | p2 | p3 | p4 | p5 | p6 | p7 | p8 | p9 | p10 |
|---|---|---|---|---|---|---|---|---|---|---|---|
| | 0 | 0 | 0 | 0 | 0 | 0 | 0 | 0 | 0 | 0 | 0 |
| | 100 | 90 | 80 | 70 | 60 | 50 | 40 | 30 | 20 | 10 | 0 |
| | 100 | 100 | 100 | 100 | 100 | 100 | 100 | 100 | 100 | 100 | 100 |
| | 0 | 10 | 20 | 30 | 40 | 50 | 60 | 70 | 80 | 90 | 100 |
| | 0 | 0 | 0 | 0 | 0 | 0 | 0 | 0 | 0 | 0 | 0 |
FIG. 24C
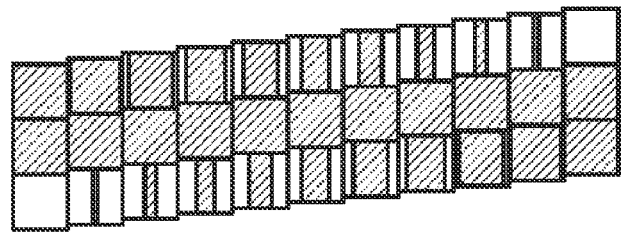
FIG. 24D
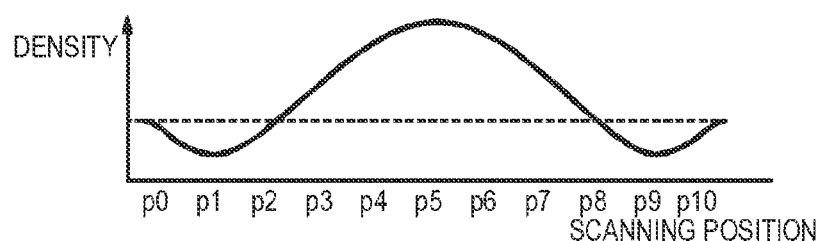
PRIOR ART

FIG. 25A
| 0 | 0 | 0 | 0 | 0 | 0 | 0 | 0 | 0 | 0 | 0 |
|---|---|---|---|---|---|---|---|---|---|---|
| 100 | 100 | 100 | 100 | 100 | 100 | 100 | 100 | 100 | 100 | 100 |
| 100 | 100 | 100 | 100 | 100 | 100 | 100 | 100 | 100 | 100 | 100 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
FIG. 25B
SCANNING POSITION
| p0 | p1 | p2 | p3 | p4 | p5 | p6 | p7 | p8 | p9 | p10 |
|---|---|---|---|---|---|---|---|---|---|---|
| 0 | 0 | 0 | 0 | 0 | 0 | 0 | 0 | 0 | 0 | 0 |
| 100 | 95 | 80 | 70 | 60 | 50 | 40 | 30 | 20 | 11 | 0 |
| 100 | 100 | 100 | 85 | 75 | 70 | 75 | 85 | 100 | 100 | 100 |
| 0 | 11 | 20 | 30 | 40 | 50 | 60 | 70 | 80 | 95 | 100 |
| 0 | 0 | 0 | 0 | 0 | 0 | 0 | 0 | 0 | 0 | 0 |
FIG. 25C
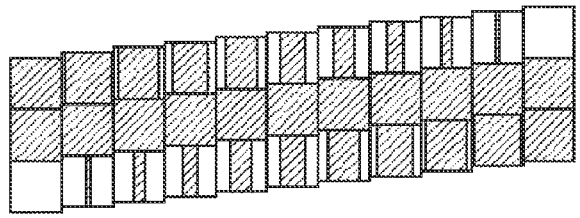
FIG. 25D
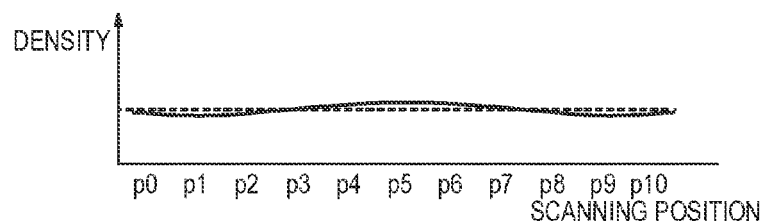
PRIOR ART

INPUT IMAGE DATA 28a-1 — C

| 0 | 0 | 0 | 0 | 0 | 0 | 0 |
|---|---|---|---|---|---|---|
| 0 | 0 | 0 | 0 | 0 | 0 | 0 |
| 0 | 0 | 100 | 100 | 100 | 0 | 0 |
| 0 | 0 | 100 | 100 | 100 | 0 | 0 |
| 0 | 0 | 100 | 100 | 100 | 0 | 0 |
| 0 | 0 | 0 | 0 | 0 | 0 | 0 |
| 0 | 0 | 0 | 0 | 0 | 0 | 0 |

28a-2 — M

| 0 | 0 | 0 | 0 | 0 | 0 | 0 |
|---|---|---|---|---|---|---|
| 0 | 0 | 0 | 0 | 0 | 0 | 0 |
| 0 | 0 | 100 | 100 | 100 | 0 | 0 |
| 0 | 0 | 100 | 100 | 100 | 0 | 0 |
| 0 | 0 | 100 | 100 | 100 | 0 | 0 |
| 0 | 0 | 0 | 0 | 0 | 0 | 0 |
| 0 | 0 | 0 | 0 | 0 | 0 | 0 |

FIG. 28B

AFTER BLUR PROCESSING 28b-1 — BLUR AMOUNT B=0

| 0 | 0 | 0 | 0 | 0 | 0 | 0 |
|---|---|---|---|---|---|---|
| 0 | 0 | 0 | 0 | 0 | 0 | 0 |
| 0 | 0 | 100 | 100 | 100 | 0 | 0 |
| 0 | 0 | 100 | 100 | 100 | 0 | 0 |
| 0 | 0 | 100 | 100 | 100 | 0 | 0 |
| 0 | 0 | 0 | 0 | 0 | 0 | 0 |
| 0 | 0 | 0 | 0 | 0 | 0 | 0 |

28b-2 — BLUR AMOUNT B=1.0

| 0 | 0 | 0 | 0 | 0 | 0 | 0 |
|---|---|---|---|---|---|---|
| 0 | 27 | 27 | 27 | 27 | 27 | 0 |
| 0 | 27 | 73 | 73 | 73 | 27 | 0 |
| 0 | 27 | 73 | 73 | 73 | 27 | 0 |
| 0 | 27 | 73 | 73 | 73 | 27 | 0 |
| 0 | 27 | 27 | 27 | 27 | 27 | 0 |
| 0 | 0 | 0 | 0 | 0 | 0 | 0 |

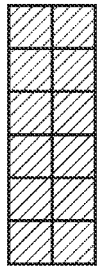

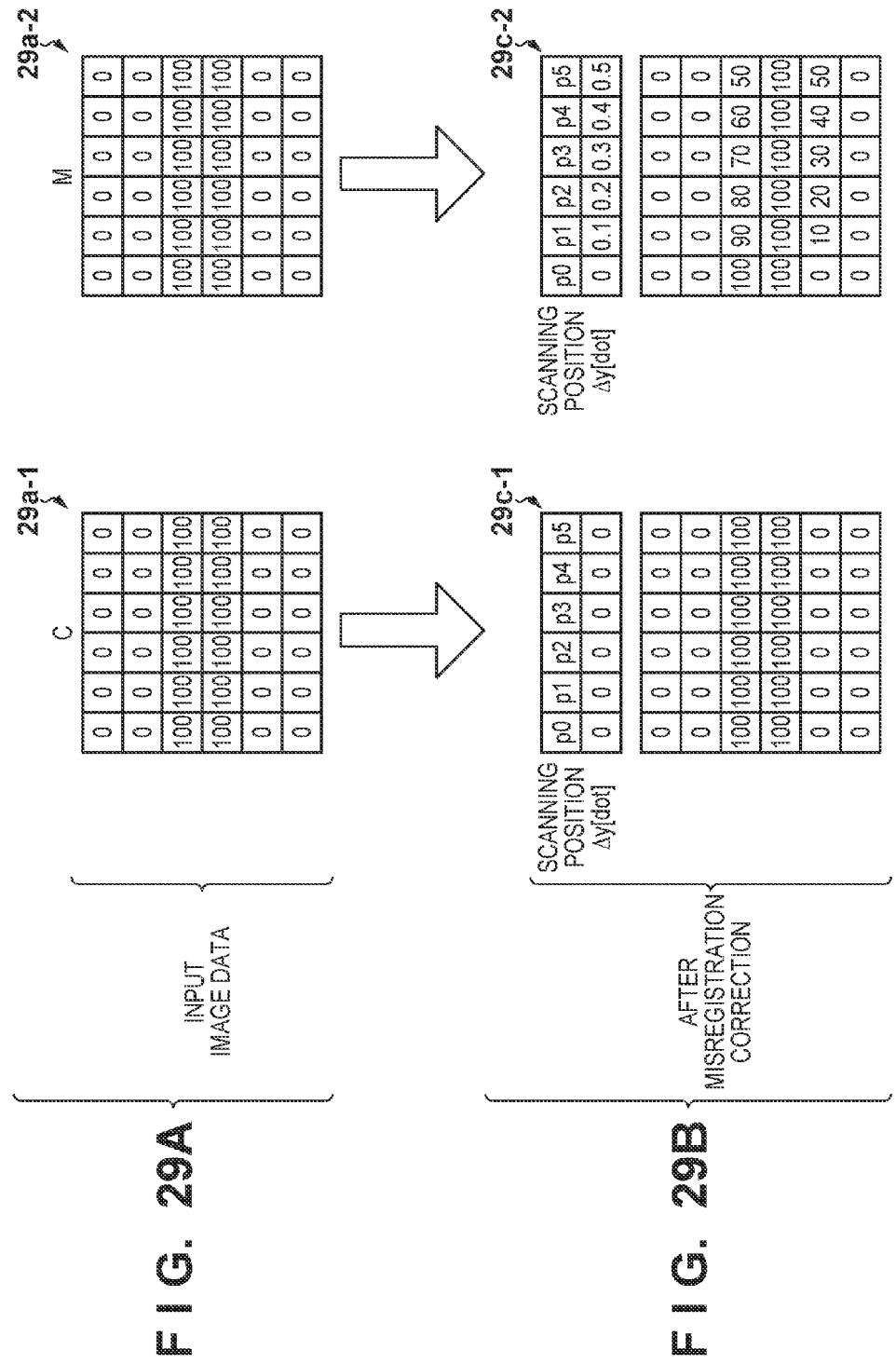

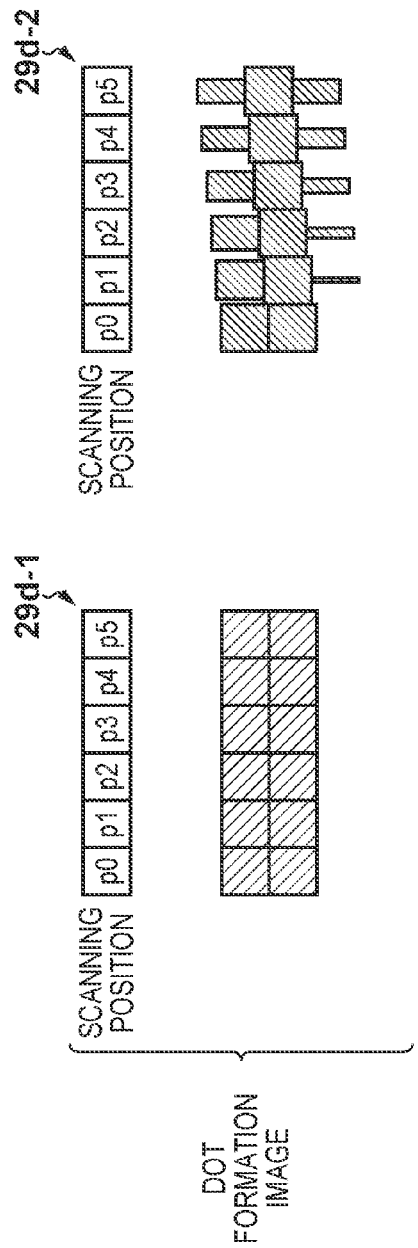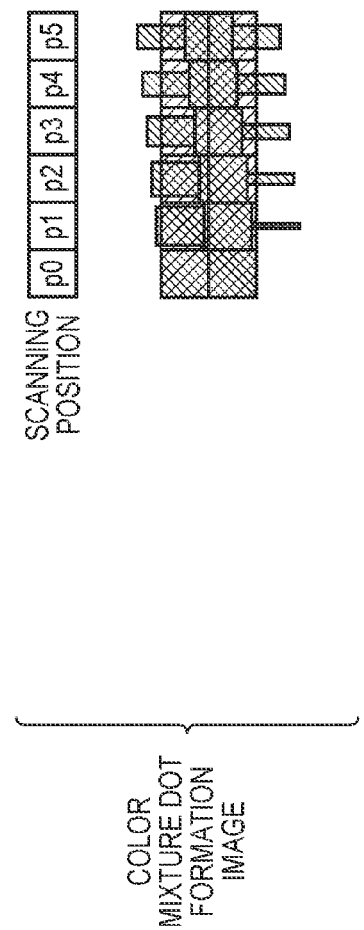

FIG. 30A

30a-1
C — INPUT IMAGE DATA

| 0 | 0 | 0 | 0 | 0 | 0 | 0 | 0 |
|---|---|---|---|---|---|---|---|
| 0 | 100 | 100 | 0 | 0 | 0 | 0 | 0 |
| 0 | 100 | 100 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 100 | 100 | 0 |
| 0 | 0 | 0 | 0 | 0 | 100 | 100 | 0 |
| 0 | 0 | 0 | 0 | 0 | 0 | 0 | 0 |

30a-2
M

| 0 | 0 | 0 | 0 | 0 | 0 | 0 | 0 |
|---|---|---|---|---|---|---|---|
| 0 | 100 | 100 | 0 | 0 | 0 | 0 | 0 |
| 0 | 100 | 100 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 100 | 100 | 0 |
| 0 | 0 | 0 | 0 | 0 | 100 | 100 | 0 |
| 0 | 0 | 0 | 0 | 0 | 0 | 0 | 0 |

FIG. 30B

30b-1
BLUR AMOUNT B=0 — AFTER BLUR PROCESSING

| 0 | 0 | 0 | 0 | 0 | 0 | 0 | 0 |
|---|---|---|---|---|---|---|---|
| 0 | 100 | 100 | 0 | 0 | 0 | 0 | 0 |
| 0 | 100 | 100 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 100 | 100 | 0 |
| 0 | 0 | 0 | 0 | 0 | 100 | 100 | 0 |
| 0 | 0 | 0 | 0 | 0 | 0 | 0 | 0 |

30b-2
BLUR AMOUNT B=1.0

| 0 | 0 | 0 | 0 | 0 | 0 | 0 | 0 |
|---|---|---|---|---|---|---|---|
| 27 | 27 | 0 | 0 | 0 | 0 | 0 | 0 |
| 73 | 73 | 0 | 0 | 0 | 27 | 27 | 0 |
| 73 | 73 | 0 | 0 | 0 | 73 | 73 | 0 |
| 27 | 27 | 0 | 0 | 0 | 73 | 73 | 0 |
| 0 | 0 | 0 | 0 | 0 | 27 | 27 | 0 |
| 0 | 0 | 0 | 0 | 0 | 0 | 0 | 0 |
| 0 | 0 | 0 | 0 | 0 | 0 | 0 | 0 |

F I G. 30C

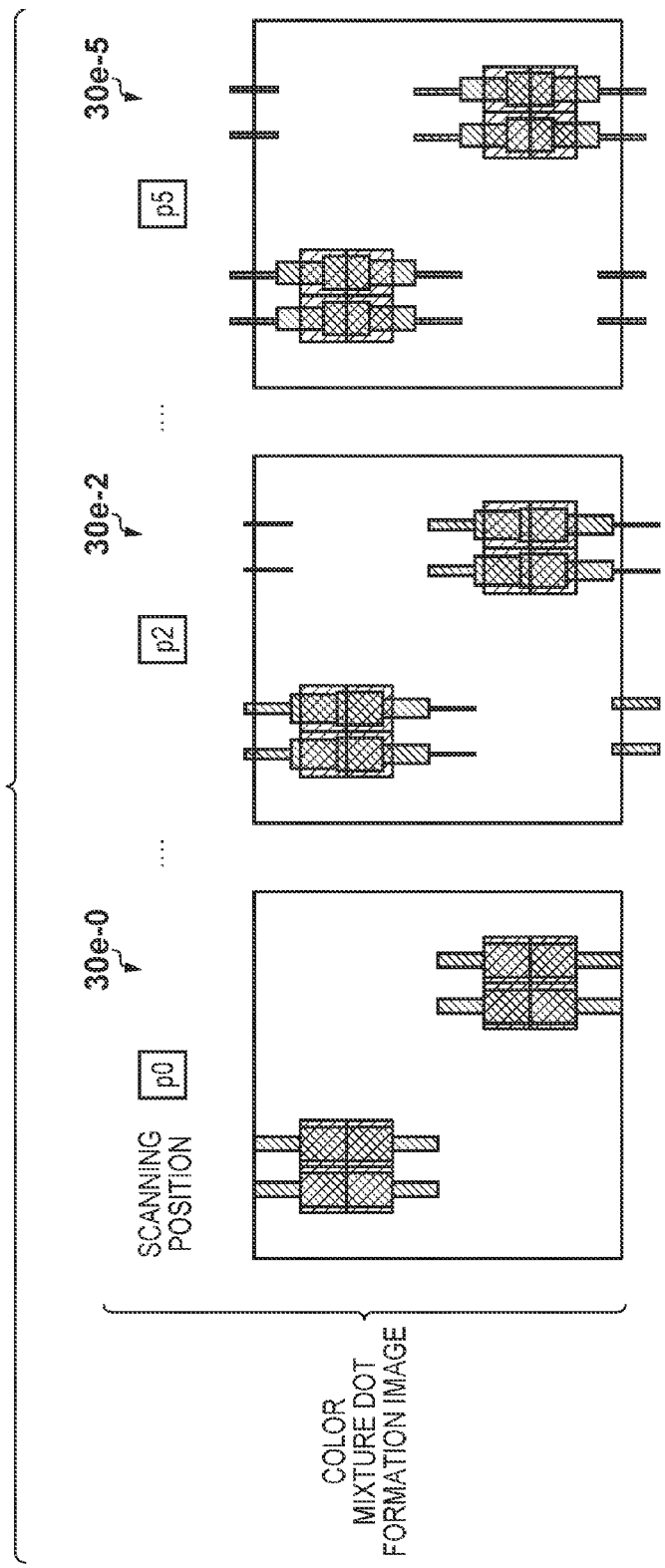

| C | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 100 | 100 | 100 | 0 |
| 0 | 0 | 0 | 100 | 100 | 100 | 0 |
| 0 | 0 | 0 | 100 | 100 | 100 | 0 |
| 0 | 0 | 0 | 0 | 0 | 0 | 0 |

31a-2

| M | | | | | | |
|---|---|---|---|---|---|---|
| 0 | 0 | 0 | 0 | 0 | 0 | 0 |
| 0 | 100 | 100 | 100 | 0 | 0 | 0 |
| 0 | 100 | 100 | 100 | 0 | 0 | 0 |
| 0 | 100 | 100 | 100 | 0 | 0 | 0 |
| 0 | 0 | 0 | 0 | 0 | 0 | 0 |
| 0 | 0 | 0 | 0 | 0 | 0 | 0 |

INPUT IMAGE DATA

FIG. 31B

31b-1 BLUR AMOUNT B=0

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 100 | 100 | 100 | 0 |
| 0 | 0 | 0 | 100 | 100 | 100 | 0 |
| 0 | 0 | 0 | 100 | 100 | 100 | 0 |
| 0 | 0 | 0 | 0 | 0 | 0 | 0 |

31b-2 BLUR AMOUNT B=1.0

| 27 | 27 | 27 | 27 | 27 | 0 | 0 |
|---|---|---|---|---|---|---|
| 27 | 73 | 73 | 73 | 27 | 0 | 0 |
| 27 | 73 | 73 | 73 | 27 | 0 | 0 |
| 27 | 73 | 73 | 73 | 27 | 0 | 0 |
| 27 | 27 | 27 | 27 | 27 | 0 | 0 |
| 0 | 0 | 0 | 0 | 0 | 0 | 0 |

AFTER BLUR PROCESSING

| SCANNING POSITION Δy[dot] | p0 | p1 | p2 | p3 | p4 | p5 |
|---|---|---|---|---|---|---|
| | 0 | 0 | 0 | 0 | 0 | 0 |
| | 0 | 0 | 0 | 0 | 0 | 0 |
| | 0 | 0 | 0 | 0 | 0 | 0 |
| | 100 | 100 | 100 | 100 | 100 | 0 |
| | 100 | 100 | 100 | 100 | 100 | 0 |
| | 0 | 0 | 0 | 0 | 0 | 0 |

31c-2

| SCANNING POSITION Δy[dot] | p0 | p1 | p2 | p3 | p4 | p5 |
|---|---|---|---|---|---|---|
| | 0 | 0.1 | 0.2 | 0.3 | 0.4 | 0.5 |
| | 27 | 24 | 22 | 19 | 16 | 14 |
| | 73 | 68 | 64 | 59 | 55 | 50 |
| | 73 | 73 | 73 | 73 | 73 | 73 |
| | 27 | 32 | 36 | 41 | 45 | 50 |
| | 0 | 3 | 5 | 8 | 11 | 14 |
| | 0 | 0 | 0 | 0 | 0 | 0 |

AFTER MISREGISTRATION CORRECTION

| SCANNING POSITION | p0 | p1 | p2 | p3 | p4 | p5 |
|---|---|---|---|---|---|---|

31d-2

| SCANNING POSITION | p0 | p1 | p2 | p3 | p4 | p5 |
|---|---|---|---|---|---|---|

DOT FORMATION IMAGE

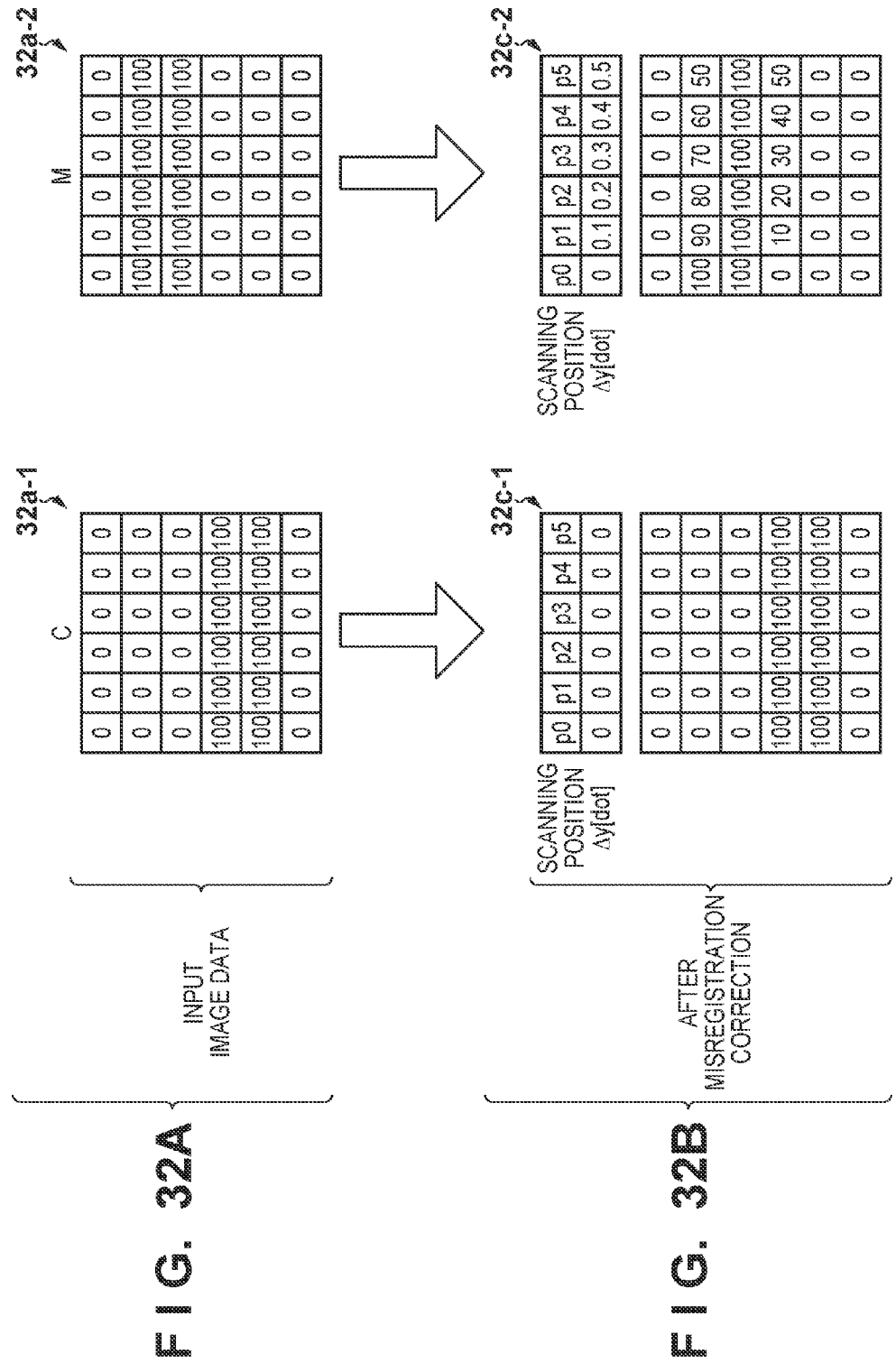

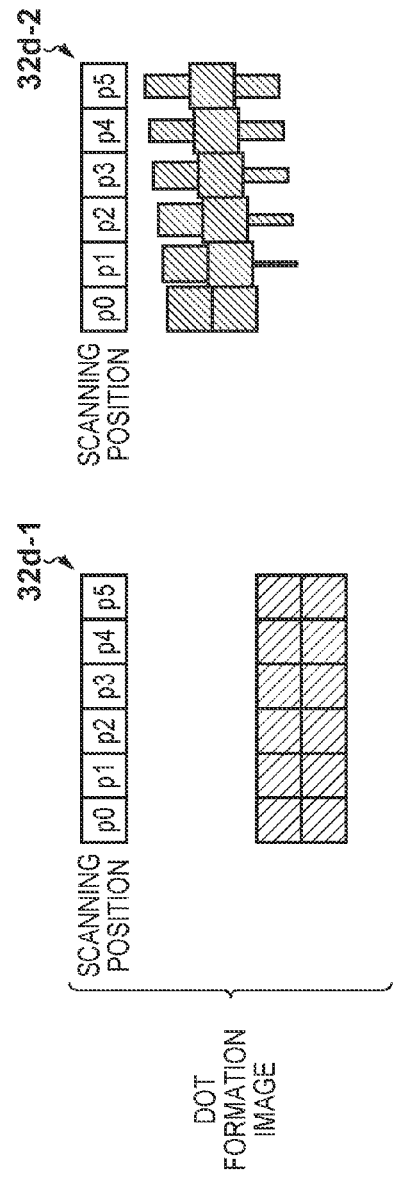

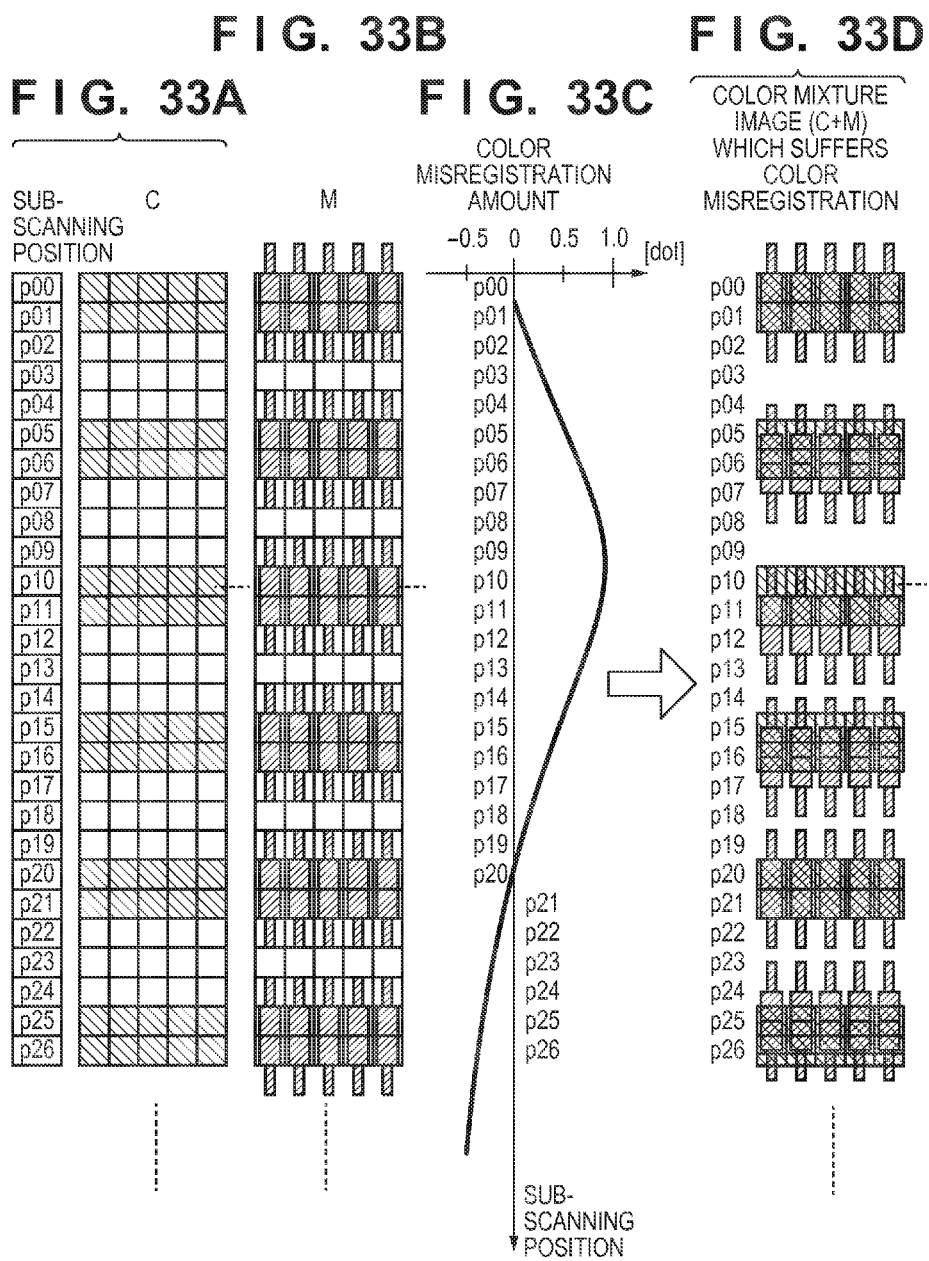

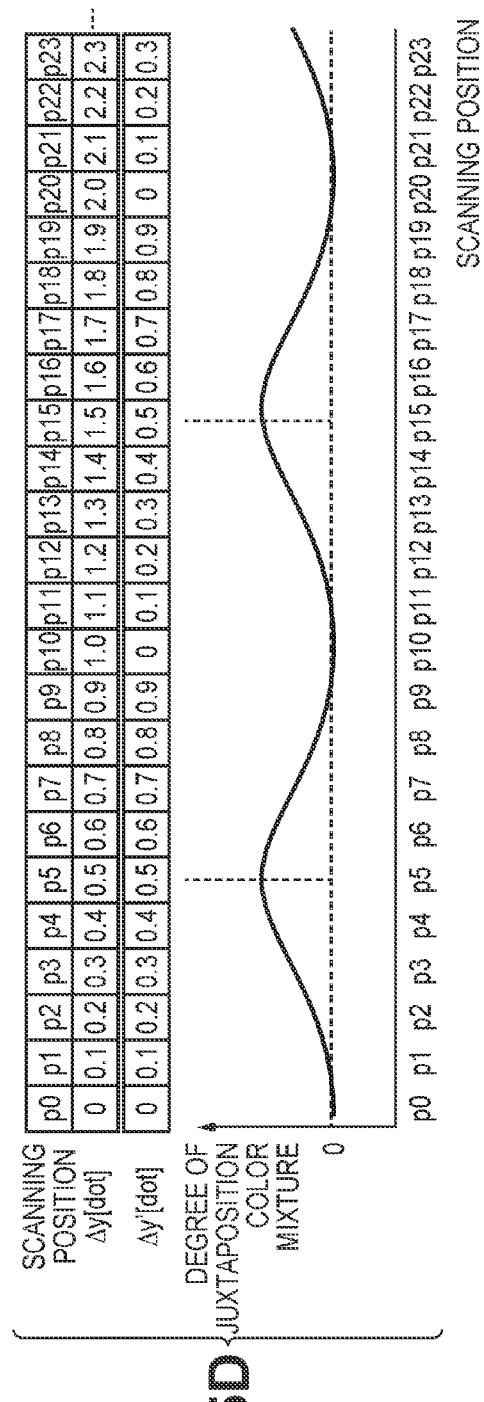
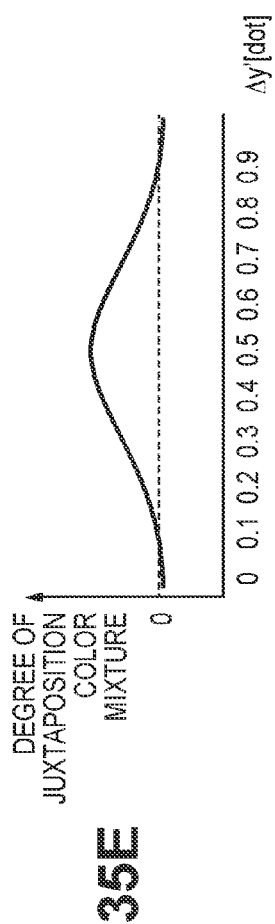
FIG. 35D
FIG. 35E

| COLOR | Bmax |
|---|---|
| Y | 0.5 |
| M | 0.7 |
| C | 0.0 |
| K | 0.4 |

FIG. 38C 38c-1

| SCANNING POSITION Δy[dot] | p0 | p1 | p2 | p3 | p4 | p5 |
|---|---|---|---|---|---|---|
| | 0 | 0 | 0 | 0 | 0 | 0 |
| | 0 | 0 | 0 | 0 | 0 | 0 |
| | 0 | 0 | 100 | 100 | 100 | 0 |
| | 0 | 100 | 100 | 100 | 100 | 0 |
| | 0 | 100 | 100 | 100 | 100 | 0 |
| | 0 | 0 | 100 | 100 | 100 | 0 |
| | 0 | 0 | 0 | 0 | 0 | 0 |
| | 0 | 0 | 0 | 0 | 0 | 0 |

38c-2

| SCANNING POSITION Δy[dot] | p0 | p1 | p2 | p3 | p4 | p5 |
|---|---|---|---|---|---|---|
| | 0 | 0.1 | 0.2 | 0.3 | 0.4 | 0.5 |
| | 0 | 0 | 0 | 0 | 0 | 0 |
| | 0 | 14 | 4 | 0 | 0 | 0 |
| | 21 | 78 | 77 | 70 | 60 | 50 |
| | 79 | 85 | 95 | 100 | 100 | 100 |
| | 79 | 22 | 23 | 30 | 40 | 50 |
| | 21 | 2 | 1 | 0 | 0 | 0 |
| | 0 | 0 | 0 | 0 | 0 | 0 |

AFTER MISREGISTRATION CORRECTION

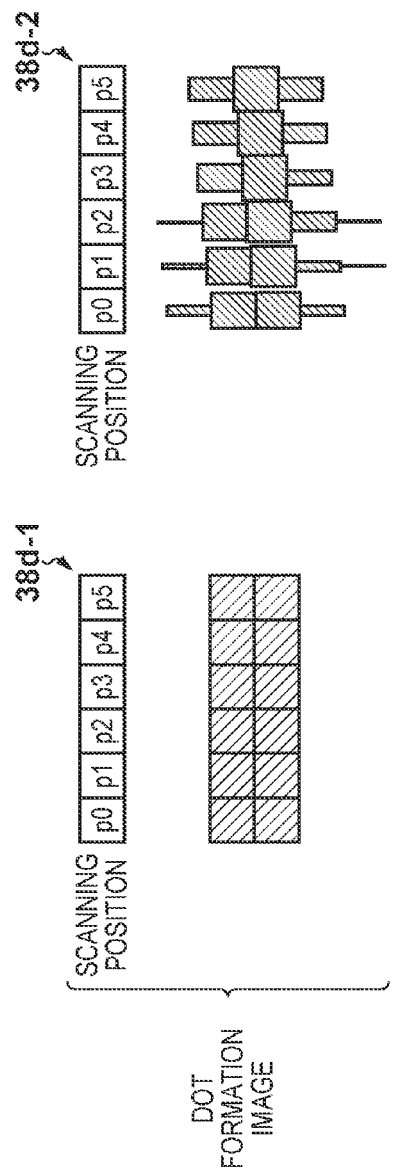
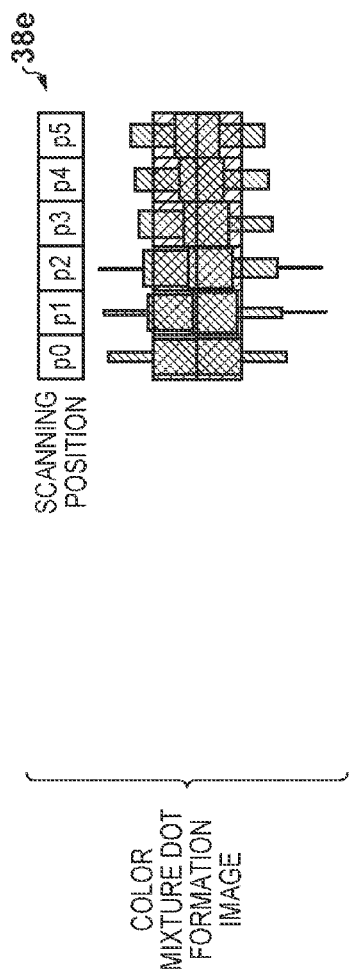

FIG. 41

| | | X0 | X1 | X2 | X3 | X4 |
|---|---|---|---|---|---|---|
| | | 0 | 0 | 1 | 1 | 7 |
| | | 255 | 1 | 0 | 1 | 7 |
| | | 255 | 0 | 0 | 0 | 8 |
| | | 255 | 0 | 0 | 0 | 8 |
| | | 255 | 0 | 1 | 1 | 7 |
| | | 0 | 1 | 0 | 1 | 7 |
| | | 0 | 0 | 0 | 0 | 8 |
| | | 0 | 0 | 1 | 1 | 7 |
| | | 255 | 1 | 0 | 1 | 7 |
| | | 255 | 0 | 0 | 0 | 8 |
| | | 255 | 0 | 0 | 0 | 8 |
| | | 255 | 0 | 1 | 1 | 7 |
| | | 0 | 1 | 0 | 1 | 7 |
| | | 0 | 0 | 0 | 0 | 8 |
| | | 0 | 0 | 1 | 1 | 7 |
| | | 255 | 1 | 0 | 1 | 7 |
| | | 255 | 0 | 0 | 0 | 8 |
| | | 255 | 0 | 0 | 0 | 8 |
| | | 255 | 0 | 1 | 1 | 7 |
| | | 0 | 1 | 0 | 1 | 7 |

FIG. 42

| PATTERN ATTRIBUTE VALUE (PATTERN TYPE) | PATTERN IMAGE EXAMPLE | DETERMINATION FORMULA | | |
|---|---|---|---|---|
| | | NUMBER ny OF Y EDGES $5 \leq ny$ | NUMBER nx OF X EDGES $5 \leq nx$ | AREA RATIO r $20\% \leq r$ |
| 0 (LOW-FREQUENCY PATTERN) | | × | × | - |
| 1 (VERTICAL LINE) | | × | ○ | - |
| 2 (HORIZONTAL LINE) | | ○ | × | - |
| 3 (OBLIQUE LINE) | | ○ | ○ | ○ |
| 4 (HIGH-RESOLUTION PATTERN) | | ○ | ○ | × |

F I G. 43

| BLUR AMOUNT B | | | | |
|---|---|---|---|---|
| COLOR \ PATTERN ATTRIBUTE VALUE | 1 | 2 | 3 | 4 |
| Y | 0.5 | 0.7 | 0.65 | 0.5 |
| M | 0.6 | 1.0 | 0.75 | 0.6 |
| C | 0.0 | 0.0 | 0.0 | 0.0 |
| K | 0.4 | 0.5 | 0.45 | 0.4 |

| COLOR | SHIFT AMOUNT $\alpha$ [DOTS] | PERIOD $\beta$ [DOTS] | PHASE $\delta$ [DOTS] |
|---|---|---|---|
| Y | 1 | 6 | 1 |
| M | 1 | 3 | 0 |
| C | 0 | 1 | 0 |
| K | 1 | 6 | 4 |

F I G. 48A

| x0 | x1 | x2 | x3 | x4 | x5 | x6 | x7 | x8 | x9 | x10 | x11 | x12 | x13 | x14 | x15 |

F I G. 49A

IMAGE PROCESSING APPARATUS, METHOD, AND COMPUTER-READABLE STORAGE MEDIUM TO ELIMINATE UNEVENNESS DUE TO MISREGISTRATION CORRECTION BY ADJUSTING MIXTURE STATUS

BACKGROUND OF THE INVENTION

1. Field of the Invention

The present invention relates to an image processing apparatus, a control method of an image processing apparatus, an image forming apparatus, and a storage medium.

2. Description of the Related Art

In recent years, image quality enhancement of an output image and speeding-up of image formation are required more than ever for image forming apparatuses such as printers and copying machines which adopt an electrophotography system, inkjet system, and the like. Especially, in case of a multi-color image forming apparatus of the electrophotography system, a technique using a plurality of photosensitive members corresponding to different colors so as to attain speeding-up is known. Such image forming apparatus corresponds to a tandem type which attains multi-color printing by forming toner images of respective colors on respective photosensitive members, and transferring these toner images in turn from the photosensitive member onto a transfer member or a printing material so as to be superposed on each other.

However, an image forming apparatus often suffers a tilt and curvature of a scanning line due to various causes generated by a printing mechanism. In case of the electrophotography system, a tilt and curvature of a scanning line by a deflection scanning unit are caused by nonuniformity of a lens and a displacement of a mounting position of the deflection scanning unit required to expose a photosensitive member, a displacement of a mounting position of the deflection scanning unit on an image forming apparatus main body. More specifically, a position of an actual scanning line by the deflection scanning unit displaces from its ideal position, that is, misregistration occurs. Especially, in case of a multi-color image forming apparatus which uses a plurality of photosensitive members, a tilt and curvature (misregistration) of a scanning line may be different for respective colors. As a result, when toner images are transferred onto a transfer member or printing material to be superposed on each other, relative positions of these images are displaced, thus causing color misregistration, that is, image quality deterioration.

As a method for coping against misregistration of a scanning line and color misregistration caused as a result of the misregistration, a technique of Japanese Patent Laid-Open No. 2003-241131 has been proposed. Japanese Patent Laid-Open No. 2003-241131 has proposed the technique for measuring the magnitude of a tilt of a scanning line using an optical sensor in an assembling process of a deflection scanning device in an image forming apparatus main body, and adjusting the tilt of the scanning line by mechanically adjusting the tilt of the deflection scanning device based on the measurement result.

However, since such mechanical adjustment requires a high-precision adjustment device and movable members, cost may increase, and it is difficult to apply this technique to an inexpensive personal image forming apparatus. In a multi-color image forming apparatus, in recent years, in order to attain a cost reduction, a common deflection scanning device is often used to scan the surfaces of a plurality of photosensitive members corresponding to different colors. In this case, it is difficult for the technique described in Japanese Patent Laid-Open No. 2003-241131 to adjust a scanning line for respective colors.

A method of electrically correcting a tilt and curvature of a scanning line in place of such mechanical adjustment (correction) has been proposed. Japanese Patent Laid-Open No. 2004-170755 has proposed a method of measuring the magnitudes of a tilt and curvature of a scanning line using an optical sensor, correcting bitmap image data to cancel them based on the measurement result, and forming an image using the corrected image data. Since this method electrically corrects a scanning line by processing bitmap image data based on the measurement result, the need for mechanical adjustment members and adjustment processes at the time of assembling can be obviated, thus coping with misregistration of the scanning line at lower cost than the method described in Japanese Patent Laid-Open No. 2003-241131. The misregistration correction by Japanese Patent Laid-Open No. 2004-170755 is divided into correction for one pixel unit and that for less than one pixel. In the correction for one pixel unit, positions of respective pixels of image data are offset in a sub-scanning direction by a correction amount for one pixel unit in accordance with correction amounts of a tilt and curvature of a scanning line. In the correction for less than one pixel, a tone value of each pixel of image data and a pixel value of a pixel which neighbors a pixel of interest in the sub-scanning direction are adjusted. With this correction for less than one pixel, an image corrected by the correction for one pixel unit is smoothed.

However, when the correction based on the method of Japanese Patent Laid-Open No. 2004-170755 is applied to image data of a fine pattern image including patterns such as thin lines and dots which are repeated in short cycles (that is, they are regularly repeated and have a high spatial frequency), a fine pattern image to be formed may suffer density unevenness.

FIGS. 24A to 24D show uneven density that occurs in a fine pattern image. In FIGS. 24A to 24D, tone values of respective pixels are expressed by numerical values ranging from 0 to 100 (%). FIG. 24A shows image data corresponding to a part of a fine pattern image including a fine line (line image) of a 2-dot width along the scanning direction. The pattern shown in FIG. 24A is repeated over the fine pattern image. FIG. 24B shows an example of image data obtained when the correction based on the method of Japanese Patent Laid-Open No. 2004-170755 is applied to the image data shown in FIG. 24A. In general, in an electrophotographic image forming apparatus, tone values less than one pixel are formed by pulse width modulation (PWM). When an image is formed on a printing material using the corrected image data shown in FIG. 24B, an image shown in FIG. 24C is formed.

As shown in FIG. 24A, although the width of the line (density of the line image) included in the input image is constant along the scanning direction, the densities of the line image actually formed on the printing material may become uneven in the scanning direction, as shown in FIG. 24C. That is, in the image formed based on the corrected image data, the densities of the line image are changed for respective positions (scanning positions) p0 to p10 in the scanning direction, and become uneven in the scanning direction, as shown in FIG. 24D. This is caused by the nonlinear relationship between the widths of pulses generated by the PWM and laser light amounts in the electrophotographic image forming apparatus. Furthermore, upon forming a dot having a size not more than one dot, such unevenness is caused by the influence of nonlinear factors during processes of exposure-development-transfer-fixing. For these reasons, tone values of respective pixels in the image data, and actually formed dot sizes and densities do not have a linear relationship, thus forming the line with the uneven width.

For example, compared to ideal dots formed at the scanning positions p0 and p10, small dots corresponding to a tone value=10% are destabilized due to electrophotography characteristics and are finally nearly not formed, and densities tend to be lower at the scanning positions p1 and p9. On the other hand, at the scanning positions p3 to p7, as a result of stronger coupling of dots which neighbor in a lengthwise direction (a sub-scanning direction perpendicular to the scanning direction), dots are stably formed, and densities tend to be too much higher.

Such density unevenness of the line is not so conspicuous when an image solely includes the line, and no problem is posed. On the other hand, when an image includes a plurality of lines which are repeated at short intervals (fine line pattern), changes in dot shape which form each line are visualized as changes in density. Since such density changes periodically occur in the image, stripe-like density unevenness becomes conspicuous, resulting in image quality deterioration.

In order to cope with the aforementioned problems, Japanese Patent Laid-Open No. 2007-279429 has proposed a method for eliminating density unevenness which may occur in an image to be formed by adjusting a correction amount of an image position for a unit less than one pixel based on a measurement value obtained by reading a test pattern image using a sensor.

The method of eliminating density unevenness (FIGS. 24A to 24D), which may occur upon forming a line image, by the technique of Japanese Patent Laid-Open No. 2007-279429 will be described below with reference to FIGS. 25A to 25D. As shown in FIG. 24D, compared to the ideal dots at the scanning positions p0 and p10, the dots at the scanning positions p1 and p9 have lower densities, and those at the scanning positions p3 to p7 have higher densities. For this reason, the image data shown in FIG. 24D is adjusted to values shown in FIG. 25B.

In FIG. 25B, in order to increase dot densities at the scanning positions p1 and p9, dots at barycentric positions in the lengthwise direction (sub-scanning direction) are left unchanged, and densities of upper and lower neighboring dots having tone values=90% and 10% are increased at an equal ratio. More specifically, the densities of these dots are increased at a ratio of about 5%. On the other hand, in order to decrease dot densities at the scanning positions p3 to p7, barycentric positions in the lengthwise direction of the line are left unchanged, and densities of dots having a tone value=100% at the barycentric positions are decreased by an amount higher than the ideal dots at the scanning positions p0 and p10. More specifically, the densities of these dots are decreased at a ratio of about 30%.

FIG. 25C shows an image (image to be formed), which is formed based on the image data shown in FIG. 25B. As can be seen from FIG. 25C, dots at the barycentric positions of the like at the scanning position p5 and the like become smaller than those in FIG. 24C. As a result, as can be seen from FIG. 25D, the densities at the scanning positions p0 to p10 are nearly even, and density unevenness in the image to be formed is eliminated.

By correcting the position of the image to be formed using the technique of Japanese Patent Laid-Open No. 2007-279429, the aforementioned density unevenness can be eliminated when a unicolor fine pattern image is formed. However, when an image in a color mixture state (multi-color image) is formed by superposing a plurality of images of different colors, changes in color mixture state caused by the correction of the positions of the image to be formed may cause color misregistration in the image to be formed.

In general, when a dot of a mixed specific color is formed by superposing dots of different colors, a color effect of a formed dot changes depending on a degree of overlapping of dots of different colors. For example, in a color mixture state based on subtractive color mixture in which dots of different colors perfectly overlap each other and that based on juxtaposition color mixture in which dots of different colors are juxtaposed, the subtractive color mixture forms a color having a darker color effect than the juxtaposition color mixture. For this reason, for example, when degrees of overlapping of dots of different colors are even in an input image, if dot shapes are changed for the purpose of position correction of an image to be formed like in Japanese Patent Laid-Open No. 2007-279429, degrees of overlapping of dots among different colors are changed, thus changing the color mixture state. As a result, the color effects of dots in color mixture states are changed to different states for respective dots, and such changes in color effect cause color unevenness in an image to be formed.

Such changes in color effects may be visualized when an input image is a fine pattern image. For example, when a single line is formed by mixing a plurality of colors, changes in color caused by misregistration correction of images to be formed for respective colors are not so conspicuous, and do not pose a problem. On the other hand, in case of a fine pattern image in which such lines repetitively appear at short interval in an image, different changes in dot shape appear as changes in color, and changes in color periodically occur in an image to be formed due to repetition of lines. That is, when an input image is a fine pattern image, stripe-like color unevenness is generated in an image to be formed, resulting in image quality deterioration.

Especially, when an input image is in a state in which fine patterns of different colors perfectly overlap each other (a degree of juxtaposition color mixture (to be described later)=0%) or in a state in which fine patterns of different colors do not overlap at all (a degree of juxtaposition color mixture (to be described later)=100%), such color unevenness readily occurs. In this case, even when respective dot shapes are changed slightly upon misregistration correction of images to be formed for respective colors, color mixture states of different color effects are generated.

SUMMARY OF THE INVENTION

The present invention has been made in consideration of the aforementioned problems. The present invention provides a technique for eliminating color unevenness which may occur in an image to be formed due to misregistration correction for the image by adjusting color mixture states of the image.

According to one aspect of the present invention, there is provided an image processing apparatus for executing image processing for input image data, which includes a plurality of color component data corresponding to a plurality of colors and is required to form a multi-color image, comprising: a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors; a detection unit configured to detect a specific pattern in the input image data, and to detect pixels corresponding to the specific pattern; a specifying unit configured to specify, in the input image data, a pixel which corresponds to the specific pattern detected by the detection unit, and the parameter calculated by the calculation unit of which does not exhibit a value within a predetermined appropriate range; and an execution unit configured to execute, for the input image data, image processing for adjusting the parameter of the pixel specified by the specifying unit to fall within the predetermined appropriate range.

According to another aspect of the present invention, there is provided an image forming apparatus comprising: a photosensitive member; an image processing apparatus configured to execute image processing for input image data, which includes a plurality of color component data corresponding to a plurality of colors and is required to form a multi-color image; an exposure unit configured to expose a surface of the photosensitive member by scanning the surface of the photosensitive member with a light beam based on the input image data which has undergone the image processing by the image processing apparatus; and a developing unit configured to develop an electrostatic latent image formed on the surface of the photosensitive member by exposure of the exposure unit and to form an image to be transferred onto a printing material on the surface of the photosensitive member, wherein the image processing apparatus comprises: a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors; a detection unit configured to detect a specific pattern in the input image data, and to detect pixels corresponding to the specific pattern; a specifying unit configured to specify, in the input image data, a pixel which corresponds to the specific pattern detected by the detection unit, and the parameter calculated by the calculation unit of which does not exhibit a value within a predetermined appropriate range; and an execution unit configured to execute, for the input image data, image processing for adjusting the parameter of the pixel specified by the specifying unit to fall within the predetermined appropriate range.

According to still another aspect of the present invention, there is provided a control method of an image processing apparatus for executing image processing for image data, which includes a plurality of color component data corresponding to a plurality of colors and is required to form a multi-color image, comprising: a step of calculating a parameter, which represents a color mixture state when dots of respective colors formed using pixel values of the respective colors included in the input image data are superposed on each other, and which is changed according to a degree of overlapping of the dots of the respective colors, for each pixel in the input image data; a step of detecting a specific pattern in the input image data, and to detect pixels corresponding to the specific pattern; a step of specifying a pixel, which corresponds to the specific pattern detected in the step of detecting, and the parameter calculated in the step of calculating of which does not exhibit a value within a predetermined appropriate range; and a step of executing, for the input image data, image processing required to adjust the parameter of the pixel specified in the step of specifying to fall within the predetermined appropriate range.

According to the present invention, the technique for eliminating color unevenness which may occur in an image to be formed due to misregistration correction for the image by adjusting color mixture states of the image can be provided.

Further features of the present invention will become apparent from the following description of exemplary embodiments (with reference to the attached drawings).

BRIEF DESCRIPTION OF THE DRAWINGS

FIGS. 5A to 5D show an example of color misregistration which occurs in an output image;

FIG. 6 is a flowchart showing the sequence of calculation processing (step S1305) executed by a juxtaposition color mixture degree calculator 102 according to the first embodiment of the present invention;

FIG. 7 is a view showing an example of the calculation processing of a degree of juxtaposition color mixture according to the first embodiment of the present invention;

FIGS. 9A-1 to 9A-6 and 9B-1 to 9B-6 are views showing an example of a fine image;

FIG. 10 is a view showing an example of specific pattern detection processing according to the first embodiment of the present invention;

FIG. 11 is a view showing an example of specific pattern detection processing according to the first embodiment of the present invention;

FIGS. 15A to 15D show an example of filter coefficients corresponding to a blur amount B in the filter processing according to the first embodiment of the present invention;

FIGS. 16A-1 to 16A-5 and 16B-1 to 16B-5 are views showing a filter processing example according to the first embodiment of the present invention;

FIG. 17 is a table showing an example of blur amounts B corresponding to respective colors in the filter processing according to the first embodiment of the present invention;

FIG. 18 is a block diagram showing the arrangement of a misregistration correction unit 403Y according to the first embodiment of the present invention;

FIG. 19 is a table showing the relationship between main scanning positions and misregistration amounts according to the first embodiment of the present invention;

FIGS. 20A and 20B are views showing coordinate conversion processing according to the first embodiment of the present invention;

FIGS. 21A to 21F are views showing tone conversion processing according to the first embodiment of the present invention;

FIG. 22 is a view showing an example of dither matrices used in halftone processing according to the first embodiment of the present invention;

FIG. 23 is a view showing an example of a result of the halftone processing according to the first embodiment of the present invention;

FIGS. 24A to 24D are views showing an example of misregistration correction processing;

FIGS. 25A to 25D are views showing an example of misregistration correction processing;

FIGS. 28A to 28E are views showing effects according to the first embodiment of the present invention;

FIGS. 29A to 29D are views showing a comparative example corresponding to a case in which image adjustment by the image adjustment unit 402 is not applied;

FIGS. 30A to 30D are views showing effects according to the first embodiment of the present invention;

FIGS. 31A to 31E are views showing effects according to the first embodiment of the present invention;

FIGS. 32A to 32D are views showing a comparative example corresponding to a case in which image adjustment by the image adjustment unit 402 is not applied;

FIGS. 33A to 33D are views showing effects according to the first embodiment of the present invention;

FIGS. 35A to 35E are views showing the relationship between misregistration correction amounts Δy and degrees of juxtaposition color mixture upon application of image adjustment according to the first embodiment of the present invention;

FIGS. 38A to 38E are views showing effects according to the second embodiment of the present invention;

FIG. 41 is a view showing an example of the specific pattern detection processing according to the third embodiment of the present invention;

FIG. 42 is a table showing a correspondence relationship between pattern attribute values and determination conditions of respective patterns used in the specific pattern detection processing according to the third embodiment of the present invention;

FIG. 43 is a table showing an example of setting values of a blur amount B in filter processing according to the third embodiment of the present invention;

FIGS. 48A to 48E are views showing an example of the coordinate conversion processing according to the fourth embodiment of the present invention; and FIGS. 49A to 49E are views showing an example of the coordinate conversion processing according to the fourth embodiment of the present invention.

DESCRIPTION OF THE EMBODIMENTS

Figure 1:
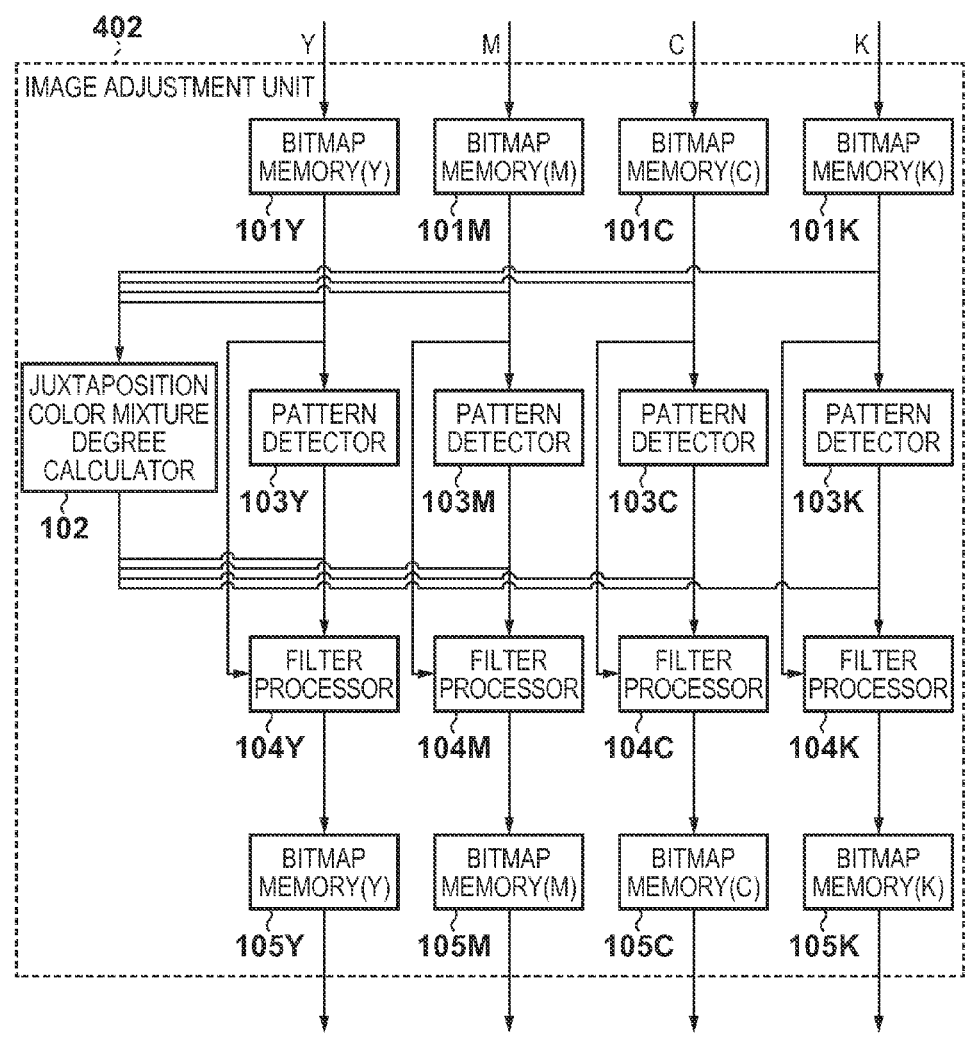
FIG. 1 is a block diagram showing the arrangement of an image adjustment unit 402 according to the first embodiment of the present invention.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

[First Embodiment]

The first embodiment will explain a tandem type 4-drum, multi-color image forming apparatus which adopts an intermediate transfer belt based on an electrophotography system as an application example of the present invention.

<Arrangement of Image Forming Apparatus>

The arrangement of an image forming apparatus 10 will be described first with reference to FIG. 2. In this embodiment, the image forming apparatus 10 is a color image forming apparatus which forms an image at a resolution of 600 dpi. The image forming apparatus 10 forms electrostatic latent images respectively on surfaces of photosensitive drums (photosensitive members) 22Y, 22M, 22C, and 22K (to be described as "22Y, 22M, 22C, and 22K" hereinafter for the sake of simplicity; the same applies to other members) in accordance with an exposure control signal generated using pulse width modulation (PWM) by an image processing unit (an image processing unit 40 shown in FIG. 4). Since these electrostatic latent images are developed using toners of respective colors, monochrome (unicolor) toner images are respectively formed on the surfaces of the photosensitive drums 22Y, 22M, 22C, and 22K. Finally, these toner images are transferred onto a surface of a printing material to be superposed on each other, thereby forming a multi-color toner image on the surface of the printing material. Note that the image forming apparatus 10 forms a multi-color toner image using toners of four colors, that is, yellow (Y), magenta (M), cyan (C), and black (K) colors. An image forming operation executed by the image forming apparatus 10 will be described in more detail below.

The image forming apparatus 10 includes four image forming stations which respectively form unicolor toner images on the plurality of corresponding photosensitive drums 22Y, 22M, 22C, and 22K using toners of different colors. The four image forming stations respectively include the plurality of photosensitive drums 22Y, 22M, 22C, and 22K, injection chargers 23Y, 23M, 23C, and 23K as primary chargers, and scanner units 24Y, 24M, 24C, and 24K. The four image forming stations further respectively include toner cartridges 25Y, 25M, 25C, and 25K and developers 26Y, 26M, 26C, and 26K. The image forming apparatus 10 includes an intermediate transfer member (intermediate transfer belt) 27 onto which toner images formed on the photosensitive drums 22Y, 22M, 22C, and 22K in these image forming stations are transferred.

The photosensitive drums 22Y, 22M, 22C, and 22K are respectively rotated by driving forces of different driving motors (not shown). The injection chargers 23Y, 23M, 23C, and 23K respectively include sleeves 23YS, 23MS, 23CS, and 23KS, which respectively charge the corresponding photosensitive drums 22Y, 22M, 22C, and 22K. The scanner units 24Y, 24M, 24C, and 24K form electrostatic latent images on the corresponding photosensitive drums by exposing the charged surfaces of the photosensitive drums 22Y, 22M, 22C, and 22K with laser beams (light beams). The developers 26Y, 26M, 26C, and 26K respectively include sleeves 26YS, 26MS, 26CS, and 26KS. The developers 26Y, 26M, 26C, and 26K respectively develop the electrostatic latent images on the photosensitive drums 22Y, 22M, 22C, and 22K using toners of different colors supplied from the toner cartridges 25Y, 25M, 25C, and 25K. More specifically, the developers 26Y, 26M, 26C, and 26K respectively visualize the electrostatic latent images on the photosensitive drums 22Y, 22M, 22C, and 22K using toners of Y, M, C, and K colors, thereby forming toner images of the respective colors on the surfaces of the photosensitive drums.

Figure 2:
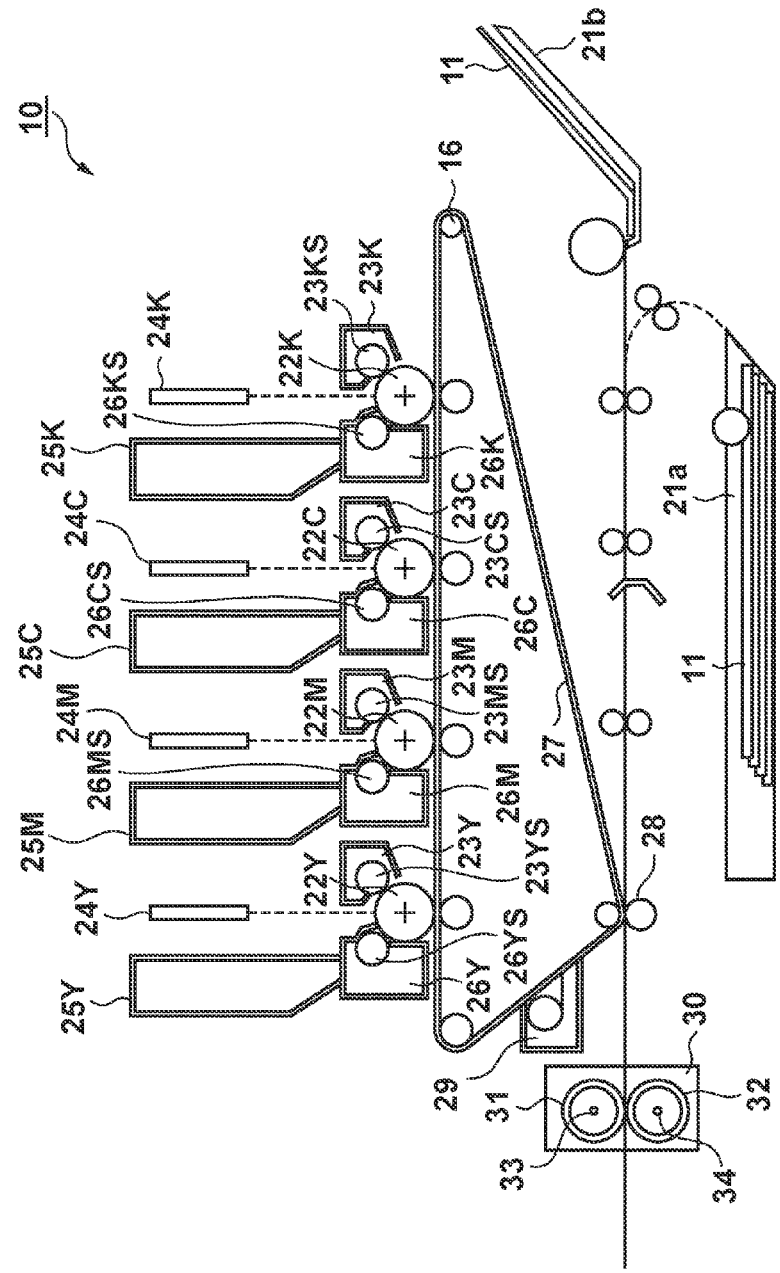
FIG. 2 is a sectional view showing the arrangement of an image forming apparatus 10 according to the first embodiment of the present invention.

The intermediate transfer member 27 is arranged at a position where it is in contact with the photosensitive drums 22Y, 22M, 22C, and 22K, as shown in FIG. 2. At the time of image formation, unicolor toner images from the photosensitive drums 22Y, 22M, 22C, and 22K are transferred (primary transfer) to be superposed in turn onto the intermediate transfer member 27, which is rotated by the driving force of a driving roller 16. In this way, a multi-color toner image is formed on the surface of the intermediate transfer member 27. Note that the driving roller 16 is driven by a driving motor (not shown) for the intermediate transfer member 27.

The multi-color toner image formed on the intermediate transfer member 27 is conveyed to a nip portion between the intermediate transfer member and a transfer roller 28 upon rotation of the intermediate transfer member. In synchronism with a conveyance timing of the toner image to the nip portion, a printing material 11 is fed from a paper feed unit 21a or 21b, and is conveyed to the nip portion along a convey path. The transfer roller 28 is in contact with the intermediate transfer member 27 via the conveyed printing material 11. While the transfer roller 28 is in contact with the intermediate transfer member 27, the multi-color toner image formed on the intermediate transfer member is transferred onto the printing material 11 (secondary transfer). In this manner, the multi-color toner image is formed on the printing material 11. Upon completion of the secondary transfer from the intermediate transfer member 27 onto the printing material 11, the transfer roller 28 is separated from the intermediate transfer member 27.

The printing material 11 on which the multi-color toner image is transferred is then conveyed to a fixing unit 30 along the convey path. The fixing unit 30 melts the toner image on the printing material 11 conveyed along the convey path, thereby fixing the toner image on the printing material 11. The fixing unit 30 includes a fixing roller 31 used to heat the printing material 11, and a pressure roller 32 used to bring the printing material 11 into pressure-contact with the fixing roller 31. The fixing roller 31 and pressure roller 32 are formed to have a hollow shape, and respectively incorporate heaters 33 and 34. The printing material 11 which holds the multi-color toner image on its surface is applied with heat and pressure while being conveyed by the fixing roller 31 and pressure roller 32 in the fixing unit 30. In this way, the toner image is fixed on the surface of the printing material 11. After the toner image is fixed, the printing material 11 is discharged onto a discharge tray (not shown) by a discharge roller (not shown). With the above processes, the image forming operation on the printing material 11 is complete.

A cleaning unit 29 arranged in the vicinity of the intermediate transfer member 27 includes a cleaner container, and recovers residual toner (waste toner) on the intermediate transfer member 27 after the secondary transfer of the toner image onto the printing material 11. The cleaning unit 29 stores the recovered waste toner in the cleaner container. In this manner, the cleaning unit 29 cleans the surface of the intermediate transfer member 27.

This embodiment will explain the image forming apparatus 10 (FIG. 2) including the intermediate transfer member 27. However, the present invention is applicable to a primary transfer type image forming apparatus, which directly transfers toner images formed on the photosensitive drums 22Y, 22M, 22C, and 22K onto a printing material. In this case, the intermediate transfer member 27 shown in FIG. 2 may be replaced by a conveyor belt. In this embodiment, the different driving motors are used respectively for the photosensitive drums 22Y, 22M, 22C, and 22K. However, a common (single) motor may be used for all the photosensitive drums.

Note that in the following description, a scanning direction of the surfaces of the photosensitive drums 22Y, 22M, 22C, and 22K with laser beams output from the scanner units 24Y, 24M, 24C, and 24K will be referred to as a main scanning direction, and a direction perpendicular to the main scanning direction will be referred to as a sub-scanning direction. The sub-scanning direction agrees with a conveyance direction of the printing material 11 (=a rotation direction of the intermediate transfer member 27).

<Tilt and Curvature of Scanning Line in Image Forming Apparatus>

Tilts and curvatures of scanning lines of laser beams on the surfaces of the photosensitive drums 22Y, 22M, 22C, and 22K, which may occur in the image forming apparatus 10, will be described below with reference to FIG. 3. As described above, displacements of mounting positions of the scanner units 24Y, 24M, 24C, and 24K and photosensitive drums 22Y, 22M, 22C, and 22K with respect to the image forming apparatus 10 may cause tilts and curvatures of scanning lines by laser beams output from the scanner units 24Y, 24M, 24C, and 24K. Also, distortions of characteristics of lenses (not shown) in the scanner units 24Y, 24M, 24C, and 24K may cause such tilts and curvatures of scanning lines. In this manner, since actual scanning lines of the laser beams suffer tilts and curvatures, actual positions of the scanning lines deviate from their ideal positions. In the following description, such deviations of the actual scanning lines formed by the laser beams from their ideal positions will be referred to as "misregistration".

Figure 3:
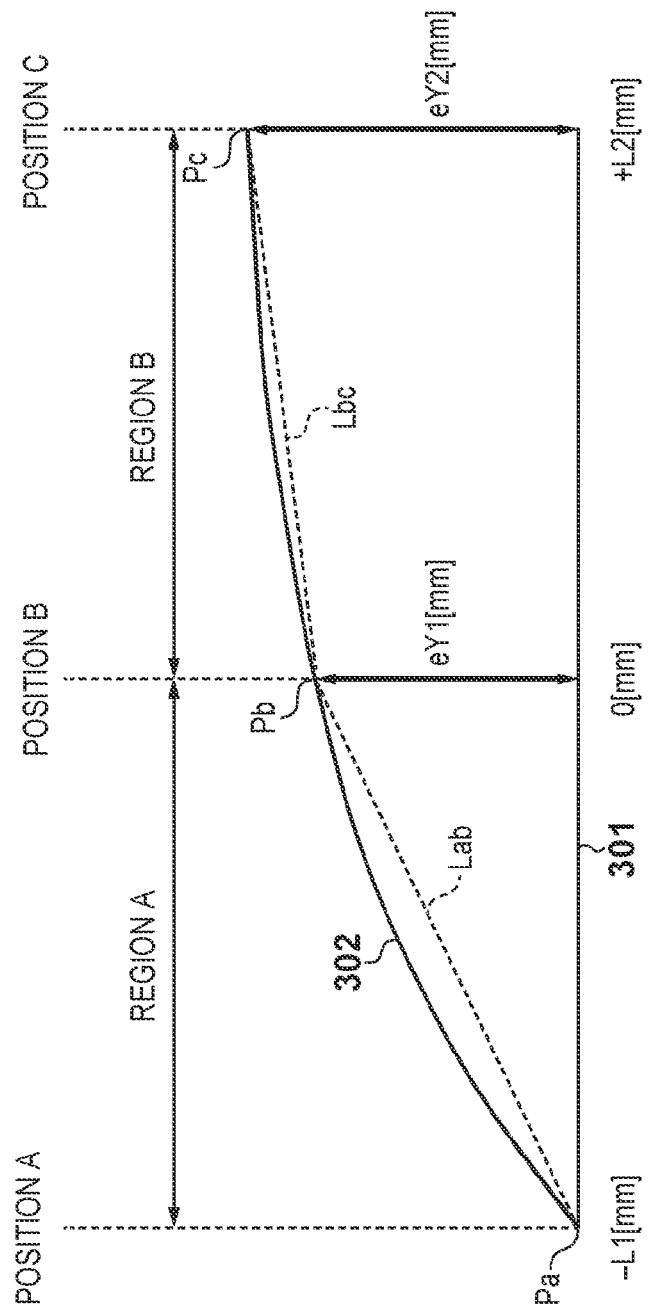
FIG. 3 is a view showing an example of an ideal scanning line and actual scanning line on a photosensitive drum 22Y.

FIG. 3 shows an example of a tilt and curvature (misregistration), which occur in a scanning line when the surface of the photosensitive drum 22Y is scanned with a laser beam. Referring to FIG. 3, a horizontal direction agrees with the main scanning direction, and a vertical direction agrees with the sub-scanning direction. A scanning line 301 along the horizontal direction indicates an ideal linear scanning line which does not suffer any tilt or curvature. A scanning line 302 indicates an actual scanning line which suffers a tilt and curvature due to the aforementioned causes, and misregistration has occurred with respect to the ideal scanning line 301. FIG. 3 shows the scanning line on the photosensitive drum 22Y, but similar scanning lines are also formed on the photosensitive drums 22M, 22C, and 22K. When such tilts and curvatures (misregistration) of the scanning lines have occurred for the plurality of colors, relative positions of respective toner images deviate, that is, "color misregistration" consequently occurs when the toner images of the plurality of colors are transferred onto the intermediate transfer member 27 to be superposed on each other.

In this embodiment with reference to a left end (position A) of the scanning line on the photosensitive drum 22Y, differences between the ideal scanning line 301 and actual scanning line 302 at a center (position B) and right end (position C) are measured as deviation amounts eY1 and eY2 [mm] in the sub-scanning direction. Also, deviation amounts eM1, eM2, eC1, eC2, eK1, and eK2 on the photosensitive drums 22M, 22C, and 22K are similarly measured. As shown in FIG. 3, in association with the positions A, B, and C, the position B is used as a reference (0 [mm]), the position A is expressed by −L1 [mm], and the position C is expressed by +L2 [mm]. Also, points Pa, Pb, and Pc express scanning positions of the actual scanning line 302 measured in association with the positions A, B, and C in the sub-scanning direction.

In this embodiment, a region in the main scanning direction on each of the photosensitive drums 22Y, 22M, 22C, and 22K is divided into a plurality of regions with reference to the plurality of points Pa, Pb, and Pc, a region between Pa and Pb is defined as a region A, and that between Pb and Pc is defined as a region B. Then, (tilts) of scanning lines in the regions A and B are respectively approximated by lines Lab and Lbc obtained by applying linear interpolation to curves between Pa and Pb and between Pb and Pc. Based on a deviation amount difference between two points (eY1 for the region A, and eY2 −eY1 for the region B), a tilt of a scanning line of the corresponding region can be judged. For example, when a calculated difference assumes a positive value, a scanning line of the corresponding region has an upward-sloping tilt; when it assumes a negative value, the scanning line has a downward-sloping tilt.

<Arrangement and Operation of Image Processing Unit 40>

The arrangement and operation of an image processing unit 40 according to this embodiment will be described below with reference to FIG. 4. The image forming apparatus 10 executes, using the image processing unit 40, image processing for input image data, which includes a plurality of image data (color component data of Y, M, C, and K colors) corresponding to a plurality of colors, and is required to form a multi-color image. More specifically, the image processing unit 40 executes correction processing required to correct a tilt and curvature (misregistration) of a scanning line, and executes PWM based on image data which has undergone the correction processing, thus generating the aforementioned exposure control signal. The generated exposure control signal is used in exposure in the scanner units 24Y, 24M, 24C, and 24K. Furthermore, the image processing unit 40 executes, in advance, image processing for adjusting a color mixture state of an input image to the Y, M, C, and K image data (color component data) so as to eliminate color unevenness which may occur in an image to be formed due to the aforementioned correction processing.

Print data (PDL data, bitmap data, etc.) received by the image forming apparatus 10 from a host computer (not shown) or the like is input to the image processing unit 40. The print data input to the image processing unit 40 is input to an image generator 400. The image generator 400 executes rasterize processing for interpreting the contents of the input print data, and converting the print data into bitmap data. The image generator 400 sends raster images generated by the rasterize processing, that is, image signals (RGB signals) of respective color components R, G, and B, to a color conversion processor 401.

The color conversion processor 401 executes color matching processing for converting RGB signals into device RGB signals which match a color gamut of the image forming apparatus 10. Furthermore, the color conversion processor 401 executes color separation processing for converting the device RGB signals into YMCK signals (Y, M, C, and K image data) corresponding to toner colors of the image forming apparatus 10. Note that these color matching processing and color separation processing can be implemented by LOG conversion and calculations such as matrix calculations. Alternatively, a conversion table used to convert RGB signals of some representative points into YMCK signals may be held, and colors between these representative points may be calculated by interpolation, thus implementing the above processes.

An image adjustment unit 402 executes in advance image processing for adjusting a degree of juxtaposition color mixture of an input image to Y, M, C, and K image data (color component data) so as to eliminate color unevenness which may occur in the input image due to the correction processing of misregistration correction units 403. The "degree of juxtaposition color mixture" is a parameter indicating a color mixture (juxtaposition color mixture) state of an input image as a color mixture image including a plurality of images of different colors. In this embodiment, the degree of juxtaposition color mixture corresponds to a parameter which indicates a color mixture state when dots of respective colors, which are formed using pixel values (tone values) of the respective colors included in input image data are superposed on each other, and changes according to a degree of overlapping of dots of the respective colors. Note that details of the processing executed by the image adjustment unit 402 and the degree of juxtaposition color mixture will be described later.

The image adjustment unit 402 generates, for each pixel, a halftone (HT) flag bit indicating whether or not to apply halftone processing by halftone processors 406Y, 406M, 406C, and 406K to color component data after correction by misregistration correction units 403Y, 403M, 403C, and 403K. The HT flag bits are stored in bitmap memories 404Y, 404M, 404C, and 404K together with image data via the misregistration correction units 403Y, 403M, 403C, and 403K.

The misregistration correction units 403Y, 403M, 403C, and 403K apply coordinate conversion and adjustment of tone values (to be described later) to the Y, M, C, and K image data (color component data) input from the image adjustment unit 402 as correction processing for correcting the aforementioned tilt and curvature (misregistration) of the scanning line. As a result, the misregistration correction units 403Y, 403M, 403C, and 403K prevent transferred toner images from suffering color misregistration when toner images of respective colors are transferred onto the intermediate transfer member 27 and further onto the printing material 11. The misregistration correction units 403Y, 403M, 403C, and 403K store the Y, M, C, and K image data (color component data) after the correction processing in the bitmap memories 404Y, 404M, 404C, and 404K.

The bitmap memories 404Y, 404M, 404C, and 404K temporarily store image data corrected by the misregistration correction units 403Y, 403M, 403C, and 403K. Each of the bitmap memories 404Y, 404M, 404C, and 404K can store image data for one page. The image data stored in the bitmap memories 404Y, 404M, 404C, and 404K are read out in synchronism with Y, M, C, and K image generation (image formation or print) timings. The readout Y, M, C, and K image data are input to density correction processors 405Y, 405M, 405C, and 405K or exception processors 407Y, 407M, 407C, and 407K.

The density correction processors 405Y, 405M, 405C, and 405K and halftone processors 406Y, 406M, 406C, and 406K or exception processors 407Y, 407M, 407C, and 407K respectively apply processing to respective pixels of the image data stored in the bitmap memories 404Y, 404M, 404C, and 404K. Selectors 408Y, 408M, 408C, and 408K select the image data output from the halftone processors 406Y, 406M, 406C, and 406K or exception processors 407Y, 407M, 407C, and 407K for each pixel in accordance with the HT flag bits stored in the bitmap memories 404Y, 404M, 404C, and 404K. The selectors 408Y, 408M, 408C, and 408K further output the selected image data for respective pixels to PWM processors 409Y, 409M, 409C, and 409K.

The PWM processors 409Y, 409M, 409C, and 409K execute PWM processing based on the input image data. More specifically, the PWM processors 409Y, 409M, 409C, and 409K convert the input image data into exposure times TY, TM, TC, and TK of the scanner units 24Y, 24M, 24C, and 24K for each pixels and output the converted exposure times. Signals (exposure control signals) indicating the exposure times TY TM, TC, and TK for respective colors output from the PWM processors 409Y, 409M, 409C, and 409K are respectively input to the scanner units 24Y, 24M, 24C, and 24K. The scanner units 24Y, 24M, 24C, and 24K output laser beams in accordance with the exposure times TY, TM, TC, and TK indicated by the exposure control signals, thereby exposing and scanning the photosensitive drums 22Y, 22M, 22C, and 22K with these laser beams.

Note that in this embodiment, data for each pixel, which is stored in each of the bitmap memories 404Y, 404M, 404C, and 404K, is data of a total of 9 bits, that is, 8-bit image data and a 1-bit HT flag bit. Also, the density correction processors 405Y, 405M, 405C, and 405K output 8-bit data for respective colors, and the halftone processors 406Y, 406M, 406C, and 406K and exception processors 407Y, 407M, 407C, and 407K output 4-bit data for respective colors.

<Color Unevenness Caused by Misregistration Correction Processing>

When the correction processing by the misregistration correction units 403Y, 403M, 403C, and 403K is executed for input image data, the degree of overlapping of dots of different colors is changed, and respective dots may be changed to color mixture states of different color effects, as described above. Especially, when an input image is a fine pattern image, changes in color effects due to such changes in color mixture state may cause color unevenness that may lead to image quality deterioration in an image to be formed. Color unevenness which may occur in an image to be formed will be described in detail below with reference to FIGS. 26A to 26D and FIGS. 27A to 27E.

Figure 26A:
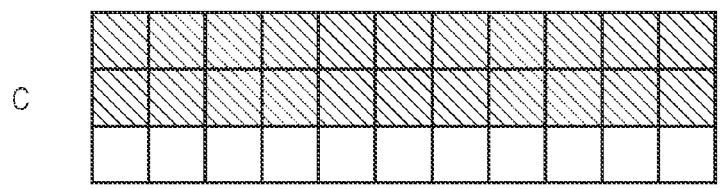
FIGS. 26A to 26D are views showing an example of color unevenness which may occur in a color mixture line image.
Figure 26B:
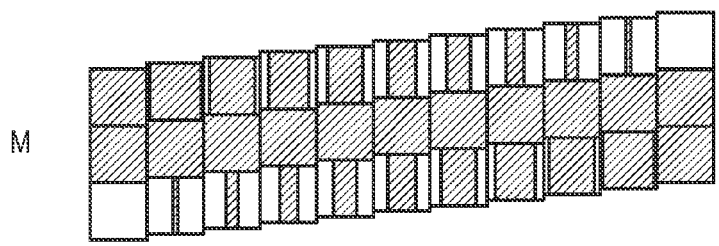

Color unevenness which may occur in a color mixture line image formed by superposing C and M line images will be described first with reference to FIGS. 26A to 26D. Assume that a misregistration of a formation position of an M image is corrected to have a formation position of a C image as a target position (ideal position) so as to correct color misregistration between C and M colors, for the sake of simplicity. FIGS. 26A and 26B respectively show C and M line images. Note that the correction processing of the misregistration correction units 403Y, 403M, 403C, and 403K is applied to the M line image shown in FIG. 26B. As shown in FIGS. 26A and 26B, the C and M line images do not suffer any density unevenness.

Figure 26C:
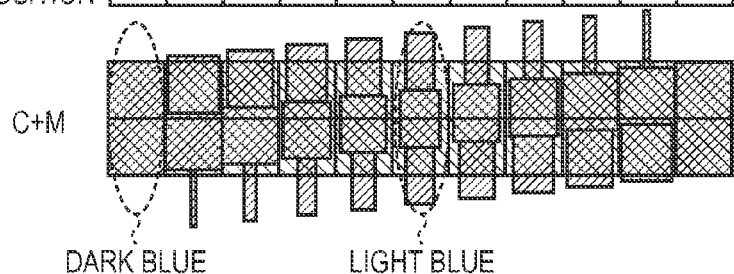

FIG. 26C shows a color mixture line image formed by superposing these C and M line images. In FIG. 26C, overlapping portions of C and M dots are indicated by black patterns. As shown in FIG. 26C, for example, C and M dots perfectly overlap each other at a scanning position p0. On the other hand, C and M dots partially overlap each other at a scanning position p5, and an area of an overlapping portion is about 60% of an area for two dots. That is, a color mixture state based on subtractive color mixture is formed at the scanning position p0, while that based on juxtaposition color mixture is formed at the scanning position P5.

Figure 26D:
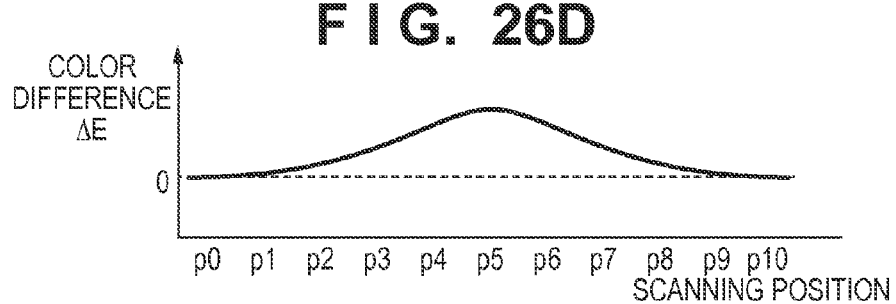

In this manner, as a result of the correction processing of the misregistration correction units 403Y, 403M, 403C, and 403K, since color mixture states of dots are changed to different states according to scanning positions, such changes can produce different color differences ΔE according to the scanning positions, as shown in FIG. 26D. Note that the color difference ΔE corresponds to a distance between positions of two colors on a Lab coordinate space called a uniform color space, and is an index which qualitatively indicates a difference between colors observed by human eyes. (Note that a target color at the time of color mixture is that at the scanning position p0 as an ideal dot shape, and ΔE is calculated as a difference from the color at this position p0.) In general, an overlapping state of C and M dots like the scanning position p0 is called subtractive color mixture, and provides a color effect of dark blue. On the other hand, a state in which C and M dots are at least partially juxtaposed like the scanning position p5 is called juxtaposition color mixture, and provides a color effect of light blue according to a degree of juxtaposition (an area of a portion where dots do not overlap).

Figure 27A:
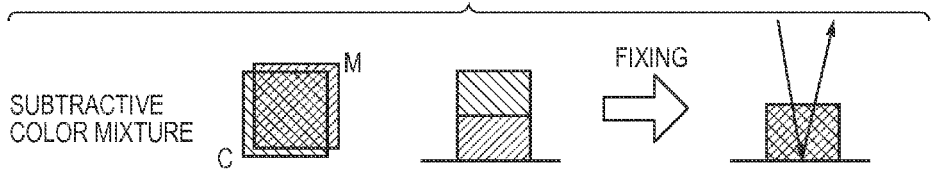
FIGS. 27A to 27E are views showing differences of color effects by subtractive color mixture and juxtaposition color mixture.
Figure 27B:
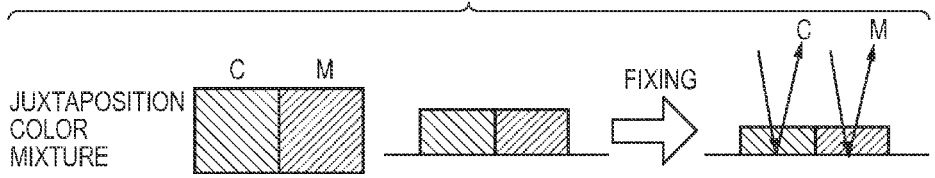
Figure 27C:
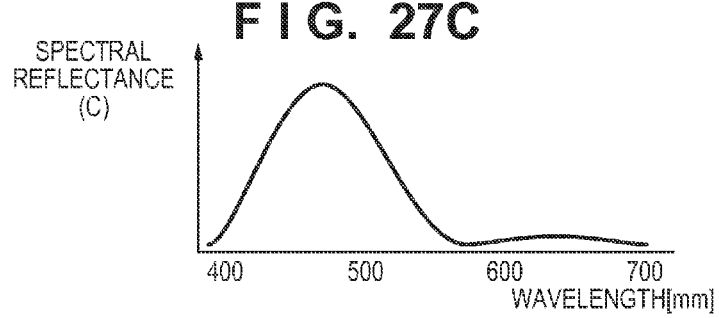
Figure 27D:
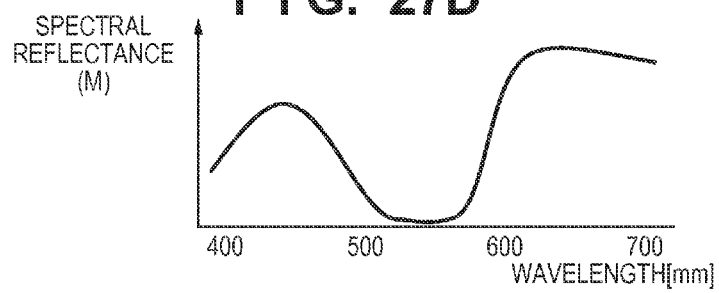

The color effect differences based on the aforementioned subtractive color mixture and juxtaposition color mixture will be described below with reference to FIGS. 27A to 27E. FIG. 27A shows a state in which C and M dots overlap each other (subtractive color mixture), and FIG. 27B shows a state in which C and M dots are juxtaposed (juxtaposition color mixture). In case of FIG. 27A, the fixing processing of the fixing unit 30 melts and compresses toner layers of respective colors on a printing material to mix these colors appropriately, thereby forming a dot. On the other hand, in case of FIG. 27B, the fixing processing melts and compresses toner layers of respective colors on a printing material, thus forming a dot without mixing toners of the respective colors. FIGS. 27C and 27D respectively show C and M spectral reflectances, and correspond to unicolor color characteristics of C and M colors. On the other hand, FIG. 27E shows spectral reflectances corresponding to the subtractive color mixture in FIG. 27A.

Figure 27E:
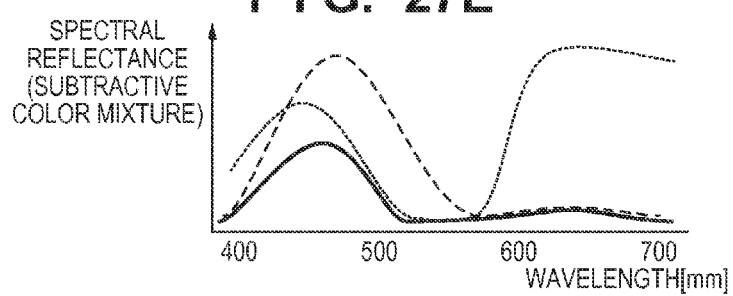

In case of the subtractive color mixture, due to an light absorption effect of mixed colors (C and M), the spectral reflectances corresponding to the subtractive color mixture are obtained by multiplying those of the C and M colors for respective wavelengths, as shown in FIG. 27E. On the other hand, in case of the juxtaposition color mixture, due to a mixing effect of reflected light rays from C and M dots, the spectral reflectances corresponding to the juxtaposition color mixture are obtained by adding those shown in FIGS. 27C and 27D for respective wavelengths.

Color reproduction differences by these subtractive color mixture and juxtaposition color mixture appear as lightness, saturation, and hue differences. For example, as for lightness, a color obtained by the juxtaposition color mixture of two colors assumes an average lightness value between the two colors, while a color obtained by the subtractive color mixture of two colors becomes a color darker than these two colors. For this reason, in the color mixture state based on the subtractive color mixture and that based on the juxtaposition color mixture, even when toners of the respective colors are applied on a printing material by the same amounts, their appearances are different. Likewise, as for saturation and hue, a color obtained by the subtractive color mixture is different from that obtained by the juxtaposition color mixture. In this manner, since the different color mixture states have different color effects, a color mixture image obtained by superposing images of a plurality of colors appears to have different colors for human eyes depending on the color mixture states.

Therefore, when a color mixture image is formed by superposing images of different colors to which the correction processing of the misregistration correction units 403Y, 403M, 403C, and 403K is applied, color mixture states may be changed to those having different color effects according to scanning positions, as shown in FIGS. 26C and 26D. As a result, changes in color effects caused by changes in color mixture state produced along the main scanning direction are visualized as changes in color. As described above, when an input image is a fine pattern image, such changes in color appear as stripe-like color unevenness, thus deteriorating image quality of an image to be formed. Especially, when an input image is in a state in which fine patterns of different colors perfectly overlap each other (a degree of juxtaposition color mixture (to be described later)=0%) or in a state in which fine patterns of different colors do not overlap at all (a degree of juxtaposition color mixture (to be described later)=100%), such color unevenness readily occurs.

As will be described in detail below, in this embodiment, in order to eliminate occurrence of such color unevenness, the image adjustment unit 402 applies image processing for adjusting color mixture states of an input image to input image data.

<Arrangement and Operation of Image Adjustment Unit 402>

The arrangement and operation of the image adjustment unit 402 will be described in detail below with reference to FIG. 1. FIG. 1 is a block diagram showing the arrangement of the image adjustment unit 402 according to this embodiment. As shown in FIG. 1, the image adjustment unit 402 includes bitmap memories 101Y, 101M, 101C, and 101K, a juxtaposition color mixture degree calculator 102, pattern detectors 103Y, 103M, 103C, and 103K, filter processors 104Y, 104M, 104C, and 104K, and bitmap memories 105Y, 105M, 105C, and 105K.

Y, M, C, and K image data (color component data) input from the color conversion processor 401 to the image adjustment unit 402 are temporarily stored in the bitmap memories 101Y, 101M, 101C, and 101K. Each of data of respective pixels stored in the bitmap memories 101Y, 101M, 101C, and 101K is 8-bit image data. On the other hand, each of data of respective pixels stored in the bitmap memories 105Y, 105M, 105C, and 105K is data of a total of 9 bits, that is, 8-bit image data and a 1-bit HT flag bit as in the bit map memory 404. The bitmap memories 105Y, 105M, 105C, and 105K temporarily store image data for one page, which have undergone filter processing required to adjust a degree of juxtaposition color mixture.

(Sequence of Image Processing in Image Adjustment Unit 402)

Figure 13:
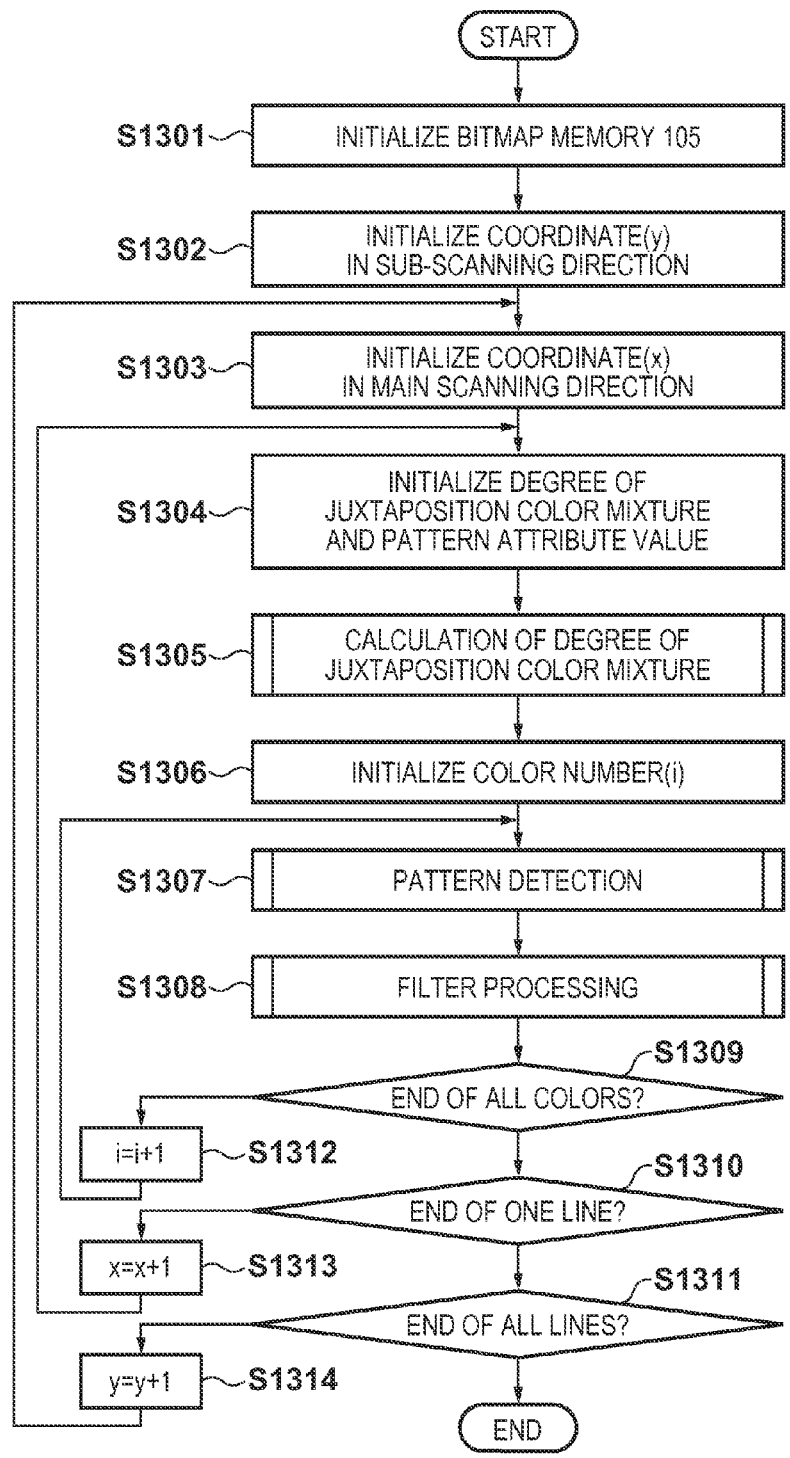
FIG. 13 is a flowchart showing the sequence of image adjustment processing executed by the image adjustment unit 402 according to the first embodiment of the present invention.

The overall sequence of the image processing required to adjust a degree of juxtaposition color mixture of input image data, which is executed by the image adjustment unit 402 according to this embodiment, will be described below with reference to the flowchart of FIG. 13. Note that FIG. 13 is commonly used in the second to fourth embodiments.

In step S1301, the image adjustment unit 402 initializes storage areas of input image data and HT flag bits in the bitmap memories 101Y, 101M, 101C, and 101K at the beginning of image formation. In this case, each HT flag bit is initialized to 0. Let x and y be coordinates in the main scanning direction and sub-scanning direction, which indicate a position of a pixel to be processed (target pixel). Next, the image adjustment unit 402 initializes a coordinate y in the sub-scanning direction, which indicates the target pixel, in step S1302, and then initializes the coordinate x in the main scanning direction, which indicates the target pixel, in step S1303. Then, the image adjustment unit 402 starts processing for one line (main scanning line).

Upon starting the processing for one line, the image adjustment unit 402 initializes a degree of juxtaposition color mixture and pattern attribute values of respective colors in the target pixel to be processed by the juxtaposition color mixture degree calculator 102 and pattern detectors 103Y, 103M, 103C, and 103K in step S1304. After that, in step S1305, the juxtaposition color mixture degree calculator 102 calculates a degree of juxtaposition color mixture for each pixel of image data (color component data) in the bitmap memories 101Y, 101M, 101C, and 101K. In this embodiment, the juxtaposition color mixture degree calculator 102 executes processing for calculating a degree of juxtaposition color mixture for a target pixel (x, y) in predetermined areas defined for the target pixel in association with image data (color component data) in the bitmap memories 101Y, 101M, 101C, and 101K, as will be described later.

Next, in step S1306, the image adjustment unit 402 initializes a color number i to execute processes of steps S1307 and S1308 for each of Y, M, C, and K colors. In step S1307, the pattern detectors 103Y, 103M, 103C, and 103K detect a specific pattern from input image data (color component data of respective colors) stored in the bitmap memories 101Y, 101M, 101C, and 101K and detect pixels corresponding to the specific pattern.

Furthermore, in step S1308, the filter processors 104Y, 104M, 104C, and 104K apply filter processing to the target pixel (x, y) in the input image data as needed based on information output form the juxtaposition color mixture degree calculator 102 and pattern detectors 103Y, 103M, 103C, and 103K. As will be described later, this filter processing is image processing required to adjust a degree of juxtaposition color mixture of each pixel in the input image data. The filter processors 104Y, 104M, 104C, and 104K specify a pixel which corresponds to the specific pattern detected in step S1307 and has a degree of juxtaposition color mixture which is calculated in step S1305 and falls outside a predetermined proper range. Furthermore, the filter processors 104Y, 104M, 104C, and 104K apply filter processing required to adjust the degree of juxtaposition color mixture indicating a color mixture state of the specified pixel to fall within the predetermined proper range to the input image data.

The filter processors 104Y, 104M, 104C, and 104K store image data after the filter processing in the bitmap memories 105Y, 105M, 105C, and 105K. Also, the filter processors 104Y, 104M, 104C, and 104K output information indicating whether or not to execute the filter processing for each pixel of the input image data as an HT flag bit (ON or OFF). This HT flag bit is stored in the bitmap memories 105Y, 105M, 105C, and 105K together with the image data.

After that, the image adjustment unit 402 determines in step S1309 whether or not the processes (steps S1307 and S1308) of the target pixel (x, Y) are complete for all the Y, M, C, and K colors. If the processes are complete, the process advances to step S1310; otherwise, the process advances to step S1312. In step S1312, the image adjustment unit 402 increments the color number i by 1 to execute the processes of steps S1307 and S1308 for the next color.

If the processes of all the colors are complete for the target pixel (x, y), the image adjustment unit 402 determines in step S1310 whether or not the processes of steps S1304 to S1309 are complete for all pixels included in one line. If the processes are complete, the image adjustment unit 402 advances the process to step S1311; otherwise, it advances the process to step S1313. In step S1313, the image adjustment unit 402 increments the coordinate x indicating the position of the target pixel in the main scanning direction by 1 to select a neighboring pixel as the target pixel, and executes the processes in step S1304 and subsequent steps again.

The image adjustment unit 402 determines in step S1311 whether or not the processes of steps S1303 to S1310 are complete for data of all lines included in the input image data. If the processes are not complete for all the lines yet, the image adjustment unit 402 advances the process to step S1314 to increment the coordinate y indicating the position of the target pixel in the sub-scanning direction by 1. Then, the image adjustment unit 402 executes the processes of step S1303 and subsequent steps for the next line again. On the other hand, if the processes are complete for all the lines, the image adjustment unit 402 ends the series of image processes required to adjust the degrees of juxtaposition color mixture.

Processes respectively executed by the juxtaposition color mixture degree calculator 102, pattern detectors 103Y, 103M, 103C, and 103K, and filter processors 104Y, 104M, 104C, and 104K will be described in detail below. Assume that "dot", "line", or "pixel" indicates a unit of a resolution of the image forming apparatus 10 and an upper left end of an image is defined as coordinates of an origin, unless otherwise specified.

(Juxtaposition Color Mixture Degree Calculator 102)

The operation of the juxtaposition color mixture degree calculator 102 (step S1305) will be described below with reference to FIGS. 6 to 8B.

The juxtaposition color mixture degree calculator 102 calculates a degree of juxtaposition color mixture for each pixel of the input image data in the bitmap memories 101Y, 101M, 101C, and 101K. In this embodiment, the juxtaposition color mixture degree calculator 102 calculates a degree of juxtaposition color mixture indicating a color mixture state between specific two colors of image data (color component data) included in the input image data using image data corresponding to the specific two colors.

As described above, in pixels having extremely low or high degrees of juxtaposition color mixture, especially, in pixels in which dots perfectly overlap each other (a degree of juxtaposition color mixture=0%) and in pixels in which dots do not overlap conversely (a degree of juxtaposition color mixture=100%), color unevenness readily occurs due to color effects according to color mixture states. In this embodiment, the juxtaposition color mixture degree calculator 102 calculates such degrees of juxtaposition color mixture in the input image data for respective pixels. When degrees of juxtaposition color mixture are calculated for all combinations among four colors, the calculation processing is complicated. Hence, in this embodiment, a degree of juxtaposition color mixture between specific two colors to simplify the calculation processing, as will be described below.

In the image forming apparatus 10, in order to stably fix a multi-color toner image obtained by superposing toner images of four colors on a printing material by the fixing unit 30, normally, toner amounts of four colors to be fixed are locally limited. For example, by limiting a total of tone values (assume that a maximum value=255 of a tone value of each color is 100%) of respective colors to be not more than a predetermined limit value (for example, 250%) for each pixel, a toner amount upon superposing toners of respective colors is limited. For example, when a C tone value=255 (100%), an M tone value=230 (90%), a Y tone value=153 (60%), and a K tone value=0 (0%), their total amounts to 250%. Processing for limiting a toner amount (a total of tone values) in this way is executed by the color conversion processor 401. For this reason, the total of tone values of each pixel in image data stored in the bitmap memories 101Y, 101M, 101C, and 101K has already been limited to be not more than the predetermined limit value (250%).

In general, color unevenness caused by color effects according to the color mixture states tends to be conspicuous in a fine pattern image in which two out of a plurality of colors such as blue, red, and green are dominant (that is, they have large tone values). In such an image, even when the third color other than these two colors is a color biased to the shadow side, the third color is likely to be limited to a considerably low tone value (low density) due to the aforementioned limitation of the toner value. For this reason, a case will be described below as an example of the calculation processing of a degree of juxtaposition color mixture, wherein a degree of juxtaposition color mixture between the top two colors having higher densities (larger tone values) of combinations of four colors is calculated, and image adjustment is executed based on the calculated degree of juxtaposition color mixture.

Figures 1, 9A:
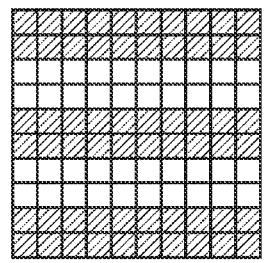
Figures 3, 9A:
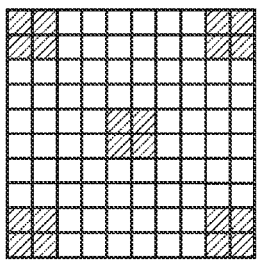

The calculation processing of a degree of juxtaposition color mixture, which is executed by the juxtaposition color mixture degree calculator 102 in step S1305, will be described below with reference to FIG. 6. In step S601, the juxtaposition color mixture degree calculator 102 calculates tone integral values (first integral values) by integrating tone values of pixels included in predetermined target areas 701Y, 701M, 701C, and 701K having a target pixel (x, y) as the center for respective colors using image data stored in the bitmap memories 101Y, 101M, 101C, and 101K. The target areas 701Y, 701M, 701C, and 701K correspond to predetermined ranges which are defined for the target pixel (x, y) and include the target pixel.

FIG. 7 shows a case in which a range of 13 pixels×13 pixels (main scanning direction x sub-scanning direction) to have a target pixel 700 as the center is set for the target pixel 700 as the target areas 701Y, 701M, 701C, and 701K. As shown in FIG. 7, C, M, and Y image data are image data of a fine pattern image which includes lines along the main scanning direction (lateral direction) in short cycles. In each dot of a line portion, C and M tone values=255 (100%), and a Y tone value=128 (50%). Also, in C and M images, dots of each line portion perfectly overlap each other, a Y image is shifted by one dot from the C and M images in the sub-scanning direction, and dots of the line portion of the Y image only partially overlap those of the line portion of the C and M images.

In step S601, the juxtaposition color mixture degree calculator 102 calculates tone integral values of respective colors by integrating tone values of all pixels included in the target areas 701Y, 701M, 701C, and 701K. In FIG. 7, Y, M, C, and K tone integral values=8320, 19890, 19890, and 0 are obtained by such integration.

Next, in step S602, the juxtaposition color mixture degree calculator 102 decides the top two colors whose calculated tone integral values are large as specific two colors as calculation targets of a degree of juxtaposition color mixture. In case of FIG. 7, C and M colors are the top two colors whose tone integral values are large. For this reason, in step S603 and subsequent steps, using the C and M colors as a combination of calculation targets of a degree of juxtaposition color mixture, a degree of juxtaposition color mixture between the C and M colors of the target pixel is calculated. In step S603, the juxtaposition color mixture degree calculator 102 calculates absolute differences between tone values for respective pixels, and calculates a tone integral value of the absolute differences between the two colors as the calculation targets.

Figure 8A:
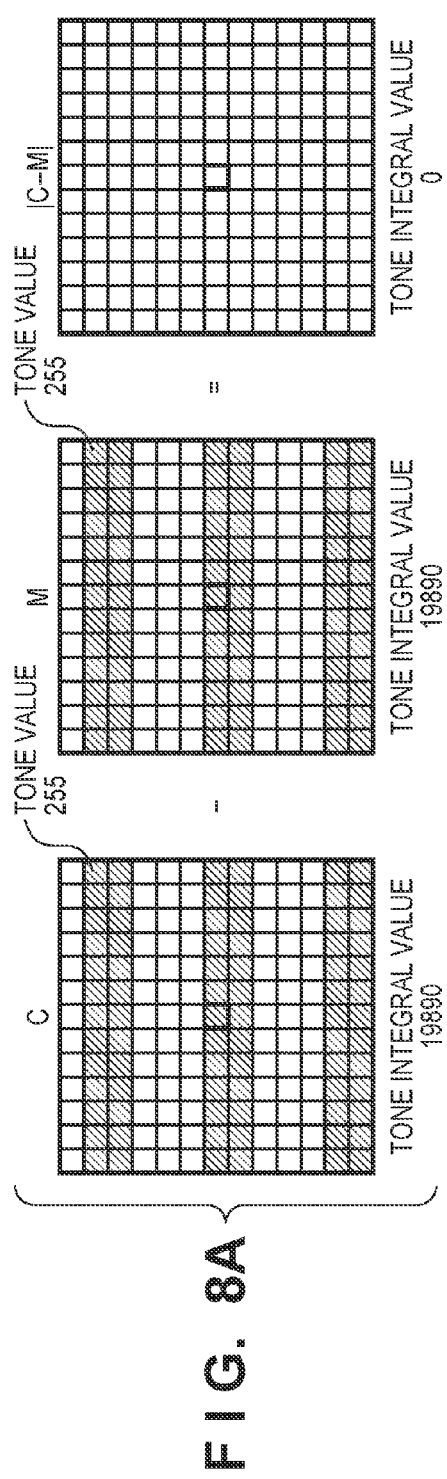
FIGS. 8A and 8B are views showing an example of the calculation processing of a degree of juxtaposition color mixture according to the first embodiment of the present invention.

For example, the juxtaposition color mixture degree calculator 102 calculates differences between tone values for respective pixels in the target areas in C and M image data as calculation targets, and then calculates absolute values of the differences (absolute differences), as shown in FIG. 8A. Furthermore, the juxtaposition color mixture degree calculator 102 integrates all the calculated absolute values of the differences to calculate a tone integral value (second integral value). As shown in FIG. 8A, the tone integral value of the difference image between the C and M colors is 0. By calculating the absolute differences in this way, dots in a state in which dots are shifted between two colors (when dots of two colors are superposed, a dot of one color protrudes from that of the other color) (that is, a juxtaposition color mixture state) can be detected. Also, by calculating an integral of the absolute differences, an index indicating a degree of juxtaposition color mixture of dots in a color mixture state can be obtained.

In step S604, the juxtaposition color mixture degree calculator 102 calculates a degree of juxtaposition color mixture using:

Degree of juxtaposition color mixture=(tone integral value of absolute differences between two colors)/(sum of tone integral values of two colors) For example, in the image shown in FIG. 7, the degree of juxtaposition color mixture for the target pixel is calculated as:

Degree of juxtaposition color mixture=0/(19890+19890)=0

This degree of juxtaposition color mixture indicates that line portions of the C and M images perfectly overlap each other in the target areas defined for the target pixel. A fine pattern image having an extremely low degree of juxtaposition color mixture in this way is in a color mixture state in which color unevenness readily occurs in an image to be formed when an image is actually formed on a printing material.

Figure 8B:
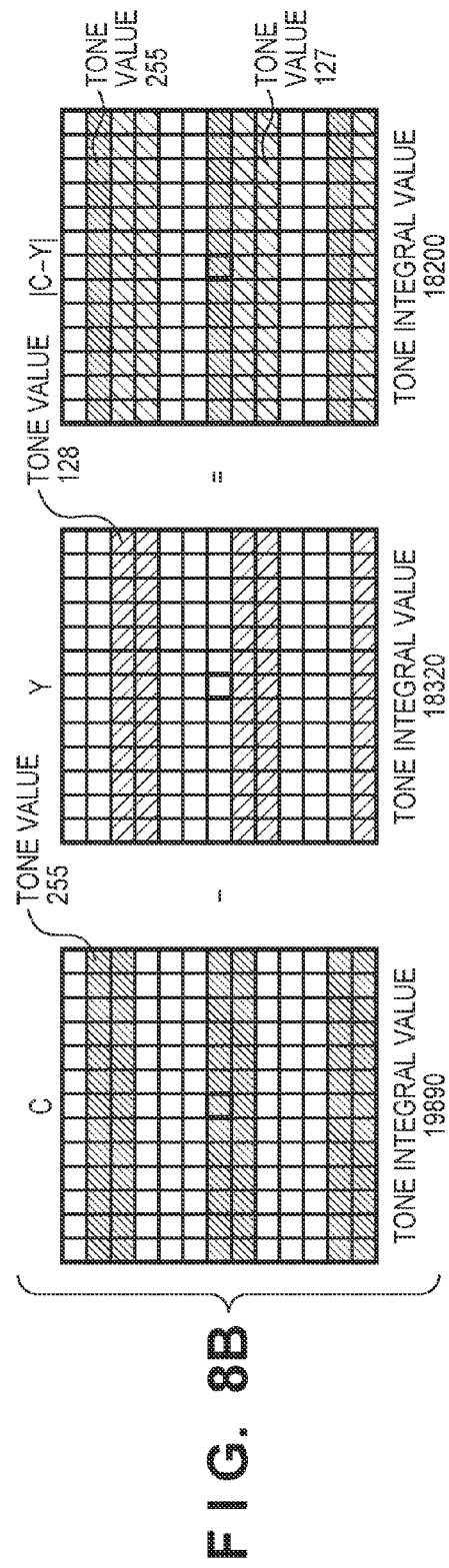

On the other hand, in FIG. 7, when M image data is the same as K image data (that is, tone values of all pixels in the target area 701M are 0), the degree of juxtaposition color mixture is as follows. In this case, in step S602, C and Y image data are decided as calculation targets of a degree of juxtaposition color mixture. Thus, calculation results of the absolute differences and their tone integral values in step S603 are as shown in FIG. 8B. Furthermore, in step S604, a degree of juxtaposition color mixture between the C and M colors is calculated as:

Degree of juxtaposition color mixture=18200/(19890+8320)≈65[%]

This degree of juxtaposition color mixture indicates a color mixture state in which line portions of the C and M images partially overlap each other in the target areas defined for the target pixels, and the juxtaposition color mixture and subtractive color mixture are done at equal ratios. That is, such fine pattern image is in a color mixture state in which color unevenness hardly occurs in an image to be formed when an image is actually formed on a printing material.

Finally, in step S605, the juxtaposition color mixture degree calculator 102 outputs the degree of juxtaposition color mixture calculated for the target pixel to the filter processors 104Y, 104M, 104C, and 104K. The following description will be given under the assumption that, for example, the juxtaposition color mixture degree calculator 102 outputs an integer value (0 to 100%) obtained by rounding off decimal fractions of the degree of juxtaposition color mixture calculated in step S604.

Note that the definition and calculation method of the degree of juxtaposition color mixture are not limited those described above, and any other definitions and calculation methods may be used as long as they indicate a color mixture state (based on the juxtaposition color mixture) between images of two or more colors. In this embodiment, as described above, the top two colors including a large number of dots of higher densities in an input image are decided (step S602), and these colors are selected as calculation targets of a degree of juxtaposition color mixture. However, a degree of juxtaposition color mixture between two colors may be calculated for every combinations of two out of four colors, and a degree of juxtaposition color mixture to be finally output may be selected from a plurality of degrees of juxtaposition color mixture. Alternatively, in place of calculating degrees of juxtaposition color mixture for every combinations, two colors which may readily cause color unevenness in an image to be formed when a fine pattern is included may be selected in advance (for example, C and M colors), and a degree of juxtaposition color mixture between these two colors may be calculated. Also, the size of the aforementioned target area is not limited to 13 pixels×13 pixels, but an arbitrary size can be set.

(Pattern Detectors 103Y, 103M, 103C, and 103K)

Figure 12:
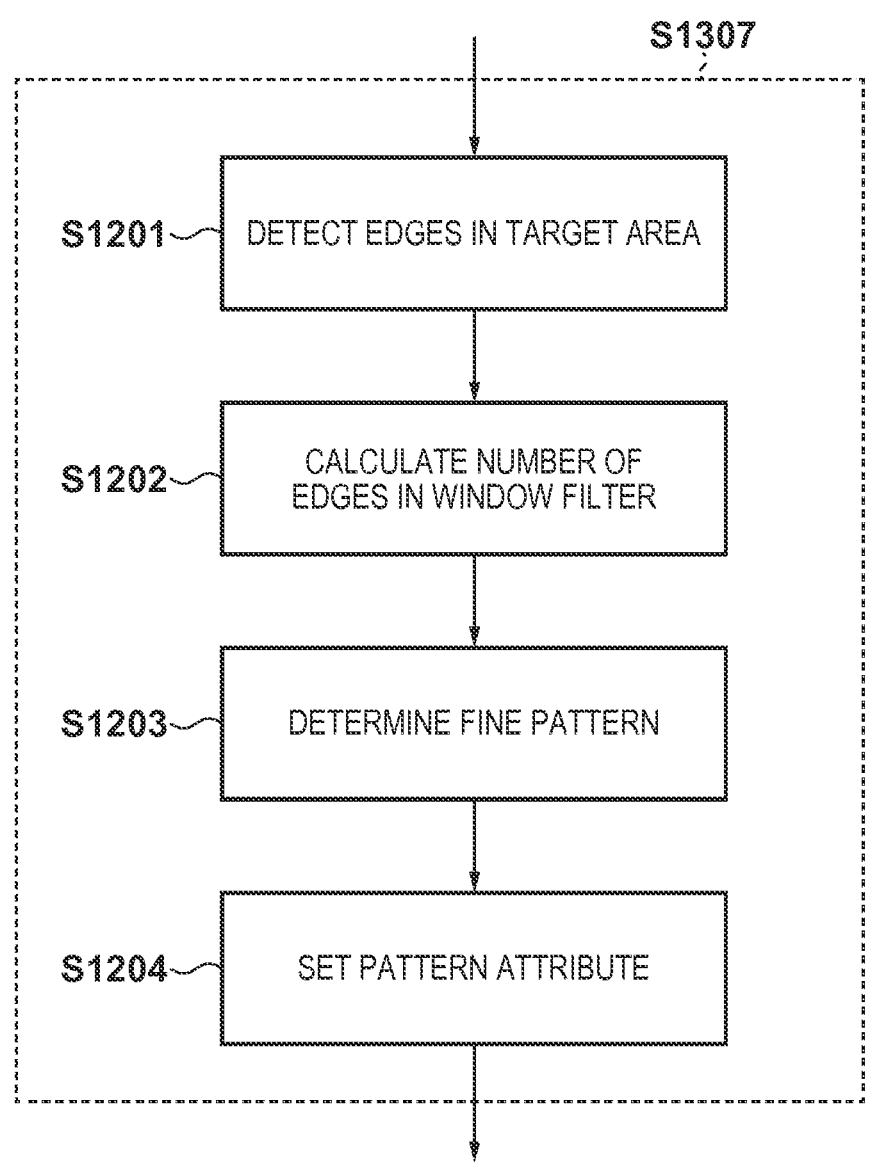
FIG. 12 is a flowchart showing the sequence of specific pattern detection processing (step S1307) executed by pattern detectors 103Y, 103M, 103C, and 103K according to the first embodiment of the present invention.

The operation (step S1307) of the pattern detectors 103Y, 103M, 103C, and 103K will be described below with reference to FIGS. 9A-1 to 12.

The pattern detectors 103Y, 103M, 103C, and 103K execute processing for determining whether or not input image data of respective colors, which are stored in the bitmap memories 101Y, 101M, 101C, and 101K, include a specific pattern (fine pattern) in step S1307. As described above, when misregistration correction processing (to be described later) is applied to a fine pattern image including a regular pattern like images shown in FIGS. 9A-1 to 9A-6, color unevenness may occur in an output image (image to be formed) according to a degree of juxtaposition color mixture. On the other hand, when the misregistration correction processing (to be described later) is applied to an image including isolated thin line like images shown in FIGS. 9B-1 to 9B-6, an output image having high quality can be obtained without causing any color unevenness.

Hence, in this embodiment, the pattern detectors 103Y, 103M, 103C, and 103K detect a specific pattern as a cause of color unevenness from an input image (image data in the bitmap memories 101Y, 101M, 101C, and 101K). More specifically, the pattern detectors 103Y, 103M, 103C, and 103K determine whether or not each pixel included in an input image is a part of a fine pattern image including a specific pattern (regular pattern). The pattern detectors 103Y, 103M, 103C, and 103K set a pattern attribute to be ON for pixels as a part of a fine pattern image, and set a pattern attribute to be OFF for other pixels.

The operation of the pattern detector 103Y will be described below with reference to the flowchart shown in FIG. 12. Note that the operations of the pattern detectors 103M, 103C, and 103K are the same as that of the pattern detector 103Y, and a description thereof will not be given.

A target area 1001 in FIG. 10 shows an extracted image of 1 pixel×20 pixels (main scanning direction×sub-scanning direction), and data Y0 are tone values (0 to 255) of Y color. In step S1201, the pattern detector 103Y detects edges of images included in the target area 1001. The pattern detector 103Y generates values Y1, Y2, Y3, and Y4 from the image data Y0 in the target area 1001, as shown in FIG. 10.

Each value Y1 is obtained by calculating an absolute value of a difference between a tone value of a target pixel and that of an upward neighboring pixel, and binarizing the absolute value. This binarization is attained by, for example, setting the value Y1 to be 1 if the absolute value of the difference is not less than 128, and setting the value Y1 to be 0 if the difference is less than 128. Each value Y2 is obtained by calculating an absolute value of a difference between the tone value of the target pixel and that of a downward neighboring pixel, and binarizing the absolute value. This binarization can be attained in the same manner as the values Y1. Each value Y3 is an logical sum (OR) between the values Y1 and Y2. Y3 corresponds to an edge portion of an image. Each value Y4 is the number of pixels having the values Y3=1 (edge portion) in a window filter 1003 which includes the target pixel and the predetermined numbers of pixels above and below the target pixels. In FIG. 10, the predetermined number of pixels is 6, and the window filter 1003 including 1 pixel×13 pixels (main scanning direction x sub-scanning direction) is used.

In step S1202, the pattern detector 103Y calculates the number of edge portions of images (to be referred to as "number of edges" hereinafter) included in the window filter 1003. This processing corresponds to that for calculating each value Y4 in FIG. 10. Furthermore, the pattern detector 103Y determines based on the values Y4 in step S1203 whether or not an image corresponding to the input image data stored in the bitmap memory 101Y includes a specific pattern (that is, whether or not the target pixel is a part of the specific pattern). In this embodiment, if the value Y4 of the target pixel is not less than 5 (Y4≥5), the pattern detector 103Y determines that the target pixel is a part of the specific pattern. On the other hand, if the value Y4 of the target pixel is less than 5 (Y4<5), the pattern detector 103Y determines that the target pixel is not a part of the specific pattern. In this manner, the pattern detector 103Y determines whether or not an input image includes a specific pattern by checking whether or not the input image include edge portions at a high density.

In step S1204, the pattern detector 103Y sets a pattern attribute for the target pixel, and notifies the filter processor 104Y of a pattern attribute value. In this embodiment, when the target pixel is a part of the specific pattern, the pattern detector 103Y notifies a pattern attribute value=1; when the target pixel is not a part of the specific pattern, it notifies a pattern attribute value=0.

For example, a target pixel 1002 in FIG. 10 has a tone value of 0, a pixel adjacent to the target pixel 102 upward has a pixel value of 255, and a pixel adjacent to the target pixel 102 downward has a pixel value of 0. This makes it possible to provide Y1=1, Y2=0, and Y3=1. Since seven pixels each having Y3=1 are included in a window filter 1003, Y4=7. The target pixel 1002 holds Y4≥5, so the pattern detector 103Y determines that the target pixel 1002 is a part of the specific pattern. The pattern detector notifies the filter processor 104Y of a pattern attribute value of the target pixel 1002=1.

In FIG. 10, a threshold required to determine based on the value Y4 whether or not the target pixel is a part of the specific pattern (fine pattern) is set to be 5. This is because Y4≥5 normally holds for a pixel which forms a fine image which is arranged at short intervals or that which forms a (fine) dot pattern having a high spatial frequency, as shown in FIG. 10. On the other hand, Y4≤4 normally holds for either of a pixel which forms an isolated fine line or that which forms a (coarse) dot pattern having a low spatial frequency, as shown in FIG. 11. Using such threshold in determination based on the value Y4, an image including an isolated thin line or coarse dot pattern and a fine pattern image including a specific pattern (fine pattern) can be easily distinguished from each other.

However, as the threshold used in the binarization for the values Y2 and Y3, a value other than 128 may be used. Also, the threshold used in determination based on the value Y4 may be set to match required image quality, and is not limited to 5 alone. The window filter size is not limited to 1 pixel×13 pixels, and an arbitrary size can be set. The sizes of the window filters and determination thresholds respectively used by the pattern detectors 103Y, 103M, 103C, and 103K may be different for respective colors in consideration that patterns which readily cause color unevenness may be different for respective colors.

(Filter Processors 104Y, 104M, 104C, and 104K)

The operation (step S1308) of the filter processors 104Y, 104M, 104C, and 104K will be described below with reference to FIGS. 14 to 17.

The filter processors 104Y, 104M, 104C, and 104K execute processing for adjusting the degrees of juxtaposition color mixture of the input image based on information (degrees of juxtaposition color mixture and pattern attributes) obtained by the juxtaposition color mixture calculator 102 and pattern detectors 103Y, 103M, 103C, and 103K. In this embodiment, the filter processors 104Y, 104M, 104C, and 104K execute, as image processing for the input image data, blur processing using a blur amount which can adjust, within a predetermined appropriate range, the degree of juxtaposition color mixture indicating the color mixture state of a pixel (target pixel) corresponding to the detected specific pattern. This blur processing is executed when the degree of juxtaposition color mixture calculated for the target pixel falls outside the predetermined appropriate range.

The filter processors 104Y, 104M, 104C, and 104K receive the degrees of juxtaposition color mixture and pattern attributes respectively from the juxtaposition color mixture degree calculator 102 and pattern detectors 103Y, 103M, 103C, and 103K, and also receive image data stored in the bitmap memories 101Y, 101M, 101C, and 101K. Also, the filter processors 104Y, 104M, 104C, and 104K output and store image data obtained as a result of the filter processing for respective pixels to and in the bitmap memories 105Y, 105M, 105C, and 105K together with HT flag bits.

The operation (step S1308) of the filter processor 104Y will be described below according to the flowchart shown in FIG. 14. Note that the operations of the filter processors 104M, 104C, and 104K are the same as that of the filter processor 104Y, and a description thereof will not be given.

The filter processor 104Y determines in step S1401 based on a pattern attribute value notified from the pattern detector 103Y whether or not filter processing for adjusting a degree of juxtaposition color mixture is required to be applied to image data of the target pixel. If the filter processor 104Y determines that the filter processing is required (pattern attribute value=1), the process advances to step S1402; otherwise (pattern attribute value=0), the process advances to step S1405.

If the pattern attribute value=0 and the target pixel is not a part of the fine pattern, even when the degree of juxtaposition color mixture assumes an (extremely low or high) value close to 0% or 100%, color unevenness is unlikely to occur at that target pixel. For this reason, the filter processor 104Y outputs image data at coordinates (x, y) corresponding to the target pixel to the bitmap memory 105Y intact without applying the filter processing to that image data in step S1405. Furthermore, the filter processor 104Y sets an HT flag bit=1 and outputs and stores that flag to and in the bitmap memory 105Y in step S1406. The HT flag bit=1 indicates that processes in the density correction processor 405Y and halftone processor 406Y are to be executed.

When the process advances from step S1401 to step S1402, the filter processor 104Y determines in step S1402 based on the degree of juxtaposition color mixture calculated by the juxtaposition color mixture degree calculator 102 whether or not the filter processing for adjusting the degree of juxtaposition color mixture is required for the target pixel. As described above, color unevenness readily occurs in a pixel, a degree of juxtaposition color mixture of which assumes an extremely low or high value. In such case, in this embodiment, the filter processing for adjusting the degree of juxtaposition color mixture is applied to image data of such pixel.

More specifically, the filter processor 104Y determines in step S1402 whether or not the calculated degree of juxtaposition color mixture falls within the predetermined appropriate range which does not require the filter processing. In this embodiment, it is determined that the degree of juxtaposition color mixture falls within the predetermined appropriate range when 15%<degree of juxtaposition color mixture<85%. If the degree of juxtaposition color mixture of the target pixel falls within the predetermined appropriate range, the filter processor 104Y advances the process to step S1405. That is, even when it is estimated that the pixel is a part of a fine pattern, since color unevenness caused by the juxtaposition color mixture is unlikely to occur, the filter processing is skipped.

On the other hand, if the degree of juxtaposition color mixture of the target pixel falls outside the predetermined appropriate range (that is, if the degree of juxtaposition color mixture is not more than 15% or it is not less than 85%), the filter processor 104Y advances the process to step S1403. In this case, color unevenness caused by the juxtaposition color mixture is likely to occur in that pixel. Therefore, in step S1403, the filter processor 104Y applies, to image data of the target pixel, filter processing for adjusting the degree of juxtaposition color mixture of the target pixel to that which is unlikely to cause color unevenness (to fall within the predetermined appropriate range). In this manner, in steps S1401 and S1402 of this embodiment, the filter processor 104Y functions as an example of a specifying unit. Also, in step S1403, the filter processor 104Y functions as an example of an execution unit.

The filter processing executed by the filter processor 104Y in step S1403 will be described in more detail below. In this embodiment, in step S1403, the filter processor 104Y executes the filter processing using a filter having a blur effect to have the target pixel and its neighboring pixels as targets. More specifically, the filter processor 104Y uses a Gaussian filter, a blur amount B of which is adjustable. The filter processor 104Y applies the filter processing to image data (pixel value) at coordinates (x, y) corresponding to the target pixel using filter coefficients corresponding to the blur amount B, which is set in advance. In case of the Gaussian filter (Gauss filter), the filter coefficients are set to assume values corresponding to a Gaussian distribution. In this case, the blur amount B corresponds to a standard deviation of the Gaussian distribution, and its unit is "pixel".

FIGS. 15A to 15D show filter coefficients of filters corresponding to a plurality of different blur amounts B. FIGS. 15A to 15D show filter coefficients of a filter having a size of 1 pixel×3 pixels (main scanning direction×sub-scanning direction), and a central element in the sub-scanning direction corresponds to the target pixel. When the filter processing using the filter coefficients shown in FIGS. 15A to 15D is applied to input image data, a blur effect appears in an image corresponding to output image data along the sub-scanning direction to have the target pixel as the center. Since the standard deviation of the filter coefficients becomes larger with increasing blur amount B, image data (pixel value) of the target pixel is diffused to neighboring pixels in the sub-scanning direction. That is, a blur effect becomes higher with increasing blur amount B.

Figures 5, 9A:
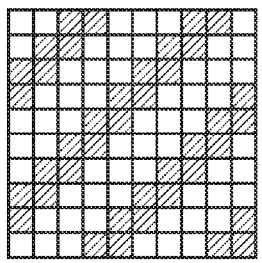
Figures 2, 9A:
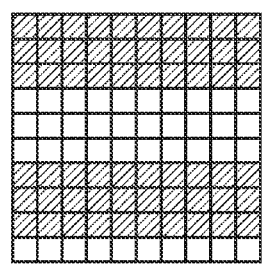
Figures 4, 9A:
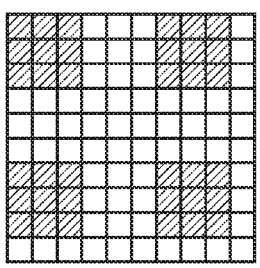
Figures 6, 9A:
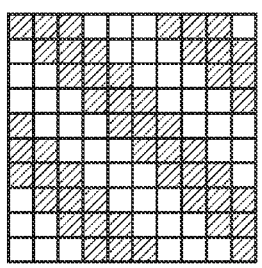
Figures 1, 9B:
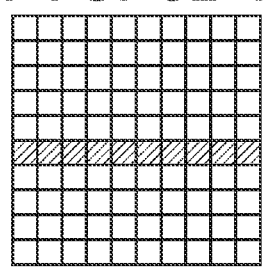
Figures 3, 9B:
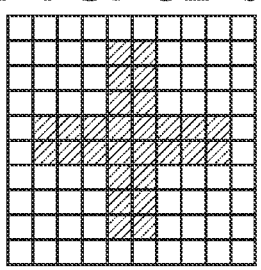
Figures 5, 9B:
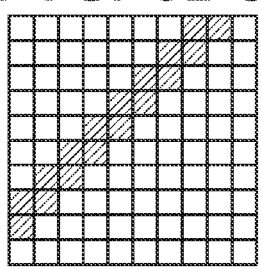
Figures 2, 9B:
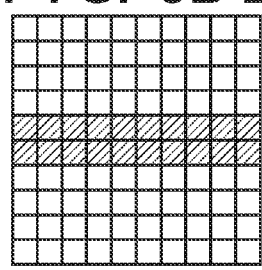
Figures 4, 9B:
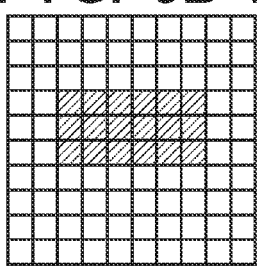
Figures 6, 9B:
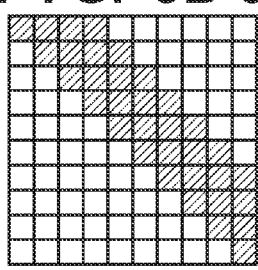

FIGS. 16A-1 to 16A-5 and 16B-1 to 16B-5 show images obtained when the filter processing (blur processing) using the filter coefficients shown in FIGS. 15A to 15D are applied to a line image having a 2-dot width. FIGS. 16A-2 to 16A-5 show output image data obtained when filter processes 104Y are applied to input image data (FIG. 16A-1) using blur amounts B and corresponding filter coefficients shown in FIGS. 15A to 15D. Also, FIGS. 16B-2 to 16B-5 shows images corresponding to the output image data shown in FIGS. 16A-2 to 16A-5. As shown in FIGS. 16A-1 to 16A-5 and 16B-1 to 16B-5, in contrast to an input image before the blur processing as a line image having a 2-dot width, the line width is broadened according to the blur amounts B in output images after the blur processing except for a case of B=0 of the images in FIGS. 16A-5 and 16B-5. That is, in the output image after the blur processing, blur effects according to the blur amounts B appear.

Referring back to FIG. 14, in step S1403, the filter processor 104Y applies filter processing using filter coefficients corresponding to a blur amount B=0.7 to image data (Y image data) stored in the bitmap memory 101Y. That is, the filter processor 104Y applies the filter processing using the filter coefficients shown in FIG. 15B to image data in the bitmap memory 101Y to have coordinates (x, y) corresponding to the target pixel as the center. The filter processor 104Y outputs and stores the image data after the filter processing to and in the bitmap memory 105Y.

In step S1403, the filter processors 104Y, 104M, 104C, and 104K apply blur processing using different blur amounts B to an input image by means of the filter processing using the filter coefficients corresponding to the different blur amounts B. In this embodiment, for example, different blur amounts B are set for respective colors, as shown in FIG. 17. The reason why the different blur amounts B are set for respective colors in this way is as follows.

In the blur processing based on the filter processing in step S1403, a dot as a blur processing target is enlarged toward a surrounding area with increasing blur amount B. When the filter coefficients shown in FIGS. 15A to 15D are used, a dot as a blur processing target is enlarged in the sub-scanning direction (up-and-down directions) depending on the blur amount B. For example, when a degree of juxtaposition color mixture between an image of a specific color and that of another color of those of a plurality of colors included in an input image is extremely low (for example, 0%), if the blur processing is applied to the image of the specific color, an area of an overlapping portion between dots of different colors is decreased. As a result, the degree of juxtaposition color mixture in the input image is increased. Conversely, when a degree of juxtaposition color mixture between an image of a specific color and that of another color is extremely high (for example, 100%), if the blur processing is applied to the image of the specific color, an area of an overlapping portion between dots of different colors is increased. As a result, the degree of juxtaposition color mixture in the input image is decreased.

The aforementioned change in degree of juxtaposition color mixture based on the blur processing in the input image changes according to a difference between blur amounts B to be applied to images of different colors, and a change amount of the degree of juxtaposition color mixture becomes larger with increasing difference. Therefore, by applying blur processes using different blur amounts B to a plurality of images included in an input image, the degree of juxtaposition color mixture in that input image can be largely changed. That is, even when the degree of juxtaposition color mixture in the input image is extremely high or low, it can be adjusted to fall within the appropriate range in which color unevenness which may occur in an output image after misregistration (color misregistration) correction can be sufficiently eliminated.

In this embodiment, furthermore, a largest difference is assured between the blur amount B (=0) to be applied to a C image and the blur amount B (=1.0) to be applied to an M image, as shown in FIG. 17. Of combinations of two colors of Y, M, C, and K colors, those of C and M (blue), M and Y (red), and C and Y (green) readily cause color unevenness due to an extreme degree of juxtaposition color mixture. Of these combinations, when the degree of juxtaposition color mixture is extremely high or low in a color mixture image of C and M colors, color unevenness particularly stands out in an image to be formed. Therefore, it is effective to eliminate color unevenness when the difference between the blur amounts B to be respectively applied to C and M images is set to be largest among combinations of two colors.

Moreover, in a color mixture image of three or more colors, as for ratios of colors used in an image to be color-converted into black called "process black" using C, M, and Y colors, C color has the highest ratio, and M color has the second highest ratio. Even the color mixture image of three or more colors is substantially equal to that of C and M colors, color unevenness can be effectively eliminated by setting the largest difference between the blur amounts B of the C and M colors.

For these reasons, in this embodiment, for example, the blur amounts B of respective colors are set so as to increase the differences between the blur amounts B to be applied to images of the respective colors among C, M, and Y colors, as shown in FIG. 17. However, the blur amounts B shown in FIG. 17 are shown for the exemplary purpose only, and they are not limited to those shown in FIG. 17 and can be set according to characteristics of an input image.

Also, based on the calculation result of the degree of juxtaposition color mixture by the juxtaposition color mixture degree calculator 102, a combination of colors corresponding to an extremely high or low degree of juxtaposition color mixture may be specified. The filter processors 104Y, 104M, 104C, and 104K may decide blur amounts B used for respective colors so as to increase the difference between the blur amounts B of the two colors as the specified combination. In this case, the filter processors 104Y, 104M, 104C, and 104K can apply filter processing using filter coefficients corresponding to the decided blur amounts B of the respective colors to input image data of the respective colors.

In this embodiment, the filter processing using the Gaussian filter is used as the blur processing for the input image.

Alternatively, image processing other than the filter processing may be used in place of the aforementioned filter processing as long as it has a blur effect. Furthermore, the size of the filter used in the filter processing is not limited to the aforementioned size of 1 pixel×3 pixels, but an arbitrary size may be set.

Referring back to FIG. 14, finally in step S1404, the filter processor 104Y sets an HT flag bit to be 0, and outputs and stores it to and in the bitmap memory 105Y. After step S1405 or S1406, the filter processor 104Y ends the filter processing in step S1308, and the process advances to step S1309.

As described above, according to this embodiment, an HT flag bit is set to be 0 to skip the halftone processing by the halftone processors 406Y, 406M, 406C, and 406K for pixels to which the filter processing (step S1403) is applied in the filter processors 104Y, 104M, 104C, and 104K. This is because since dot shapes and arrangements are changed when the halftone processing is applied intact to an image which has undergone the image processing such as the blur processing of the filter processors 104Y, 104M, 104C, and 104K, a reduction of the adjustment effect of the degree of juxtaposition color mixture is concerned. Also, when the halftone processing is applied after the blur processing is applied to a fine pattern included in an input image, a fine pattern cycle and halftone cycle interfere with each other, and new moiré may be generated in an image to be formed, thus deteriorating image quality of the image to be formed.

On the other hand, the aforementioned problems are never posed for pixels to which the filter processing (step S1403) is not applied by the filter processors 104Y, 104M, 104C, and 104K. An HT bit flag is set to be 1 so as to apply the halftone processing by the halftone processors 406Y, 406M, 406C, and 406K to these pixels.

<Arrangement and Operation of Misregistration Correction Units 403Y, 403M, 403C, and 403K>

The arrangement and operation of the misregistration correction unit 403Y will be described in detail below with reference to FIG. 18. The misregistration correction unit 403Y which executes misregistration correction for image data corresponding to a Y color of Y, M, C, and K toner colors will be described below. Note that the arrangements and operations of the misregistration correction units 403M, 403C, and 403K are the same as those of the misregistration correction unit 403Y, and a description thereof will not be given. The misregistration correction unit 403Y includes a misregistration amount storage unit 1801, misregistration correction amount calculator 1802, coordinate converter 1803, and tone value converter 1804.

(Misregistration Amount Storage Unit 1801)

The misregistration amount storage unit 1801 stores data indicating positions in the main scanning direction and misregistration amounts corresponding to the points Pa, Pb, and Pc described using FIG. 3. More specifically, the misregistration amount storage unit 1801 stores positions in the main scanning direction (scanning positions) and misregistration amounts for the points Pa, Pb, and Pc in association with each other, as shown in FIG. 19. In this case, for the points Pa, Pb, and Pc, the main scanning positions −L1, 0, and +L2 [mm] and misregistration amounts 0, eY1, and eY2 [mm] are stored in the misregistration amount storage unit 1801 in association with each other.

Note that the format and the number of data stored in the misregistration amount storage unit 1801 are not limited to those shown in FIG. 19, but they may be decided according to the characteristics of the image forming apparatus 10. The misregistration amounts may be measured using a jig in the manufacturing processes of the image forming apparatus 10 or may be repetitively measured every time print processes of a predetermined number of pages are completed or every time a given time period elapses. In the latter case, a misregistration detection pattern may formed on the intermediate transfer member 27, and misregistration amounts may be detected based on the detection result of the detection pattern using, for example, the optical sensor. Alternatively, a misregistration detection pattern may be formed on the printing material 11, and misregistration amounts may be detected based on the detection result of the detection pattern using, for example, an external scanner. As shown in FIG. 3, deviation amounts of an actual scanning line with reference to an ideal scanning line may be used as misregistration amounts, or a specific color may be used as a reference color, and deviation amounts of scanning lines of other colors with respect to a scanning line of the reference color may be used as misregistration amounts.

(Misregistration Correction Amount Calculator 1802)

The misregistration correction amount calculator 1802 calculates misregistration amounts at respective points in the main scanning direction based on data stored in the misregistration amount storage unit 1801, and inputs the calculation result to the coordinate converter 1803 and tone value converter 1804.

Letting x (dots) be data of respective coordinates (coordinate data) in the main scanning direction, and $\Delta y$ be a misregistration amount in the sub-scanning direction, the misregistration correction amount calculator 1802 calculates $\Delta y$ as a misregistration correction amount. Note that this $\Delta y$ corresponds to a correction value for each pixel in the main scanning direction of a scanning line, so as to correct misregistration of an image to be formed caused by a deviation of a scanning line of a light beam which scans each of the surfaces of the photosensitive drums 22Y, 22M, 22C, and 22K from its ideal position on the surface. More specifically, the misregistration correction amount calculator 1802 divides a main scanning line of the photosensitive drum 22Y into a plurality of regions (regions A and B shown in FIG. 3), and calculates misregistration correction amounts $\Delta y$ at a coordinate x for the respective divided regions using:

Region $A: \Delta y = x^*(eY1/L1)$

Region $B: \Delta y = eY1^*r + (eY2-eY1)^*x/L2$ where r indicates a resolution of image formation, and r=600/25.4 [dots/mm] in this embodiment. L1 and L2 are respectively distances from the point Pa to the point Pb and from the point Pb to the point Pc in the main scanning direction, as shown in FIG. 3. eY1 and eY2 are respectively the misregistration amounts at the points Pb and Pc.

In FIG. 3, a plus (+) direction of a misregistration amount in the sub-scanning direction, which is measured in advance, corresponds to an upstream direction of the sub-scanning direction. For this reason, the plus (+) direction of the misregistration correction amount $\Delta y$ for each coordinate x corresponds to a downstream direction of the sub-scanning direction so as to cancel the misregistration. The misregistration correction amount calculator 1802 temporarily stores (holds) the misregistration correction amounts $\Delta y$ calculated for respective coordinates x, and outputs them to the coordinate converter 1803 and tone value converter 1804.

Note that in this embodiment, the misregistration correction amount $\Delta y$ for each coordinate x is calculated by simple linear interpolation like in the above equations, but other interpolation methods may be used. For example, bicubic interpolation, spline interpolation, and the like, which generally require a longer processing time than linear interpolation, but can improve precision, may be used. That is, the interpolation method to be used can be decided in consideration of the processing time and precision required for the image forming apparatus 10.

(Coordinate Converter 1803)

The coordinate converter 1803 converts coordinates (in the sub-scanning direction) of respective pixel data included in the image data input from the bitmap memory 105Y in the image adjustment unit 402 based on correction amounts $\Delta y$ obtained from the misregistration correction amount calculator 1802. In this manner, image data is corrected based on a value of an integer part of the correction amount $\Delta y$ (that is, misregistration correction for a one-pixel unit) in correspondence with coordinates in the main scanning direction and sub-scanning direction for each pixel data included in the image data.

The coordinate conversion processing executed by the coordinate converter 1803 will be described below with reference to FIGS. 20A and 20B. Reference numeral 20a denotes misregistration correction amounts $\Delta y$, which are obtained by the misregistration correction amount calculator 1802, and correspond to a scanning line approximated by a line using linear interpolation. Also, reference numeral 20b denotes write positions of image data corrected (reconstructed) using the misregistration correction amounts $\Delta y$ on the bitmap memory 404Y.

The coordinate converter 1803 offsets coordinates of image data of the bitmap memory 105Y in the sub-scanning direction (y-direction) for respective lines in accordance with integer part values of the misregistration correction amounts $\Delta y$, as shown in FIG. 20A. For example, when the coordinate converter 1803 reconstructs pixel data, coordinates in the sub-scanning direction of which correspond to an n-th line, as shown in FIG. 20B, it reads out pixel data for one line of the n-th line from the bitmap memory 105Y. Letting x be a coordinate indicating a position in the main scanning direction, the coordinate converter 1803 executes coordinate conversion of pixel data so as to offset pixel data corresponding to the coordinate x for lines corresponding to an integer part of the misregistration correction amount $\Delta y$ corresponding to the coordinate x. The pixel data after coordinate conversion are written in a line according to the converted coordinate in the bitmap memory 404Y.

In FIGS. 20A and 20B, since $0 \leq \Delta y < 1$ for a region (1), pixel data in the region (1) of the n-th line are written at an n-th line of the bitmap memory 404Y. Since $1 \leq \Delta y < 2$ for a region (2), pixel data in the region (2) of the n-th line are written at a position offset by one line in the sub-scanning direction, that is, at an (n+1)-th line of the bitmap memory 404Y. Likewise, for regions (3) and (4), pixel data in the regions (3) and (4) of the n-th line are respectively written at (n+2)-th and (n+3)-th lines of the bitmap memory 404Y.

In this way, the coordinate converter 1803 executes the coordinate conversion processing for input image data based on the misregistration correction amounts $\Delta y$. Also, the coordinate converter 1803 executes the same coordinate conversion processing for HT flag bits stored in the bitmap memory 105Y, and writes them at the same positions as the image data in the bitmap memory 404Y. As a result, the image data and HT flag bits in the bitmap memory 105Y are reconstructed and are stored in the bitmap memory 404Y.

(Tone Value Converter 1804)

Misregistration correction processing executed by the tone value converter 1804 will be described below with reference to FIGS. 21A to 21F. The tone value converter 1804 adjusts tone values of pixels which neighbor a target pixel in the sub-scanning direction (those which are located before and after the target pixel) based on a value of a decimal part of the misregistration correction amount Δy, thereby executing correction processing for misregistration less than one pixel.

Figure 21A:
Figure 21B:
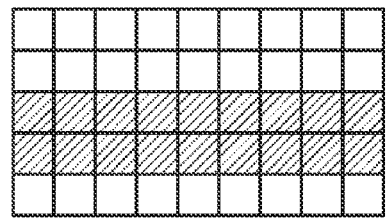
Figure 21C:
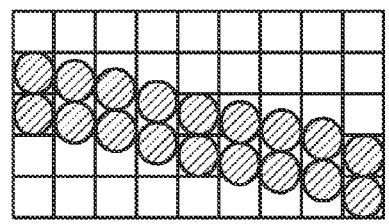

FIG. 21A shows an image of a main scanning line having an upward-sloping tilt. FIG. 21B shows a bitmap image of an image including a line having a line width of 2 pixels along the main scanning direction before tone value conversion by the tone value converter 1804. FIG. 21C shows an image of correction corresponding to the image in FIG. 21B so as to cancel misregistration caused by the tilt of the scanning line in FIG. 21A. The tone value converter 1804 adjusts pixel values (tone values) of pixels which neighbor a target pixel in the sub-scanning direction based on the misregistration correction amount Δy so as to implement misregistration correction corresponding to the correction image in FIG. 21C. FIG. 21D shows a tone value conversion table which defines the relationship between the misregistration correction amounts Δy and correction coefficients α and β required to execute the tone value conversion in the tone value converter 1804.

In FIG. 21D, k is a value obtained by rounding the misregistration correction amount Δy in a negative infinite direction (that is, if Δy assumes a positive value, a value obtained by truncating a value of a decimal part; when it assumes a negative value, a value obtained by rounding up a value of a decimal part). k represents a correction amount for one pixel of misregistration in the sub-scanning direction, and the aforementioned coordinate converter 1803 offsets coordinate data according the values k. α and β are correction amounts less than one pixel, and are correction coefficients required to correct misregistration in the sub-scanning direction. α and β represent distribution ratios for tone values of pixels which neighbor before and after a target pixel in the sub-scanning direction based on a value of a decimal part of the misregistration correction amount Δy. α and β are calculated as follows:

$$\beta = \Delta y - k$$

$$\alpha = 1 - \beta$$

Note that α represents a distribution ratio for a pixel which neighbors the target pixel on the upstream side of the sub-scanning direction. β represents a distribution for a pixel which neighbors the target pixel on the downstream side of the sub-scanning direction.

The aforementioned processes by the coordinate converter 1803 and tone value converter 1804 can be expressed by:

$$H'(x, n+k) = H'(x, n+k) + \alpha * H(x, n)$$

$$H'(x, n+k+1) = H'(x, n+k+1) + \beta * H(x, n)$$

where H(x, n) is a tone value of image data at a coordinate x (dot) in the main scanning direction on the n-th line of the bitmap memory 105Y, and H'(x, n) is a tone value at a coordinate x (dot) on the n-th line of the bitmap memory 404Y.

Figure 21E:
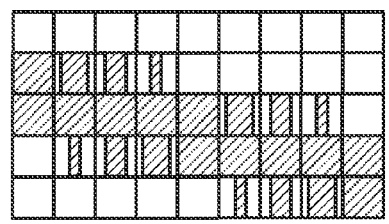
Figure 21F:
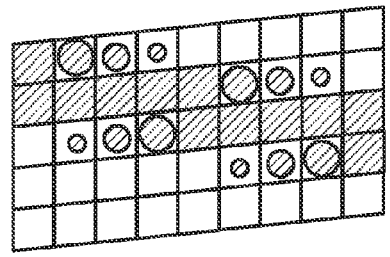

FIG. 21E shows a bitmap image obtained by the tone value conversion for converting tone values of pixels which neighbor before and after the target pixel in the sub-scanning direction according to the coefficients α and β of the tone value conversion table in FIG. 21D. Note that as can be seen from the image in FIG. 21E, the tone value conversion is executed while each pixel of the image data in FIG. 21B is offset according to a value of an integer part of the misregistration correction amount Δy by the coordinate conversion of the coordinate converter 1803. FIG. 21F shows an exposure image on the photosensitive drum 22Y based on the bitmap image (FIG. 21E) which has undergone the tone value conversion. According to the exposure image shown in FIG. 21E, the tilt of the aforementioned main scanning line in FIG. 21A is canceled, and an image along the line in FIG. 21B (free from any tilt) is exposed.

Note that in this embodiment, the coordinate converter 1803 functions as a first correction unit which corrects a misregistration of an image by a correction amount for a one-pixel unit by offsetting a corresponding pixel in image data for the one-pixel unit in the sub-scanning direction of a scanning line in accordance with the misregistration correction amount Δy (correction value). Also, the tone value converter 1804 functions as a second correction unit which corrects a misregistration of an image by a correction amount less than one pixel by respectively adjusting a pixel value of a corresponding pixel in image data and those of pixels which neighbor the corresponding pixel in the sub-scanning direction.

<Other Processes in Image Processing Unit 40>

Figure 4:
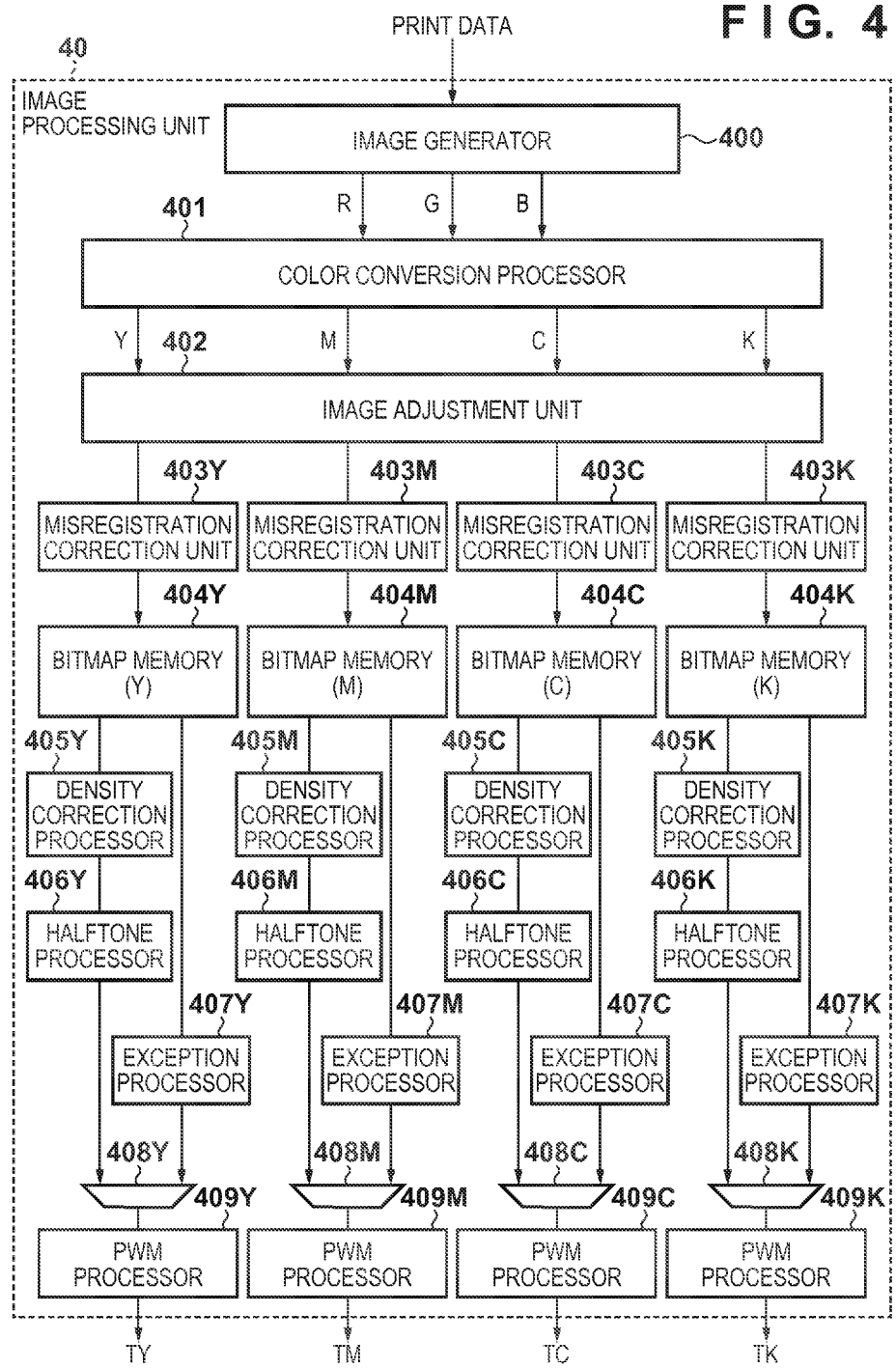
FIG. 4 is a block diagram showing the arrangement of an image processing unit 40 according to the first embodiment of the present invention.

Image data which have undergone the misregistration correction processes by the misregistration correction units 403Y, 403M, 403C, and 403K are stored in the bitmap memories 404Y, 404M, 404C, and 404K (FIG. 4). After the misregistration correction processes, the density correction processors 405Y, 405M, 405C, and 405K, halftone processors 406Y, 406M, 406C, and 406K, and exception processors 407Y, 407M, 407C, and 407K execute processes to be described below for the image data stored in the bitmap memories 404Y, 404M, 404C, and 404K.

(Density Correction Processors 405Y, 405M, 405C, and 405K)

The density correction processors 405Y, 405M, 405C, and 405K hold tone (density) correction tables in which the numbers of input and output bits are respectively 8 bits. The density correction processors 405Y, 405M, 405C, and 405K correct input 8-bit tone values for the target pixel using the correction tables. This correction is executed to attain a given relationship (for example, a proportional relationship) between different tones (densities) when pixels are formed on the printing material 11.

Each of the density correction processors 405Y, 405M, 405C, and 405K may hold a plurality of correction tables in correspondence with environmental conditions such as a temperature and humidity of a location of the image forming apparatus 10 or print conditions such as the number of printed pages. In this case, the density correction processors 405Y, 405M, 405C, and 405K may select appropriate correction tables in accordance with the environmental conditions or print conditions. Alternatively, the density correction processors 405Y, 405M, 405C, and 405K may generate appropriate correction tables based on measurement results obtained by a sensor included in the image forming apparatus 10 or an external image scanner. In this manner, the density correction processors 405Y, 405M, 405C, and 405K can use appropriate correction tables in accordance with the characteristics and the like of the image forming apparatus 10.

(Halftone Processors 406Y, 406M, 406C, and 406K)

The halftone processors 406Y, 406M, 406C, and 406K apply halftone processing based on an ordered dither method to image data (tone values) after the processing of the density correction processors 405Y, 405M, 405C, and 405K. With this processing, the halftone processors 406Y, 406M, 406C, and 406K convert 8-bit data (tone values) of respective pixels, which are input from the density correction processors 405Y, 405M, 405C, and 405K, into 4-bit data (tone values), and output these data to the selectors 408Y, 408M, 408C, and 408K. FIG. 22 shows an example of dither matrices used by the halftone processor 406Y. Matrices 2201 to 2215 correspond to 15 threshold tables table1 to table15. Note that FIG. 22 does not show matrices 2203 to 2214 (table3 to table14).

For example, the halftone processor 406Y calculates, in association with a tone value of a pixel at coordinates (x, y), which value is input from the density correction processor 405Y corresponding to Y color:

$$x'=\mod(x,4)$$

$$y'=\mod(y,4)$$

Furthermore, the halftone processor 406Y compares a threshold located in an x' column and y' row in the threshold tables table1 to table15 with an input 8-bit tone value, and outputs a tone value ranging from 0 to 15 according to the comparison result. The halftone processor 406Y executes the comparison processing according to:

when input tone value<threshold of table1, output value=0;
when threshold of table15≤input tone value, output value=15; and
when threshold of table(n)≤input tone value<threshold of table(n+1), output value=n The halftone processors 406M, 406C, and 406K also hold dither matrices corresponding to respective colors, and execute the same processing as in the halftone processor 406Y. FIG. 23 shows an example of an image after the halftone processing by the halftone processor 406Y. In FIG. 23, halftone dots are formed in 4-dot cycles in the main scanning direction and sub-scanning direction.

(Exception Processors 407Y, 407M, 407C, and 407K)

The exception processors 407Y, 407M, 407C, and 407K convert (quantize) 8-bit image data (tone values) corresponding to respective colors, which are input from the misregistration correction units 403Y, 403M, 403C, and 403K, into 4-bit image data (tone values). For example, each of the exception processors 407Y, 407M, 407C, and 407K uses 15 thresholds at equal intervals (for example, 9, 26, 43, . . . , 247) to convert an input tone value from an 8-bit value to a 4-bit value based on the comparison result with each threshold.

(Selectors 408Y, 408M, 408C, and 408K)

The selectors 408Y, 408M, 408C, and 408K respectively select outputs from the halftone processors 406Y, 406M, 406C, and 406K or exception processors 407Y, 407M, 407C, and 407K with reference to HT flag bits which are stored in the bitmap memories 404Y, 404M, 404C, and 404K, and correspond to respective coordinates. When an HT flag bit=0, the selectors 408Y, 408M, 408C, and 408K select the outputs from the halftone processors 406Y, 406M, 406C, and 406K, and output the selected outputs to the PWM processors 409Y, 409M, 409C, and 409K. On the other hand, when an HT flag bit=1, the selectors 408Y, 408M, 408C, and 408K select outputs from the exception processors 407Y, 407M, 407C, and 407K, and output the selected outputs to the PWM processors 409Y, 409M, 409C, and 409K.

In this embodiment, with the aforementioned processing, as for pixels which have undergone the blur processing (filter processing) in the image adjustment unit 402, the exception processing by the exception processors 407Y, 407M, 407C, and 407K is applied to image data after correction. On the other hand, as for other pixels, the density correction by the density correction processors 405Y, 405M, 405C, and 405K and the halftone processing by the halftone processors 406Y, 406M, 406C, and 406K are applied to image data after correction.

As described above, the image processing apparatus 10 according to this embodiment calculates, for respective pixels in input image data, parameters (degrees of juxtaposition color mixture), which indicate color mixture states when dots of respective colors formed using pixel values of the respective colors included in the input image data are superposed on each other and change according to degrees of overlapping of the dots of the respective colors. Also, the image processing apparatus 10 detects a specific pattern corresponding to a fine pattern in the input image data, and detects pixels corresponding to the pattern (that is, pixels which form a part of the pattern). Furthermore, the image processing apparatus 10 specifies pixels which correspond to the detected specific fine pattern, and have degrees of juxtaposition color mixture that do not assume values within the predetermined appropriate range, and applies, to the input image data, image processing (blur processing) required to adjust the degrees of juxtaposition color mixture of the specified pixels to fall within the appropriate range. Thus, color unevenness which may occur in an image to be formed due to misregistration correction for an input image to be formed can be eliminated. Effects of the image adjustment by the image adjustment unit 402 of this embodiment will be described in more detail below.

<Effect 1 of Image Adjustment by Image Adjustment Unit 402>

An effect of the image adjustment for an input image by the image adjustment unit 402 according to this embodiment, that is, an effect of the adjustment of the degrees of juxtaposition color mixture based on the filter processing by the filter processors 104Y, 104M, 104C, and 104K will be described below.

First Example

A case will be described below with reference to FIGS. 28A to 28E wherein the misregistration correction by the misregistration correction units 403Y, 403M, 403C, and 403K is applied to a fine pattern image as an input image, which includes repetition of lines each having a 2-dot width of a color mixture (blue) of C and M colors. FIGS. 28A to 28E show image data corresponding to a portion including one of a plurality of lines in C and M input image data, and a dot formation image corresponding to the one line. However, the entire input image includes patterns of a plurality of lines in addition to the line shown in FIGS. 28A to 28E, in practice. Also, assume that entire Y and K input images are white images (tone value=0). In FIGS. 28A to 28E, each pixel value (tone value) of image data is expressed by a numerical value ranging from 0 to 100(%) as in other figures.

Reference numerals 28a-1 and 28-2 in FIG. 28A respectively denote portions of the C and M input image data. The juxtaposition color mixture degree calculator 102 calculates a degree of juxtaposition color mixture=0% of these input image data. Also, the pattern detectors 103C and 103M output a pattern attribute value=1 for all pixels. (Note that strictly speaking, the degree of juxtaposition color mixture and pattern attribute value are different from these values at an end portion of the image, but all the pixels have the same values for the sake of simplicity.) As a result, the filter processors 104C and 104M execute the blur processing for the entire input images.

The filter processors 104C and 104M execute filter processing of input image data by setting a blur amount B=0 for C color and a blur amount B=1.0 for M color (FIG. 17) and using corresponding filter coefficients (FIGS. 15A to 15D) as the blur processing for the C and M input images. Reference numerals 28b-1 and 28b-2 in FIG. 28B denote results of the blur processing by the filter processors 104C and 104M. Since the blur amount B=0, the image data 28b-1 remains unchanged from the input image data. On the other hand, as shown in the image data 28b-2, as a result of the blur processing, edge portions of the line of the 2-dot width are blurred to extend the line width to a 4-dot width.

Reference numerals 28c-1 and 28c-2 in FIG. 28C denote application results of misregistration correction (color misregistration correction) processing by the misregistration correction units 403C and 403M to the image data after the processing by the filter processors 104C and 104M (image adjustment unit 402). In this case, for the sake of simplicity, assume that a scanning line does not suffer any tilt or curvature and a misregistration correction amount $\Delta y$=0 for C color, and misregistration correction amounts $\Delta y$ for M color are set to be 0 to 0.5 dots in increments of 0.1 dots at six different scanning positions along the main scanning direction. As can be seen from the result 28c-2, as a result of the misregistration correction processing according to the misregistration correction amounts $\Delta y$ at respective scanning positions p0 to p5 in the main scanning direction, the line width is extended from the 4-dot width in the image data 28b-2 to a 5-dot width.

Note that actual misregistration correction amounts $\Delta y$ have a difference of about 10 dots at most at two ends of one scanning line in the main scanning direction. More specifically, a change ratio of $\Delta y$ in the main scanning direction is about 10 dots per about 4900 dots corresponding to a scanning line width of a short side (210 mm) in an A4 printer. For this reason, it should be noted that a pixel position is never shifted by 0.1 dots for each pixel along the main scanning direction in practice unlike in the result 28c-2, and this numerical value is presented for the descriptive purpose only.

Next, reference numerals 28d-1 and 28d-2 in FIG. 28D respectively denote dot images formed on a printing material by the PWM processing of the PWM processors 409C and 409M based on the image data 28c-1 and 28c-2. As shown in FIG. 28D, in a pixel having a tone value less than 100%, a dot to be formed is reduced in size in the main scanning direction by the PWM processing according to the tone value. Also, positions of M dots to be formed on the printing material are corrected according to the misregistration correction amounts $\Delta y$.

Figure 28E:
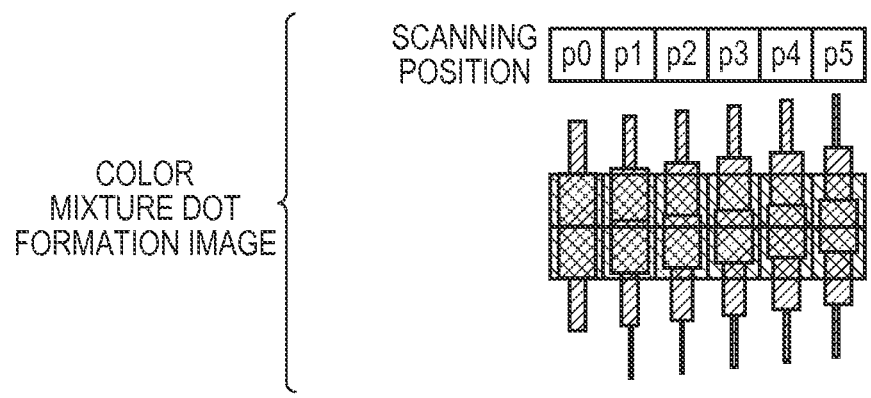

FIG. 28E shows a dot formation image obtained as a result of superposing (that is, color-mixing) the C and M dots 28d-1 and 28d-2. As can be seen from FIG. 28E, the C and M dots are in a color mixture state based on the juxtaposition color mixture (a juxtaposition color mixture state).

For the sake of comparison, a case will be described below with reference to FIGS. 29A to 29D wherein the degrees of juxtaposition color mixture are not adjusted by the filter processing of the filter processors 104Y, 104M, 104C, and 104K in the image adjustment unit 402 according to this embodiment. FIGS. 29A to 29D show a case in which the same input image data as in FIGS. 28A to 28E are used, and the filter processing of the filter processors 104Y, 104M, 104C, and 104K is not executed. For this reason, there are no drawings corresponding the data 28b-1 and 28b-2.

As denoted by reference numeral 29d-2 in FIG. 29C, as a result of misregistration correction of a scanning line by the misregistration correction unit 403M, M dot shapes are changed from scanning positions p0 to p5. For this reason, as shown in FIG. 29D, in a color mixture dot formation image corresponding to an image to be formed, color mixture states upon superposing the C and M images are changed from the positions p0 to p5. More specifically, protruding portions of the M dots with respect to the C dots in the sub-scanning direction (up-and-down directions) are increased in accordance with the magnitudes of the misregistration correction amounts $\Delta y$. That is, areas of overlapping portions between the M and C dots are changed for respective scanning positions from the positions p0 to p5, thus changing degrees of juxtaposition color mixture. In an image to be formed corresponding to FIG. 29D, dark blue appears at the scanning position p0 corresponding to a degree of juxtaposition color mixture=0% due to a color effect of the subtractive color mixture, and light blue appears at the scanning position p5 corresponding to a degree of juxtaposition color mixture=25% since a color effect of the juxtaposition color mixture is added. Therefore, as described above with reference to FIGS. 26A to 26D and FIGS. 27A to 27E, in an image to be formed, color effect differences are produced for respective scanning positions due to different juxtaposition color mixture states, thus causing color unevenness.

Furthermore, not only the color effects (brightness) are changed for respective scanning positions, but also M color stands out at the scanning position p5 due to the influence of optical dot gains or the like by the M dots which overlap the C dots in states shifted in the up-and-down directions. As a result, it is empirically known that a hue in an image to be formed tends to be reddish blue. Therefore, brightness and hue levels are different at the scanning positions p0 and p5 corresponding to different degrees of juxtaposition color mixture, thus causing more conspicuous color unevenness and posing a problem of image quality deterioration of the image to be formed. Especially, it is empirically known that the dot at the scanning position p0 corresponding to the degree of juxtaposition color mixture=0% suffers a larger color change than dots at other scanning positions.

In this embodiment, in order to cope with such image quality deterioration, the blur processing by the filter processors 104Y, 104M, 104C, and 104K corresponding to FIG. 28B is executed before the misregistration correction corresponding to FIG. 28C. Thus, the aforementioned color unevenness is eliminated.

The input image data shown in FIG. 28A include positions where the C and M dots perfectly overlap each other (that is, a color mixture state based on the subtractive color mixture corresponding to a degree of juxtaposition color mixture=0%). By contrast, as can be seen from FIG. 28E, roughly equal color mixture states based on the juxtaposition color mixture are set at all the scanning positions p0 to p5. More specifically, the degrees of juxtaposition color mixture are changed between about 27% and 39% from the positions p0 to p5. This change amount of the degrees of juxtaposition color mixture is not more than a half that in FIG. 29D of the case in which the blur processing according to this embodiment is not executed. Especially, at the scanning position p0, the degree of juxtaposition color mixture is 0% in FIG. 29D, while the degree of juxtaposition color mixture is greatly increased as a result of the blur processing applied to the C and M images in FIG. 28E. As described above, the blur processing according to this embodiment can adjust degrees of juxtaposition color mixture in the main scanning direction (especially, extreme degrees of juxtaposition color mixture like 0% and 100%) to nearly equal magnitudes, thus suppressing color effect differences due to the juxtaposition color mixture at scanning positions. As a result, color unevenness depending on color mixture states, which may occur in the main scanning direction due to application of the misregistration correction to a fine pattern image as an image formation target can be eliminated.

Second Example

An effect of the image adjustment by the image adjustment unit 402 according to this embodiment when the misregistration correction is applied to, as an input image, a fine pattern image including a pattern other than lines, will be described below with reference to FIGS. 30A to 30D. FIGS. 30A to 30D show input image data corresponding to a part of a fine pattern image like the image shown in FIG. 9A-3 as an input image, and their processing results.

Reference numerals 30a-1 and 30a-2 in FIG. 30A denote portions of C and M input image data. The juxtaposition color mixture degree calculator 102 calculates a degree of juxtaposition color mixture=0 for all pixels of these input image data as in FIGS. 28A to 28E. Also, the pattern detectors 103C and 103M output a pattern attribute value=1 for all pixels. As a result, the filter processors 104C and 104M execute blur processing for the entire input images. Reference numerals 30b-1 and 30b-2 in FIG. 30B denote results of the blur processing of the filter processors 104C and 104M.

Figure 30C:
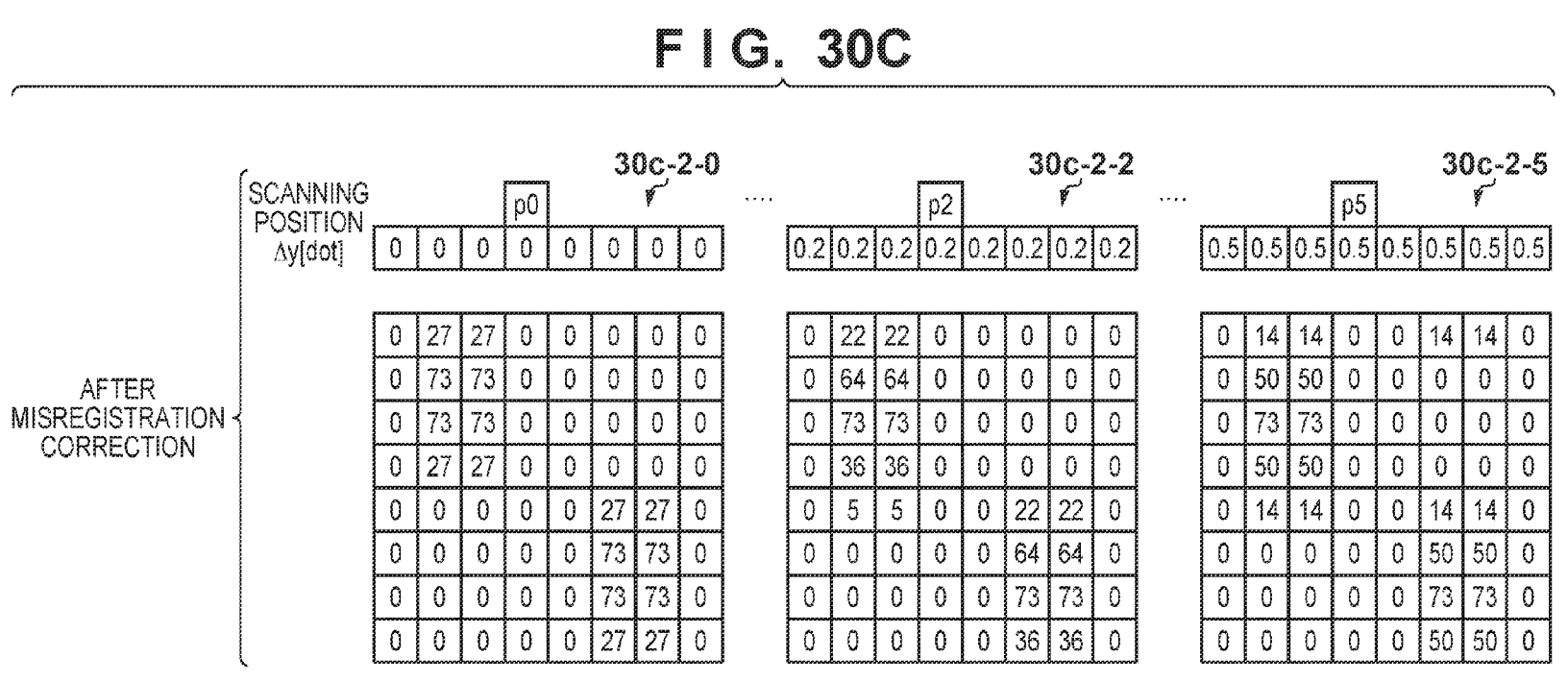

Next, reference numerals 30c-2-0 to 30c-2-5 in FIG. 30C denote results of the misregistration correction processing for the M image data 30b-2, that is, image data after the misregistration correction around different scanning positions p0 to p5 in the main scanning direction. In FIG. 30C, misregistration correction amounts Δy are changed more moderately than in FIGS. 28A to 28E. Note that as for the C image data, the misregistration correction amount Δy=0 as in FIGS. 28A to 28E, and image data after the misregistration correction is the same as the image data 30b-1.

Also, reference numerals 30e-0 to 30e-5 in FIG. 30D denote dot formation images which are to be finally formed on a printing material and respectively correspond to the scanning positions p0 to p5. As can be seen from FIGS. 30A to 30D, the degrees of juxtaposition color mixture are adjusted to nearly equal values even at the scanning positions corresponding to different misregistration correction amounts Δy as in FIGS. 28A to 28E. Therefore, even when the fine pattern image shown in FIG. 30A is an image formation target, color unevenness which may occur in the main scanning direction due to application of the misregistration correction to the fine pattern image can be eliminated.

Third Example

Figure 31E:
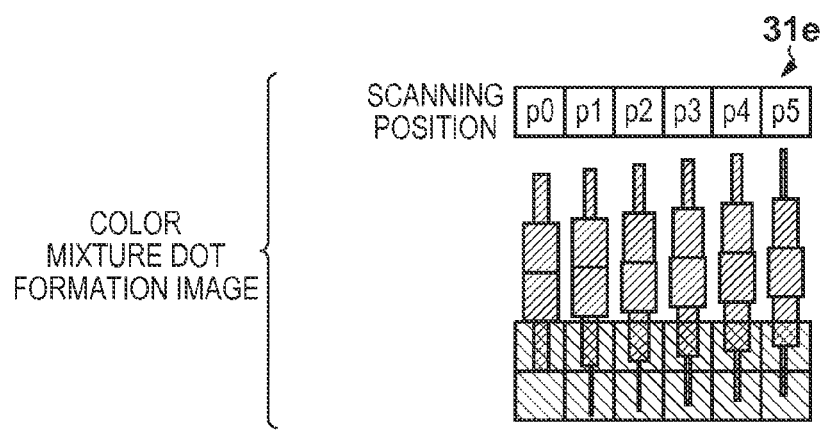

An effect of the image adjustment according to this embodiment when a fine pattern image which is set in a state in which C and M lines are repetitively juxtaposed in a spatial direction when C and M images are superposed on each other is used as an input image will be described below with reference to FIGS. 31A to 31E. That is, FIG. 31A to 31E show a case in which a fine line image corresponding to degrees of juxtaposition color mixture=100% between C and M lines is used as an input image in place of that used in FIGS. 28A to 28E. FIGS. 32A to 32D show a case in which the image adjustment (adjustment of degrees of juxtaposition color mixture) according to this embodiment is not executed for the input image shown in FIGS. 31A to 31E. Therefore, elements included in FIGS. 31A to 31E correspond to those included in FIGS. 28A to 28E, and elements included in FIGS. 32A to 32D correspond to those included in FIGS. 29A to 29D. As shown in FIGS. 31A and 32A, since there are no areas (pixels) where C and M dot overlap each other, degrees of juxtaposition color mixture between C and M input images are 100%.

In FIG. 32D, a degree of juxtaposition color mixture at a scanning position p0 is 100%, but as the scanning positions are farther away from the positioning p0 (scanning positions p1 to p5), overlapping areas between C and M dots are increased, and degrees of juxtaposition color mixture are decreased in proportion to an increase in area. That is, since juxtaposition color mixture states at the respective scanning positions are changed along the main scanning direction, when the image adjustment by the image adjustment unit 402 according to this embodiment is not executed, color unevenness may occur in an image to be formed due to color effect differences according to the scanning positions. Note that as appearance of color unevenness, light blue appears at the scanning position p0 due to a color effect of the juxtaposition color mixture, and dark blue appears at the scanning position p5 since a color effect of the subtractive color mixture is added, contrary to FIGS. 29A to 29D.

On the other hand, when the image adjustment by the image adjustment unit 402 according to this embodiment is executed, areas of overlapping areas of C and M dots are nearly equal to each other at all the scanning positions p0 to p5 corresponding to different misregistration correction amounts Δy, as shown in FIG. 31E. That is, the degrees of juxtaposition color mixture are adjusted to nearly equal values at all the scanning positions p0 to p5. Therefore, by applying the blur processing to pixels corresponding to a fine pattern by the image adjustment unit 402, even when degrees of juxtaposition color mixture in an original input image are 100%, the same effect as in the above effect can be obtained. That is, color unevenness depending on color mixture states, which may occur in the main scanning direction due to application of the misregistration correction to the input image, can be eliminated.

As described above, due to changes of shapes of dots formed based on an input image upon application of image processing such as the misregistration correction to the input image, color mixture states (juxtaposition color mixture states) between different colors are changed, thus causing color unevenness in an image to be formed. According to this embodiment, occurrence of such color unevenness can be prevented, thus eliminating color unevenness.

<Effect 2 of Image Adjustment by Image Adjustment Unit 402>

The image adjustment by the image adjustment unit 402 according to this embodiment is effective for color unevenness caused not only by changes of juxtaposition color mixture states of an input image caused by image processing such as the misregistration correction (color misregistration correction), but also by changes of juxtaposition color mixture states caused by other factors. For example, when the correction processing of the misregistration correction units 403Y, 403M, 403C, and 403K is applied to an input image, since misregistration of scanning lines of respective colors is corrected, color misregistration caused when images to be formed of the respective colors are superposed on each other can be eliminated. However, such correction processing of the misregistration correction units 403Y, 403M, 403C, and 403K cannot perfectly compensate for color misregistration which may occur in the image to be formed, and color misregistration may remain. The image adjustment of this embodiment is also effective for color unevenness caused due to such color misregistration.

Color unevenness which may occur in an image to be formed (output image) due to color misregistration in which formation positions of respective colors are shifted from each other upon formation of a multi-color image by superposing images (toner images) of different colors will be described below with reference to FIG. 5A to 5D. FIGS. 5A to 5D show a case in which the correction processing of the misregistration correction units 403Y, 403M, 403C, and 403K is not executed. FIGS. 5A and 5B respectively show C and M images in each of which lines each having a 2-dot width along the main scanning direction are regularly arranged in the sub-scanning direction. Assume that all dots included in the lines are formed to have a uniform density.

FIG. 5C shows color misregistration amounts corresponding to misregistration of the formation position of the M image, that is, a state in which color misregistration amounts are different according to sub-scanning positions. More specifically, no color misregistration occurs near a sub-scanning position p0 (color misregistration amount=0), but color misregistration occurs by an amount of 1.0 [dot] near a sub-scanning position p10. FIG. 5C shows a color mixture image obtained by forming the C and M images to be superposed on each other when the color misregistration shown in FIG. 5C occurs. In FIG. 5D, color mixture states of respective dots are visually presented by color coding according to degrees of overlapping of C and M dots (overlapping portions are indicated by black).

As shown in FIG. 5D, near the sub-scanning position p0, a line portion becomes dark blue due to a color effect of the subtractive color mixture. On the other hand, near the sub-scanning position p10, dots in a color mixture state of the juxtaposition color mixture are generated, and areas of portions in color mixture states of the juxtaposition color mixture and subtractive color mixture are about 50% of those of respective dots between the M and C dots. Due to such color effects of the color mixture states, a line portion becomes light blue near the sub-scanning position p10. Therefore, as shown in FIG. 5D, color unevenness caused by color mixture state differences in the sub-scanning direction occurs. The color misregistration shown in FIGS. 5A to 5D is irregular color misregistration which occurs to have different amounts for respective positions in the sub-scanning direction. When the images to be formed shown in FIGS. 5A and 5B suffer such color misregistration, since portions in which corresponding dot formation positions are shifted from each other and those in which the dot formation positions are not shifted are generated between the M and C images, color unevenness is produced in the sub-scanning direction.

In this way, color misregistration which irregularly occurs in the sub-scanning direction may be produced by rotation unevenness (movement unevenness) of the plurality of photosensitive drums 22 and intermediate transfer member 27 caused by, for example, mechanical attachment precision, adjustment precision, and the like. Note that the rotation unevenness of the photosensitive drums 22 and intermediate transfer member 27 is produced by, for example, rotation speed variations of the driving motor 16 which drives the photosensitive drums 22 and intermediate transfer member 27. Such color misregistration is produced in, for example, the same cycle as one rotation cycle (for example, 75 mm) of the photosensitive drum 22 in the sub-scanning direction.

When the correction processing of the misregistration correction units 403Y, 403M, 403C, and 403K is applied to input image data, color misregistration which regularly occurs in the sub-scanning direction can be compensated for, but that which irregularly occurs due to the aforementioned factors may not often be perfectly compensated for. By applying the image adjustment of the image adjustment unit 402 according to this embodiment, it is expected to eliminate such color misregistration, as will be described below.

FIGS. 33A to 33D show the application result of the image adjustment of the image adjustment unit 402 according to this embodiment in the case shown in FIGS. 5A to 5D. FIGS. 33A and 33B show dot formation images when the blur processing (a blur amount B=0 for C color, and a blur amount B=1.0 for M color) of the filter processors 104C and 104M is applied to the C and M images shown in FIGS. 5A and 5B. Also, FIG. 33D shows a color mixture image (color mixture dot formation image) of the C and M colors, which image suffers color misregistration shown in FIG. 33C (as in FIG. 5C). As can be seen from FIG. 33D, degrees of juxtaposition color mixture are adjusted to nearly equal values at respective sub-scanning positions compared to FIG. 5D. Therefore, according to this embodiment, occurrence of color unevenness caused by irregular color misregistration which may remain in an image to be formed can be prevented, thus eliminating color unevenness which may occur due to such factors.

Especially, the image shown in FIG. 5D includes areas corresponding to degrees of juxtaposition color mixture=0% (for example, around sub-scanning positions p00, p01, p20, and p21), while such problem is solved in the image shown in FIG. 33D. As can be understood from this, the image adjustment of this embodiment is also effective for suppression of occurrence of color unevenness.

Note that the effects of this embodiment have been explained with reference to FIGS. 5A to 5D and 33A to 33D taking as the example the case in which the correction processing by the misregistration correction units 403Y, 403M, 403C, and 403K is not executed. However, in this embodiment, the correction processing by the misregistration correction units 403Y, 403M, 403C, and 403K is executed in practice according to the arrangement of the image processing unit 40 shown in FIG. 4. In this case, it should be noted that the dot formation image 33b shown in FIG. 33 is changed along the main scanning direction like the image 31d-2 in FIG. 31D as a result of the correction processing of the misregistration correction units 403Y, 403M, 403C, and 403K in practice. However, even when dot shapes are changed by the correction processing of the misregistration correction units 403Y, 403M, 403C, and 403K, juxtaposition color mixture states at respective positions in the sub-scanning direction are never largely changed. For this reason, the image adjustment according to this embodiment is still effective for color unevenness caused by color misregistration which may irregularly occur at respective sub-scanning positions.

<Effect of Specific Pattern Detection>

As described above using FIG. 14, in this embodiment, whether or not an input image is a fine pattern image is determined based on the presence/absence of detection of a specific pattern by the pattern detectors 103Y, 103M, 103C, and 103K upon execution of the image adjustment by the image adjustment unit 402. Furthermore, when an input image is not a fine pattern image, the blur processing based on the filter processing by the filter processors 104Y, 104M, 104C, and 104K is not applied to the input image irrespective of degrees of juxtaposition color mixture (step S1405). The reason for this and effects will be described in more detail below with reference to FIGS. 34A and 34B.

Figure 34B:
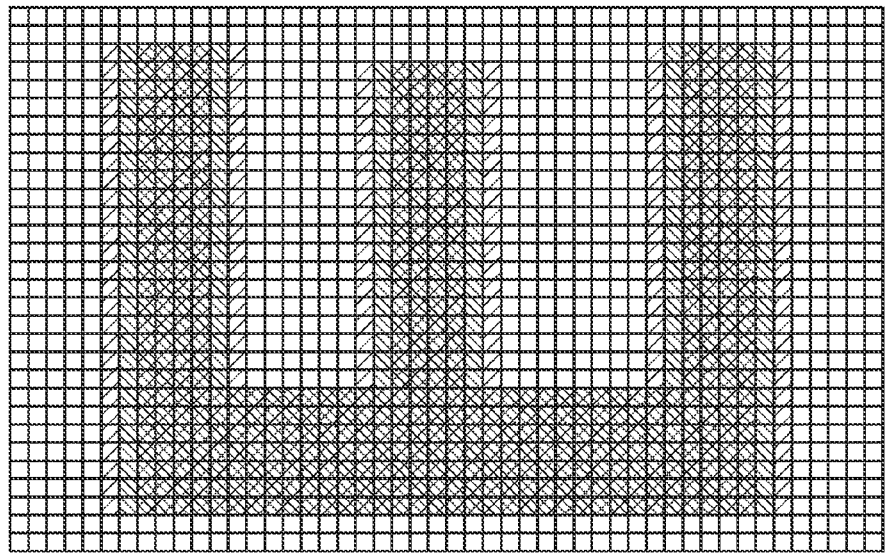
FIGS. 34A and 34B are views showing effects according to the first embodiment of the present invention.
Figure 34A:
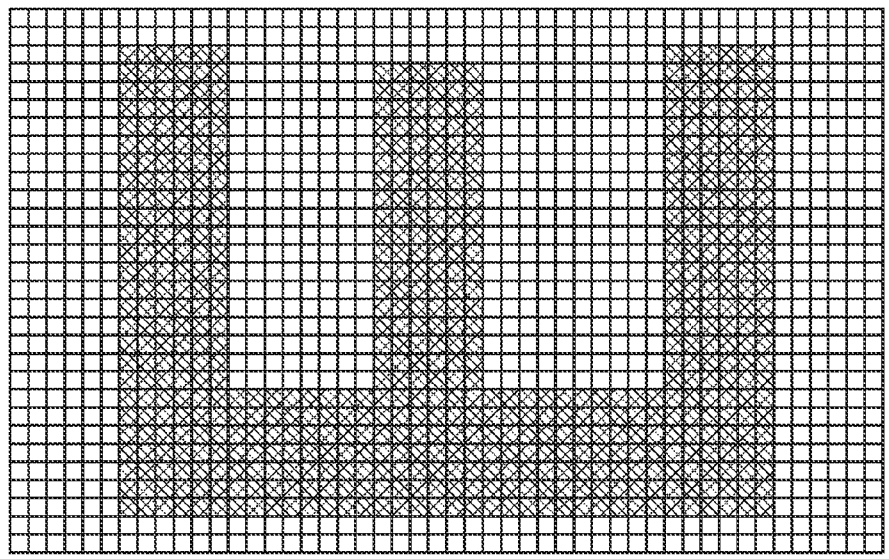

FIG. 34A shows an image of a blue character which includes C and M images and corresponds to a letter "E" of the Arial font. When image data corresponding to the image shown in FIG. 34A is input to the image adjustment unit 402, the pattern detectors 103C and 103M do not detect a specific pattern corresponding to a fine pattern from the image shown in 34A, and output a pattern attribute value=0. As a result, the filter processors 104C and 104M do not apply the filter processing (blur processing) to the image shown in FIG. 34A. On the other hand, FIG. 34B shows an image obtained when the filter processors 104C and 104M applies the filter processing (blur processing) to image data of the image shown in 34A irrespective of the detection result of the pattern detectors 103C and 103M. In this case, a blur amount B=0 for C color and a blur amount B=1.0 for M color.

The filter processing of this embodiment is effective for a reduction of color unevenness when it is applied to a fine pattern image (high-frequency pattern image) including a pattern of a high spatial frequency. However, in an image (low-frequency pattern image) including a pattern of a low spatial frequency like the image shown in FIG. 34A, even upon observation over a broad area, the number of edge portions is small, and there is no repetition of a specific pattern. For this reason, even when the misregistration correction processing is applied, color unevenness depending on color mixture states is neither emphasized nor conspicuous. Therefore, for such image, the filter processing of the filter processors 104Y, 104M, 104C, and 104K need not be applied (step S1405).

On the other hand, when the filter processing in step S1403 is applied to such low-frequency pattern image, edge portions included in the image are blurred like the image shown in FIG. 34B, and image quality may deteriorate from an original image. A degree of image quality deterioration caused by the filter processing varies depending on patterns included in images. For example, in a high-frequency pattern image like the images shown in FIGS. 9A-1 to 9A-6, edge portions are spatially repeated at a high density. For this reason, even when the filter processing is applied to such high-frequency image, blurred edge portions are not so conspicuous. However, in a low-frequency pattern image like the images shown in FIG. 9B-1 to 9B-6 and the image shown in FIG. 34A, edge portions readily stand out. For this reason, when the filter processing is applied to such low-frequency pattern image, blurred edge portions are conspicuous upon observation over a broad area, and may become a cause of recognition of image quality deterioration.

Therefore, when the filter processing in step S1403 is applied to a low-frequency pattern image, a blur amount B has to be set to apply blur processing to obtain a result which is not recognized as image quality deterioration. Also, when the correction processing of the misregistration correction units 403Y, 403M, 403C, and 403K is applied to the image shown in FIG. 34B like in this embodiment, the image may be further changed to an image with the blur effect, and this may lead to further image quality deterioration. For this reason, when no specific pattern is detected from an input image, skipping of the filter processing in step S1403 like in this embodiment results in suppressing image quality deterioration as much as possible, and obtaining an output image with higher image quality.

<Modification>

The aforementioned first embodiment can be variously modified as follows. In this case as well, the same effects as in the aforementioned effects can be obtained. In the first embodiment, as shown in FIG. 4, the image adjustment unit 402 is arranged in a stage before the misregistration correction units 403Y, 403M, 403C, and 403K. Alternatively, the image adjustment unit 402 may be arranged in a stage after the misregistration correction units 403Y, 403M, 403C, and 403K. That is, the processing of the image adjustment unit 402 and that of the misregistration correction units 403Y, 403M, 403C, and 403K can be executed in an arbitrary order. Also, respective processes (those of the juxtaposition color mixture degree calculator 102, pattern detectors 103Y, 103M, 103C, and 103K, and the like) executed in the image adjustment unit 402 can be executed in an arbitrary order. Also, the halftone processing of the halftone processors 406Y, 406M, 406C, and 406K may be executed in a stage before the correction processing of the misregistration correction units 403Y, 403M, 403C, and 403K. In this case, the need for the selection processing of the selectors 408Y, 408M, 408C, and 408K can be obviated.

In the image processing unit 40, the halftone processing contents of the halftone processors 406Y, 406M, 406C, and 406K may be selected from a plurality of different choices according to a specific pattern that may be detected from an input image. In this case, the processing results of the pattern detectors 103Y, 103M, 103C, and 103K in the image adjustment unit 402 can be used in such selection. Furthermore, the correction processing contents of the misregistration correction units 403Y, 403M, 403C, and 403K may be selected from a plurality of different choices according to a specific pattern that may be detected from an input image. In this case as well, the processing results of the pattern detectors 103Y, 103M, 103C, and 103K can be used in such selection.

[Second Embodiment]

The second embodiment of the present invention will be described below. In the first embodiment, blur amounts B used in the filter processors 104Y, 104M, 104C, and 104K in the image adjustment unit 402 are constant for respective colors. This embodiment is characterized in that a blur amount B is decided as needed according to a degree of misregistration at a scanning position.

In the first embodiment, the filter processors 104Y, 104M, 104C, and 104K respectively execute filter processing using filter coefficients corresponding to constant blur amounts B. As a result, in a color mixture dot image shown in FIG. 28E, M dots are expanded in the sub-scanning direction (up-and-down directions) compared to a case in which the filter processing shown in FIG. 29D is not executed. That is, degrees of juxtaposition color mixture of dots to be formed at respective scanning positions are adjusted, and occurrence of color unevenness can be consequently suppressed.

When the adjustment amounts of the degrees of juxtaposition color mixture of such filter processing are large, color unevenness is not produced in color mixture dots after the adjustment, but a color may be changed too much from an original color. For example, in FIG. 28E, M dots which perfectly overlapped C dots (degrees of juxtaposition color mixture=0%) are largely protruded from the C dots in the up-and-down directions, an original color may be changed to a reddish color in whole. Also, when edge portions of lines are largely blurred, although such blurs are not so conspicuous in a fine pattern image, if dots which have undergone the blur processing are spread over a broad range, dot sizes are reduced, and granularity is impaired, thus causing image quality deterioration.

Figure 35A:
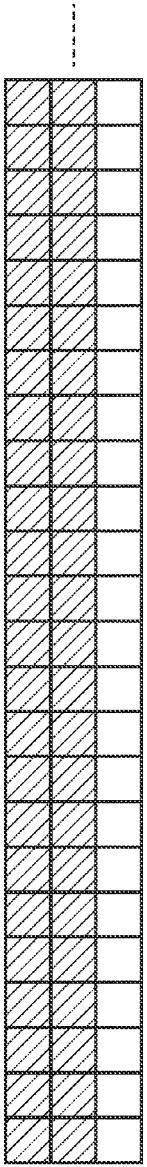
Figure 35B:
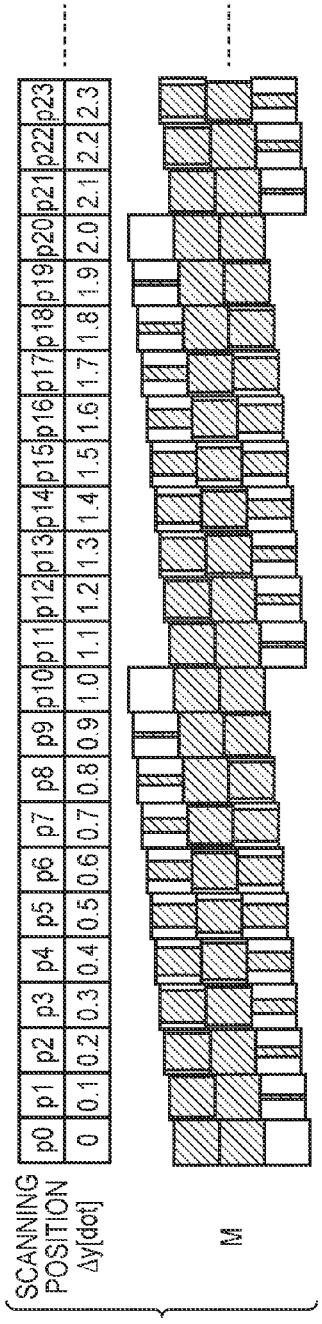
Figure 35C:
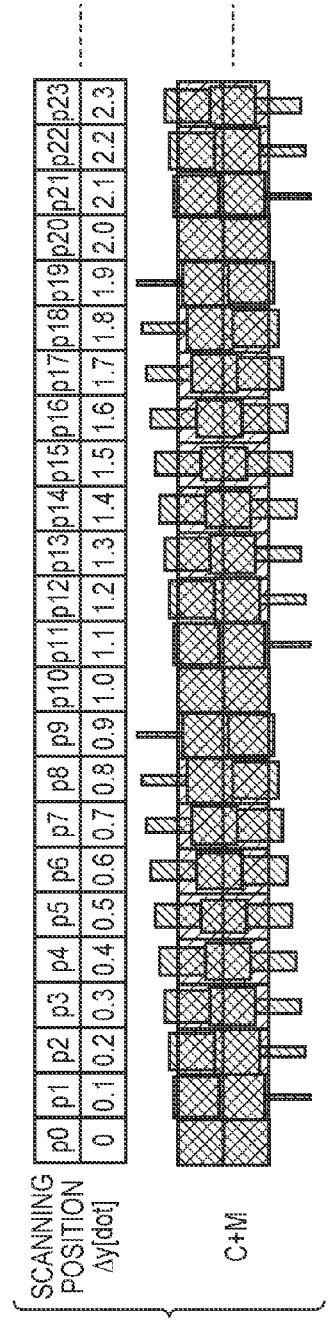

FIGS. 35A to 35E show a dot formation image by extending scanning positions shown in FIGS. 28A to 28E in the first embodiment and setting a range of misregistration correction values Δy to be applied to an input image to range from 0 to 2.3 in increments of 0.1 (a range corresponding to scanning positions p0 to p23). In a color mixture dot formation image in FIG. 35C, juxtaposition color mixture states are periodically changed along the main scanning direction in accordance with the misregistration correction values Δy. More specifically, as shown in FIG. 35D, while the value Δy is increased from 0 to 0.5, the degree of juxtaposition color mixture is increased from a minimum value (0%) to a maximum value. While the value Δy is increased from 0.5 to 1.0, the degree of juxtaposition color mixture is decreased from the maximum value to the minimum value (0%). Also, while the value Δy is increased from 1.0 to 2.0, the degree of juxtaposition color mixture is changed similarly. That is, the degrees of juxtaposition color mixture of the dot formation image are periodically changed to have a change in value Δy for one dot as one cycle.

FIG. 35E shows the relationship between numerical values Δy' (0≤Δy'<1.0) below the decimal point of the misregistration correction values Δy and the degree of juxtaposition color mixture, and corresponds to one cycle of a change in degree of juxtaposition color mixture in the main scanning direction. This embodiment is characterized in that a blur amount B is adjusted in correspondence with a change in degree of juxtaposition color mixture with respect to the misregistration correction values $\Delta y'$. More specifically, a plurality of maximum values Bmax for a blur amount B are set in advance, and a blur amount according to the misregistration correction value $\Delta y'$ is generated for each color to have the maximum value Bmax as an upper limit. The plurality of maximum values Bmax are values respectively corresponding to different colors. Furthermore, blur processing using the generated blur amount B is applied to input image data. In this manner, a variation width of degrees of juxtaposition color mixture is reduced, and image quality of an image after adjustment of the degrees of juxtaposition color mixture is further improved.

Figures 36, 37:
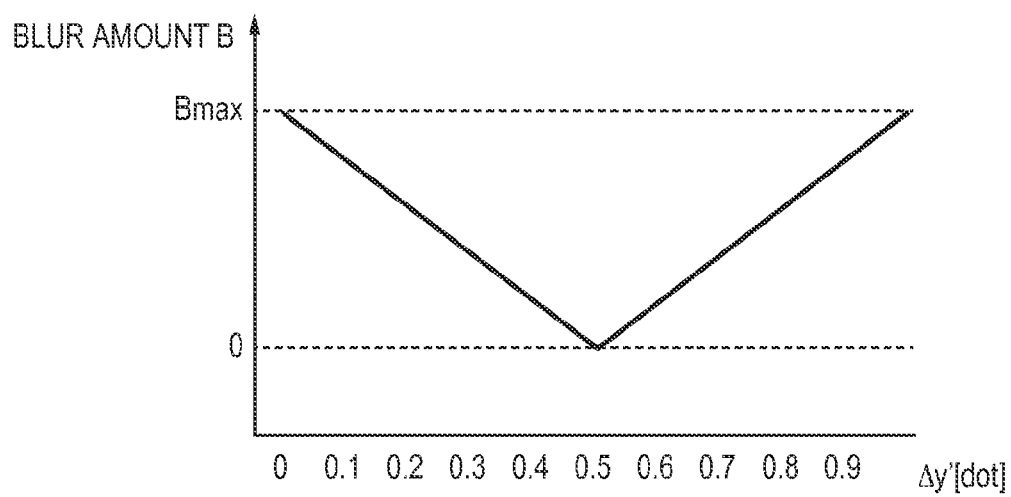
FIG. 36 is a graph showing the relationship between misregistration correction amounts Δy' and blur amounts B according to the second embodiment of the present invention.
FIG. 37 is a table showing maximum values Bmax of blur amounts B of respective colors according to the second embodiment of the present invention.

FIG. 36 is a graph showing a blur amount B used in this embodiment. In FIG. 36, a blur amount B according to a change in degree of juxtaposition color mixture is set to have Bmax as a maximum value. In this embodiment, the maximum values Bmax of the blur amount B are independently set for respective colors, as shown in FIG. 37. For example, for M color, a maximum value Bmax=0.7 of the blur amount B is set, and a blur amount B is set by linear interpolation, so as to have B=Bmax at $\Delta y'=0$ and B=0 at $\Delta y'=0.5$, as shown in FIG. 36. The characteristics of the blur amount B shown in FIG. 36 are roughly contrary to those of the degrees of juxtaposition color mixture shown in FIG. 35E. This is to adjust the blur amount B so that a shape of a dot corresponding to a degree of juxtaposition color mixture=0% at $\Delta y'=0$ is the same as that of a dot corresponding to a maximum degree of juxtaposition color mixture at $\Delta y'=0.5$.

Figure 39:
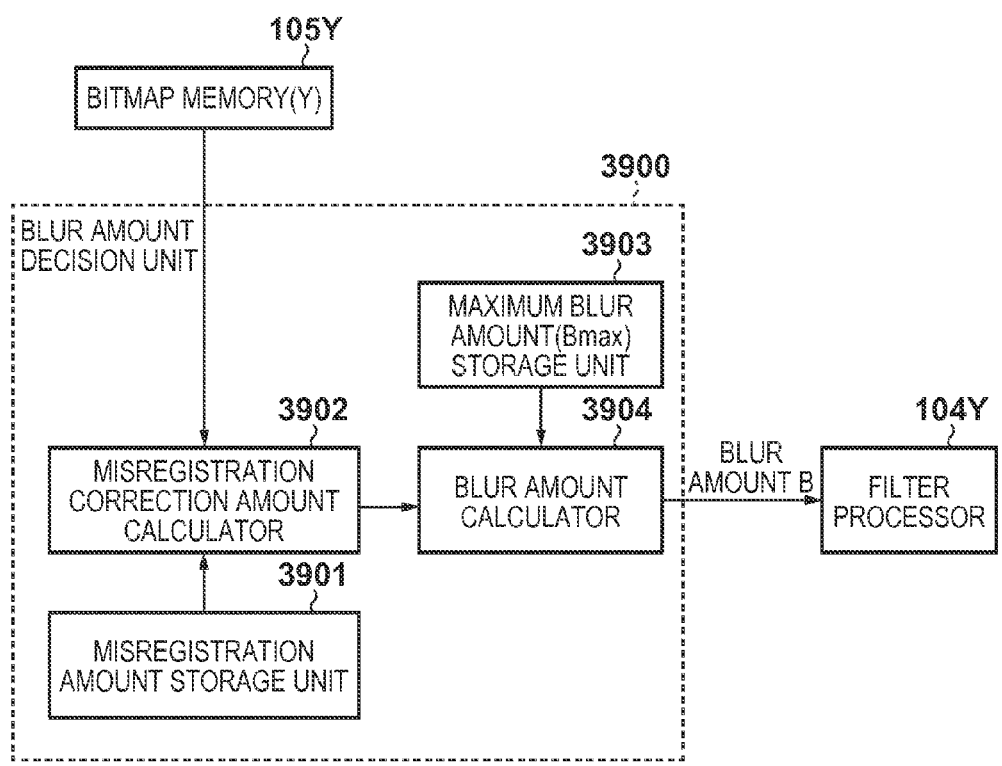
FIG. 39 is a block diagram showing the arrangement of a blur amount decision unit 3900 according to the second embodiment of the present invention.

An operation of a blur amount decision unit 3900 which decides a blur amount B used in the filter processors 104Y, 104M, 104C, and 104K in this embodiment will be described below with reference to FIG. 39. The blur amount decision unit 3900 is arranged in the image adjustment unit 402. Note that FIG. 39 illustrates only the blur amount decision unit 3900 corresponding to Y color. However, similar blur amount decision units 3900 are arranged for M, C, and K colors. Differences from the first embodiment will be mainly described below.

The blur amount decision unit 3900 includes a misregistration amount storage unit 3901, misregistration correction amount calculator 3902, maximum blur amount (Bmax) storage unit 3903, and blur amount calculator 3904. The misregistration amount storage unit 3901 and misregistration correction amount calculator 3902 execute the same processes as those of the misregistration amount storage unit 1801 and misregistration correction amount calculator 1802 included in the misregistration correction unit 403Y of the first embodiment. That is, the misregistration correction amount calculator 3902 calculates a misregistration correction amount $\Delta y$ at coordinates (x, y) corresponding to a target pixel. The maximum blur amount (Bmax) storage unit 3903 stores blur amounts Bmax (FIG. 37) for respective colors. As shown in FIG. 37, the maximum blur amount Bmax is set to assume a value smaller than a blur amount (FIG. 17) used in the first embodiment.

The blur amount calculator 3904 decides a blur amount B used in the filter processor 104Y based on the maximum blur amount Bmax obtained from the maximum blur amount storage unit 3903 and the misregistration correction value $\Delta y$ obtained from the misregistration correction amount calculator 3902. The blur amount calculator 3904 provides the decided blur amount B to the filter processor 104Y. More specifically, the blur amount calculator 3904 calculates a value $\Delta y'$ by extracting a value before the decimal point of the misregistration correction value $\Delta y$, and executes linear interpolation based on the maximum blur amount Bmax, as shown in FIG. 36, thereby deciding a blur amount B of Y color at coordinates (x, y).

Note that adjustment of the blur amount B according to $\Delta y'$ can use arbitrary interpolation methods such as bicubic interpolation and spline interpolation in addition to the aforementioned linear interpolation. Also, the maximum blur amount Bmax is not limited to the value shown in FIG. 37, and can be set according to the characteristics of an input image. Also, the misregistration amount storage unit 3901 and misregistration correction amount calculator 3902 need not be arranged in the blur amount decision unit 3900. In this case, the value $\Delta y$ calculated by the misregistration correction amount calculator 1802 in the misregistration correction unit 403Y may be provided to the image adjustment unit 402, and the blur amount calculator 3904 may decide the blur amount B using the value $\Delta y$ provided from the misregistration correction unit 403Y. In this manner, the misregistration correction unit 403Y and image adjustment unit 402 can be avoided from redundantly executing the same calculations, thus reducing calculation cost.

An effect of adjustment of the blur amount B according to this embodiment will be described below with reference to FIGS. 38A to 38E. FIGS. 38A to 38E correspond to FIGS. 28A to 28E in the first embodiment, and are different in that blur amounts B are decided according to scanning positions in images 38b-1 and 38b-2 in FIG. 38B. In the images 38b-1 and 38b-2, maximum blur amounts Bmax shown in FIG. 37 are set. Furthermore, blur amounts B are decided by linear interpolation from $\Delta y'$ obtained from the misregistration correction values $\Delta y$, as shown in FIG. 36. The filter processors 104C and 104M apply filter processing using filter coefficients corresponding to the decided blur amounts B to input images. Note that as for the filter coefficients corresponding to the blur amounts B, the filter processors 104Y, 104M, 104C, and 104K may respectively hold filter coefficients corresponding to a plurality of different blur amounts B as in the first embodiment (FIGS. 15A to 15D).

Figure 38A:
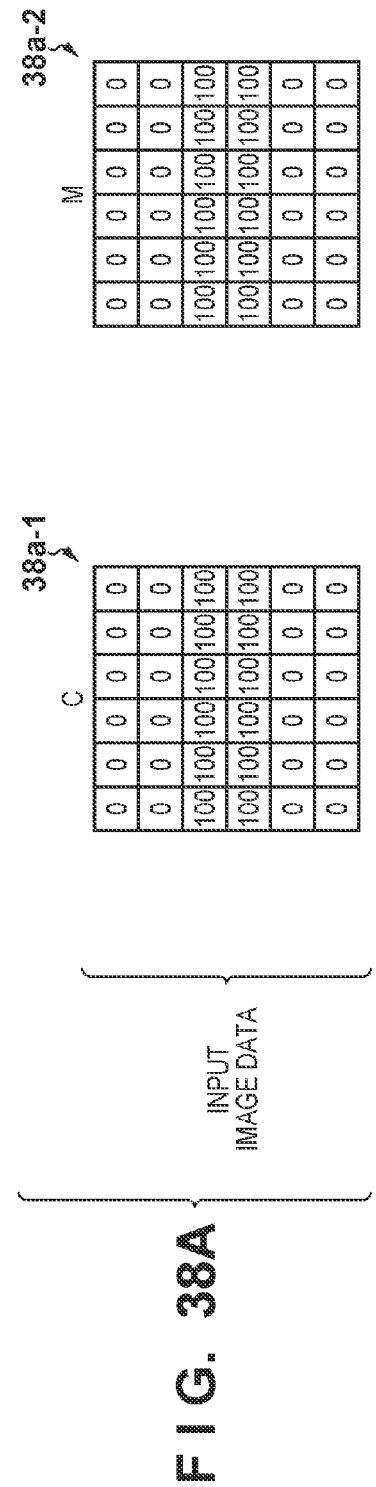
Figure 38B:
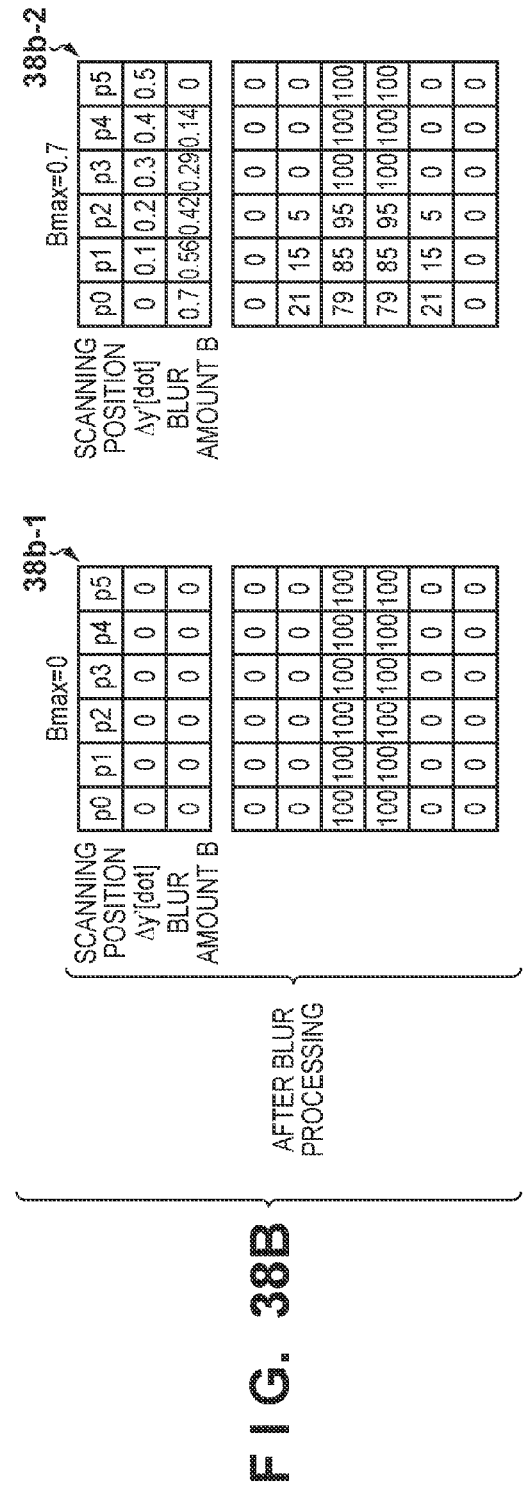

As shown in FIG. 38E, in a color mixture dot formation image formed after the misregistration correction, areas of portions in which M dots are protruded from (do not overlap) C dots are adjusted to nearly equal areas at all scanning positions p0 to p5, compared to FIG. 28E. That is, at all the scanning positions p0 to p5, degrees of juxtaposition color mixture are adjusted to nearly equal values, and color mixture states for respective dots are uniformed. More specifically, at the scanning positions p0 to p5, the degrees of juxtaposition color mixture are adjusted to about 27 to 39% by the blur processing in the first embodiment (FIGS. 28A to 28E), while the degrees of juxtaposition color mixture are nearly uniformed to about 25% in this embodiment (FIGS. 38A to 38E). Therefore, in this embodiment, color unevenness caused by color effect differences for respective dots in an image to be formed can be further eliminated.

Furthermore, in this embodiment, the degrees of juxtaposition color mixture after the misregistration correction are suppressed to low values (up to about 25%) in whole compared to the first embodiment. The degrees of juxtaposition color mixture (25%) are nearly equal to a maximum degree of juxtaposition color mixture (about 25% at the scanning position p5) in an image after the misregistration correction when the blur processing is not executed (FIGS. 29A to 29D). These numerical values are lower than degrees of juxtaposition color mixture (about 27 to 39%) of an image after the misregistration correction in the first embodiment. That is, compared to FIG. 28E of the first embodiment, spreads of dots caused by the blur processing are suppressed in FIG. 38E. In this way, the second embodiment is characterized in that the degrees of juxtaposition color mixture of respective dots after the blur processing are set to be nearly equal values while suppressing spreads of dots by the blur processing as much as possible. In practice, blur amounts B (FIGS. 36 and 37) used in this embodiment are set to assume smaller values than those (FIG. 17) used in the first embodiment.

According to this embodiment, since blur amounts B are decided according to degrees of misregistration (misregistration correction amounts) at respective scanning positions in the main scanning direction, even when relatively small blur amounts B are set compared to the first embodiment, color unevenness can be sufficiently suppressed. In an image after the filter processing (blur processing) required to adjust degrees of juxtaposition color mixture, a variation width of degrees of juxtaposition color mixture is reduced, and image quality of an image after adjustment of the degrees of juxtaposition color mixture can be further improved.

Note that in place of the method using the linear interpolation shown in FIG. 36, a blur amount B may be decided more precisely so that constant degrees of juxtaposition color mixture after the blur processing are set based on a change in degree of juxtaposition color mixture shown in FIG. 35E. Thus, color unevenness which may occur in an image to be formed can be further suppressed, and image quality can be further improved.

[Third Embodiment]

The third embodiment of the present invention will be described below. This embodiment is characterized in that a blur amount B is decided according to a type of fine pattern included in an image which is to undergo misregistration correction processing. In the following description, differences from the first and second embodiments will be mainly described for the sake of simplicity.

In the first and second embodiments, it is determined whether or not a specific pattern (fine pattern) is included in an input image, and blur processing using identical blur amounts B (maximum blur amounts Bmax) irrespective of a type of fine pattern image is executed. However, there are various types of fine patterns like images shown in FIGS. 9A-1 to 9A-6. Also, degrees of appearance of color unevenness based on degrees of juxtaposition color mixture of an image after blur processing vary depending on types of fine patterns. For this reason, in order to adjust degrees of juxtaposition color mixture of an input image more precisely, blur amounts B in the blur processing are set according to a fine pattern, thus further eliminating color unevenness in an image to be formed, and further improving image quality.

Hence, in this embodiment, a plurality of different patterns (fine patterns) are detected from input image data, and pixels corresponding to each detected pattern are detected. Furthermore, pixels, which correspond to the detected pattern, and calculated degrees of juxtaposition color mixture of which fall outside a predetermined appropriate range, are identified. As the appropriate range for the degrees of juxtaposition color mixture, different ranges can be set in advance respectively for the plurality of patterns. Furthermore, image processing (blur processing) required to adjust juxtaposition color mixture states of the specified pixels to fall within the appropriate range corresponding to the detected pattern is applied to input image data. In this case, as blur amounts B in the blur processing, those corresponding to the detected pattern are used. More specifically, pattern detectors 103Y, 103M, 103C, and 103K specify types of fine patterns included in input image data, and filter processors 104Y, 104M, 104C, and 104K decide blur amounts B in the blur processing according to the specified patterns. In this embodiment, the pattern detectors 103Y, 103M, 103C, and 103K detect two-dimensional patterns using a one-dimensional window filter in the main scanning direction (X direction) in addition to that in the sub-scanning direction (Y direction).

Figure 40:
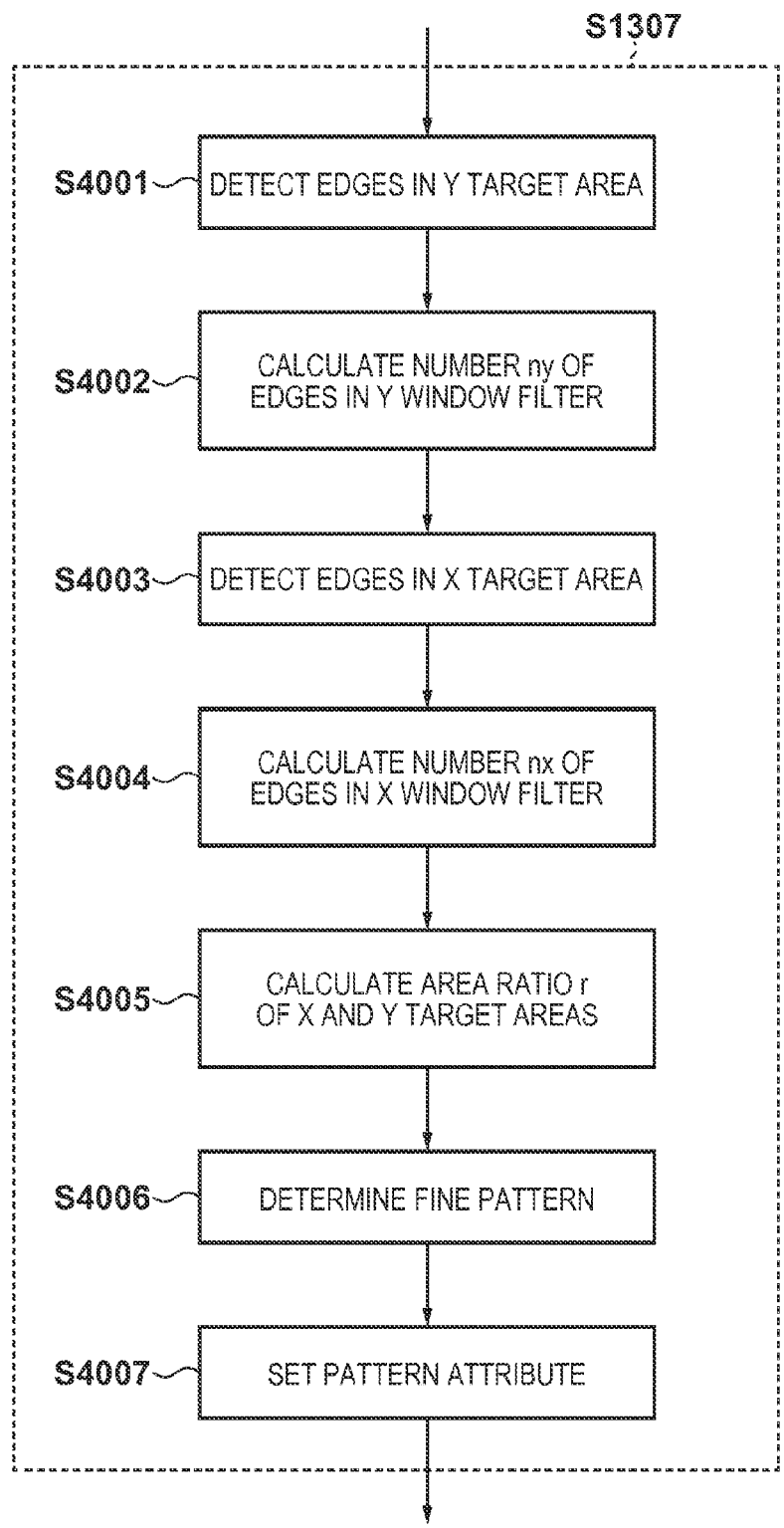
FIG. 40 is a flowchart showing the sequence of specific pattern detection processing (step S1307) executed by pattern detectors 103Y, 103M, 103C, and 103K according to the third embodiment of the present invention.

The operation (step S1307) of the pattern detector 103Y according to this embodiment will be described below with reference to FIG. 40. Note that since the operations of the pattern detectors 103M, 103C, and 103K are the same as that of the pattern detector 103Y, a description thereof will not be repeated. In this embodiment, the pattern detector 103Y operates according to the flowchart shown in FIG. 40 in place of that shown in FIG. 12.

Steps S4001 and S4002 are the same as the processes of steps S1201 and S1202. The pattern detector 103Y detects edges of images included in a target area in the Y direction in step S4001, and calculates the number ny of edge portions (the number of edges) of images included in a window filter 1003 (FIG. 10) in the Y direction in step S4002.

Next, the pattern detector 103Y detects edges of images included in a target area in the X direction in step S4003, and calculates the number nx of edge portions (the number of edges) of images included in a window filter 4103 (FIG. 41) in the X direction in step S4004. In this case, FIG. 41 shows detection processing of a specific pattern in the main scanning direction (X direction) in correspondence with that of a specific pattern in the sub-scanning direction (Y direction) shown in FIG. 10. X0 to X4 in FIG. 41 correspond to Y0 to Y4 in FIG. 10. The pattern detector 103Y executes the same processing as that described above using FIG. 10 to a target area 4101 in the X direction shown in FIG. 41. Thus, the pattern detector 103Y calculates the number nx of edges of images included in the window filter 4103 in the X direction.

In step S4005, the pattern detector 103Y calculates an area ratio r from pixel values (tone values) of all pixels included in the target areas 1001 and 4101 in the X and Y directions. Note that the area ratio r is obtained by dividing a tone integral value obtained by integrating tone values of pixels included in the target areas in the X and Y directions by a product of the total number of pixels in the target areas and a maximum value=255 of the tone values, as given by:

$$\text{Area ratio } r = (\text{tone integral value of target areas})/(\text{total number of pixels in target areas} \times 255)$$

For example, in case of the target area 1001 in the Y direction shown in FIG. 10 and the target area 4101 in the X direction shown in FIG. 41, the area ratio r is calculated as:

$$\text{Area ratio } r = (12 \times 255 + 12 \times 255)/(20 \times 2 \times 255) = 60[\%]$$

In step S4005, the pattern detector 103Y determines a specific pattern included in an image corresponding to input image data (that is, whether or not a target pixel is a part of any of specific patterns) based on the calculated numbers ny and nx of edges and area ratio r.

In this embodiment, for example, the pattern detector 103Y uses five patterns corresponding to pattern attribute values=0 to 4 as specific patterns to be detected, as shown in FIG. 42. FIG. 42 shows examples of pattern images corresponding to the pattern attribute values, determination formulas required to detect the respective pattern images, and determination conditions based on the determination formulas. In the determination conditions shown in FIG. 42, "O" means that the determination formula is satisfied (True), "x" means that the determination formula is not satisfied (False), and "–" means that this condition is not related to the determination result based on the determination formula. In this embodiment, as the determination formulas, the number ny of edges in the sub-scanning direction (Y direction)≥5, the number nx of edges in the main scanning direction (X direction)≥5, and the area ratio r≥20%.

The pattern attribute value=0 corresponds to "low-frequency pattern", and when both the numbers ny and nx of edges<5 irrespective of the area ratio r, this pattern is detected. This "low-frequency pattern" does not correspond to a fine pattern.

The pattern attribute value=1 corresponds to a fine pattern of "vertical lines", and when the number ny of edges<5 and the number nx of edges≥5 irrespective of the area ratio r, this pattern is detected.

The pattern attribute value=2 corresponds to a fine pattern of "horizontal lines", and when the number ny of edges≥5 and the number nx of edges<5 irrespective of the area ratio r, this pattern is detected.

The pattern attribute value=3 corresponds to a fine pattern of "oblique lines", and when the area ratio r≥20%, the number ny of edges≥5, and the number nx of edges≥5, this pattern is detected.

The pattern attribute value=4 corresponds to a fine pattern of "high-resolution pattern", and when the area ratio r<20%, the number ny of edges≥5, and the number nx of edges≥5, this pattern is detected.

In step S4006, the pattern detector 103Y determines a specific pattern corresponding to the aforementioned determination conditions using the determination results using the determination formulas shown in FIG. 43 in association with the target pixel. Furthermore, in step S4007, the pattern detector 103Y sets a pattern attribute corresponding to the determined specific pattern as that of the target pixel, and notifies the filter processor 104Y of a pattern attribute value (0 to 4) indicating the set pattern attribute.

Note that the specific pattern detection method is not limited to that described above. For example, frequency characteristics may be analyzed by two-dimensional DFT (FFT) using pixel values included in a two-dimensional target area, and a specific pattern may be determined based on the analysis result. The number of types of patterns to be determined (FIG. 43) is not limited to five unlike in this embodiment, and more types of patterns may be added to those to be determined. In this case, new determination formulas and conditions corresponding to patterns to be determined need only be prepared.

In this embodiment, the filter processor 104Y executes processing according to the pattern attribute value indicating the specific pattern determined by the pattern detector 103Y. The filter processor 104Y executes the operation (step S1308) according to the flowchart shown in FIG. 14 as in the first and second embodiments. However, in steps S1401 and S1403, the filter processor 104Y executes processing according to the aforementioned pattern attribute value (0 to 4).

The filter processor 104Y determines in step S1401 based on the pattern attribute value notified from the pattern detector 103Y whether or not the target pixel is a part of a specific fine pattern. More specifically, if the pattern attribute value=0, the filter processor 104Y determines that the target pixel is not a part of a fine pattern, and the process advances to step S1405. On the other hand, if the pattern attribute value≥1, the filter processor 104Y determines that the target pixel is a part of a fine pattern, and the process advances to step S1402.

The filter processor 104Y determines in step S1402 based on a degree of juxtaposition color mixture calculated by a juxtaposition color mixture degree calculator 102 whether or not filter processing required to adjust the degree of juxtaposition color mixture is required for the target pixel. The process of step S1402 is the same as that in the first and second embodiments. If the filter processor 104Y determines in step S1402 that the filter processing is required, the process advances to step S1403; otherwise, the process advances to step S1405.

The processes of steps S1405 and S1406 are the same as those in the first embodiment. On the other hand, in step S1403, the filter processor 104Y decides a blur amount B for each color according to the pattern attribute value (1 to 4), and applies filter processing using filter coefficients corresponding to the decided blur amount B to the target pixel as in the first embodiment. In this case, the filter processor 104Y decides a blur amount B, which corresponds to the pattern attribute value (1 to 4) and is set in advance for each color, as a blur amount B used for the target pixel, as shown in FIG. 43. Note that the reason why the blur amount B is independently set for each color is the same as in the first embodiment.

(Case of Pattern Attribute Value=1)

In the fine pattern (vertical lines) of the pattern attribute value=1, unlike other fine patterns of the pattern attribute values=2 to 4, since dot shape changes due to misregistration correction do not take place, color unevenness caused by this never occurs. However, due to irregular color misregistration which may occur along the main scanning direction and changes depending on main scanning positions, color unevenness caused by changes in juxtaposition color mixture state may be produced in an image to be formed corresponding to an input image including vertical lines along the sub-scanning direction. This is the same phenomenon as color unevenness caused by irregular color misregistration which may occur along the sub-scanning direction and changes depending on sub-scanning positions (this corresponds to a case in which the horizontal line image shown in FIGS. 5A to 5D is simply rotated through 90° to obtain a vertical line image), as described in the first embodiment.

For this reason, when an input image includes a fine pattern of vertical lines, the degree of juxtaposition color mixture is adjusted by the filter processing (blur processing) so as to prevent color unevenness from being produced in an image to be formed by the aforementioned irregular color misregistration in the main scanning direction even when such color misregistration has occurred. Note that since a degree of irregular color misregistration in the main scanning direction is smaller than the irregular color misregistration in the sub-scanning direction described in the first embodiment, a blur amount B is set to assume a relatively small setting value in this embodiment.

(Case of Pattern Attribute Values=2, 3, and 4)

In the fine patterns of the pattern attribute values=2, 3, and 4, color unevenness tends to be conspicuous in this order. That is, in an order of horizontal line pattern>oblique line pattern>high-resolution pattern, color unevenness caused by changes in degree of juxtaposition color mixture as a result of misregistration correction readily stands out. Note that the reason why color unevenness in the oblique line pattern (pattern attribute value=3) is less conspicuous than the horizontal line pattern (pattern attribute value=2) is as follows. In case of the oblique line pattern, since dot shapes are extended in the lateral direction by the nonlinear effect of the electrophotography system, dots may be extended in the up-and-down direction of a line depending on a tilt of that line. As a result, the juxtaposition color mixture states in an image to be formed are changed to eliminate color unevenness.

The reason why color unevenness is not so conspicuous in the high-resolution pattern (pattern attribute value=4) is that the area ratio r is relatively low. That is, since the area ratio r of the high-resolution pattern is low, a shift (overlapping) area of dots of different dots in an edge portion by the misregistration correction is small. For this reason, since changes in degree of juxtaposition color mixture due to the misregistration correction are relatively small, color unevenness in an image to be formed is not so conspicuous.

As described above, conspicuous degrees of color unevenness which may occur in an image to be formed are different depending on the types of fine patterns included in an input image. Therefore, in this embodiment, an appropriate blur amount B is selected according to the type of fine pattern, as shown in FIG. 43, and filter processing (blur processing) according to the selected blur amount B is applied to an input image. According to this embodiment, color unevenness in an image to be formed can be further eliminated, and image quality can be further improved.

Note that the number of types of fine patterns to be determined and setting values of blur amounts B corresponding to the respective fine patterns are not limited to those shown in FIGS. 42 and 43. For example, as for the fine pattern of the vertical line pattern (pattern attribute value=1), a blur amount B is set to assume a relatively small value. However, when a degree of the aforementioned irregular color misregistration which may occur in the main scanning direction is large, the blur amount B is set to assume a larger value, thus eliminating such color misregistration.

Also, in this embodiment, irrespective of the fine pattern, if 15%<degree of juxtaposition color mixture<85% in step S1402, it is determined that the degree of juxtaposition color mixture falls within the appropriate range as in the first and second embodiments. However, since degrees of appearance of color unevenness caused by degrees of juxtaposition color mixture of an image after the blur processing are different depending on the types of fine patterns, different appropriate ranges of the degree of juxtaposition color mixture may be set for respective fine patterns. Thus, an image, degrees of juxtaposition color mixture of which have changed to those which may cause color unevenness as a result of the misregistration correction processing, can be appropriately determined for each fine pattern included in an input image.

Figure 14:
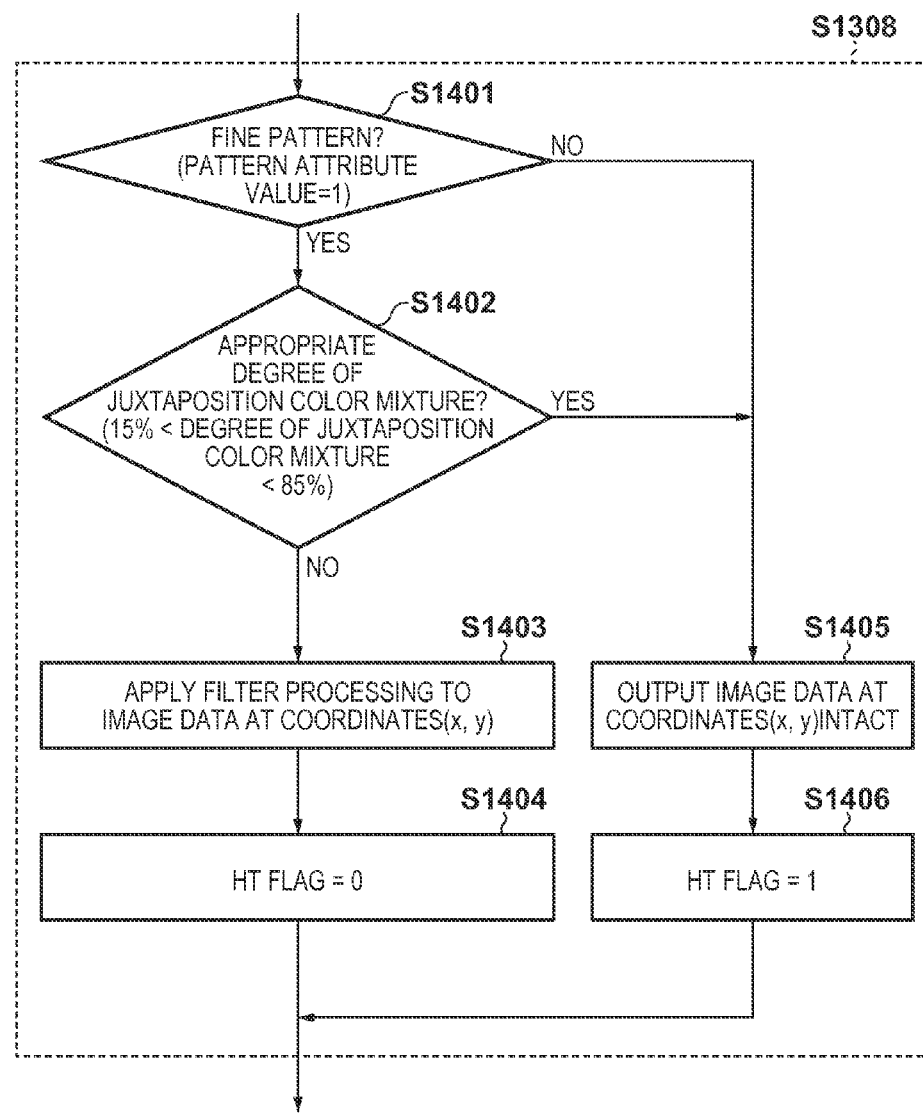
FIG. 14 is a flowchart showing the sequence of filter processing (step S1308) executed by filter processors 104Y, 104M, 104C, and 104K according to the first embodiment of the present invention.
Figure 44:
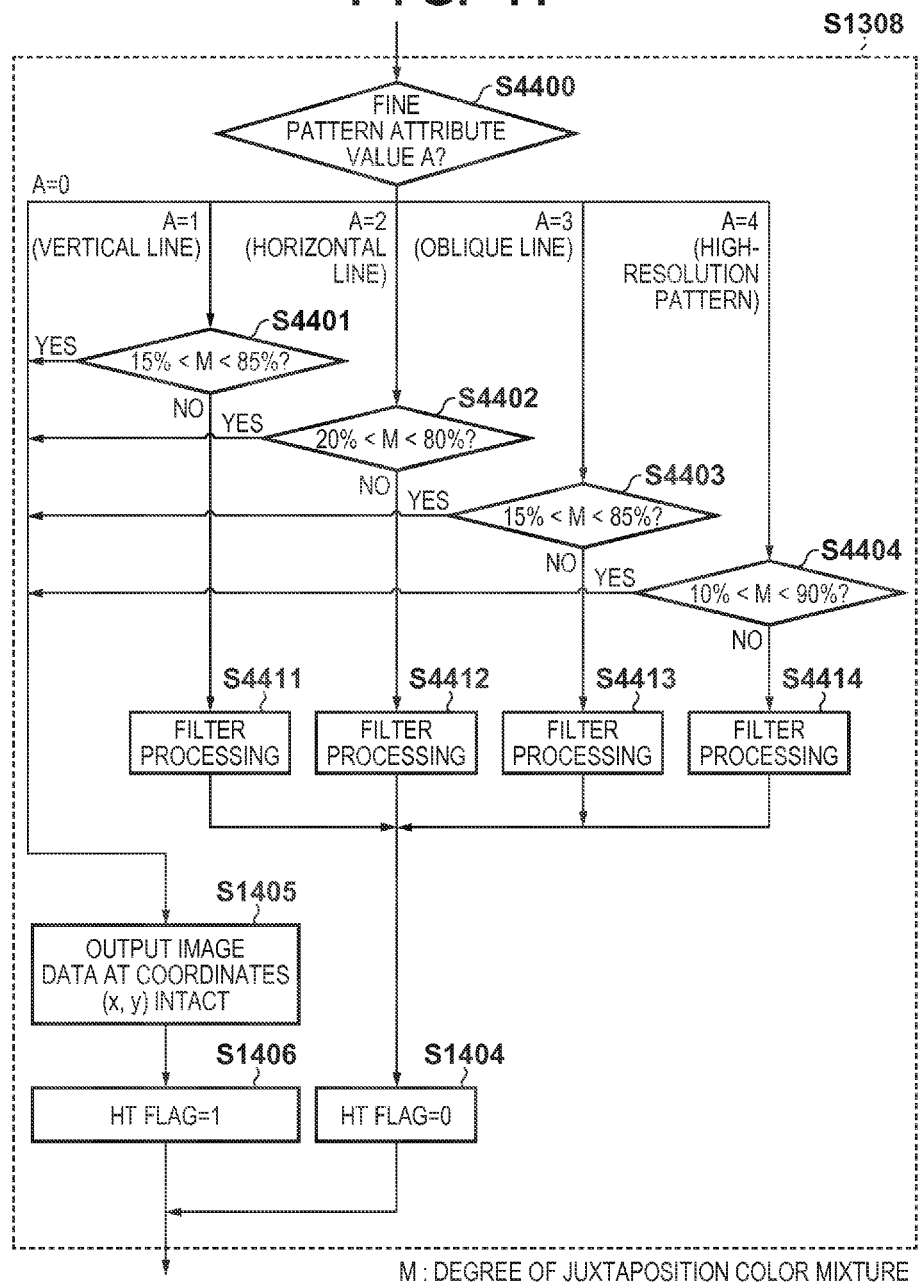
FIG. 44 is a flowchart showing the sequence of the filter processing (step S1308) executed by filter processors 104Y, 104M, 104C, and 104K according to the third embodiment of the present invention.

Such processing can be implemented by executing, for example, the process of step S1308 according to the flowchart shown in FIG. 44 in place of FIG. 14. In FIG. 44, step S4400 corresponds to the determination process in step S1401. In step S4400, the filter processor 104Y confirms a pattern attribute value A. If the pattern attribute value A=0, the filter processor 104Y determines that the target pixel is not a part of a fine pattern, and the process advances to step S1405. If the pattern attribute value A=1 to 4, the filter processor 104Y determines that the target pixel is a part of a fine pattern, and the process advances to a step corresponding the pattern attribute value, that is, according to a fine pattern. More specifically, the filter processor 104Y advances the process to steps S4401, S4402, S4403, and S4404 in correspondence with A=1, 2, 3, and 4, respectively.

In this way, in step S4400, the subsequent processes are switched according to the pattern attribute value A (=0 to 4). As described above, color unevenness caused by changes in degree of juxtaposition color mixture as a result of the misregistration correction is more conspicuous in an order of horizontal line pattern (A=2)>oblique line pattern (A=3) >high-resolution pattern (A=4). For this reason, in FIG. 44, a range in which a degree of juxtaposition color mixture calculated for the target pixel is determined to be appropriate is set to be narrowed down in an order color unevenness is more conspicuous. That is, the appropriate range of degrees of juxtaposition color mixture is set to be a range of 20%<degree of juxtaposition color mixture<80% for the horizontal line pattern (step S4402), that of 15%<degree of juxtaposition color mixture<85% for the oblique line pattern (step S4403), and that of 10%<degree of juxtaposition color mixture<90% for the high-resolution pattern (step S4404).

More specifically, as for the horizontal line pattern, when a degree of juxtaposition color mixture is relatively high or low, color unevenness tends to be conspicuous. For this reason, a narrowest appropriate range of degrees of juxtaposition color mixture of those for the aforementioned four fine patterns is set so as to adjust the degree of juxtaposition color mixture when the degree of juxtaposition color mixture is high or low to some extent (20%<degree of juxtaposition color mixture<80%). On the other hand, as for the high-resolution pattern, color unevenness is not so conspicuous except for a case in which a degree of juxtaposition color mixture is extremely high or low. For this reason, the broadest appropriate range of degrees of juxtaposition color mixture of those of the aforementioned four fine patterns is set so as to adjust the degree of juxtaposition color mixture when the degree of juxtaposition color mixture is extremely high or low (10%<degree of juxtaposition color mixture<90%). Also, as for the vertical line pattern (A=1), color unevenness is less conspicuous than the horizontal line pattern (A=2). For this reason, for the vertical line pattern, the appropriate range of degrees of juxtaposition color mixture is set to be a range of 15%<degree of juxtaposition color mixture<85% which is nearly equal to that of the oblique line pattern (A=3) (step S4401).

If the filter processor 104Y determines in each of steps S4401 to S4404 that the degree of juxtaposition color mixture for the target pixel, which is calculated by the juxtaposition color mixture degree calculator 102, falls within the appropriate range, the process advances to step S1405. On the other hand, if the filter processor 104Y determines that the degree of juxtaposition color mixture falls outside the appropriate range, the process advances to corresponding one of steps S4411 to S4414.

In steps S4411 to S4414, the filter processor 104Y decides a blur amount B for each color in accordance with the pattern attribute value (1 to 4), and applies filter processing using filter coefficients corresponding to the decided blur amount B to the target pixel as in the first embodiment. In this case, the filter processor 104Y decides a blur amount B corresponding to the pattern attribute value (1 to 4) as that used for the target pixel, as shown in FIG. 43.

As described above, according to this embodiment, since a blur amount B in the blur processing is set according to a fine pattern, color unevenness in an image to be formed can be further eliminated, and image quality can be further improved.

[Fourth Embodiment]

The fourth embodiment of the present invention will be described below. The first to third embodiments are characterized in that blur processing based on filter processing is applied to an input image as image processing required to adjust degrees of juxtaposition color mixture. However, adjustment of degrees of juxtaposition color mixture as one characteristic feature of the present invention can also be implemented by other methods. The fourth embodiment is characterized in that by applying coordinate conversion processing to an input image, shapes of edge portions included in the input image are changed to adjust degrees of juxtaposition color mixture. More specifically, data of a pixel, which is specified as an adjustment target of a degree of juxtaposition color mixture for each color, is shifted to another pixel by a shift amount which is set in advance for each color and pixel, thereby adjusting the degree of juxtaposition color mixture.

When the blur processing based on the filter processing is applied to an input image in the first to third embodiments, as described above, dots, degrees of juxtaposition color mixture of which are adjusted, can be formed, as shown in FIG. 28E. When such blur processing is applied to input mage data, dots based on relatively small tone values tend to be generated on pixels to which the blur processing has been applied, compared to a case in which the blur processing is not applied (FIGS. 29A to 29D). Dots, which are actually formed on a printing material based on such small tone values, often exhibit unstable characteristics due to nonlinearity unique to the electrophotography system. That is, dots having sizes smaller than those corresponding to actual tone values may be formed. As a result, such dots often result in image quality deterioration such as density unevenness and deterioration of granularity. Especially, dots often become unstable depending on environmental conditions such as the temperature and humidity. Therefore, if such unstable characteristics of dots can be further improved upon adjustment of degrees of juxtaposition color mixture, image quality of an image to be formed can be further improved.

Hence, in this embodiment, by applying coordinate conversion processing (to be described below) to a pixel as a target of image processing required to adjust a degree of juxtaposition color mixture, a dot can be prevented from being formed based on a relatively small tone value as a result of adjustment of the degree of juxtaposition color mixture. With this processing, image quality of an image to be formed is further improved. Especially, this embodiment will explain a case in which the coordinate conversion processing is applied to a fine pattern of a horizontal line pattern (pattern attribute value A=2) in which color unevenness generated due to changes in degree of juxtaposition color mixture as a result of misregistration correction tends to be conspicuous. More specifically, processing executed by a filter processor 104Y when the process advances from step S4400 to step S4402 in FIG. 44 described in the third embodiment will be described below with reference to FIG. 45.

Figure 45:
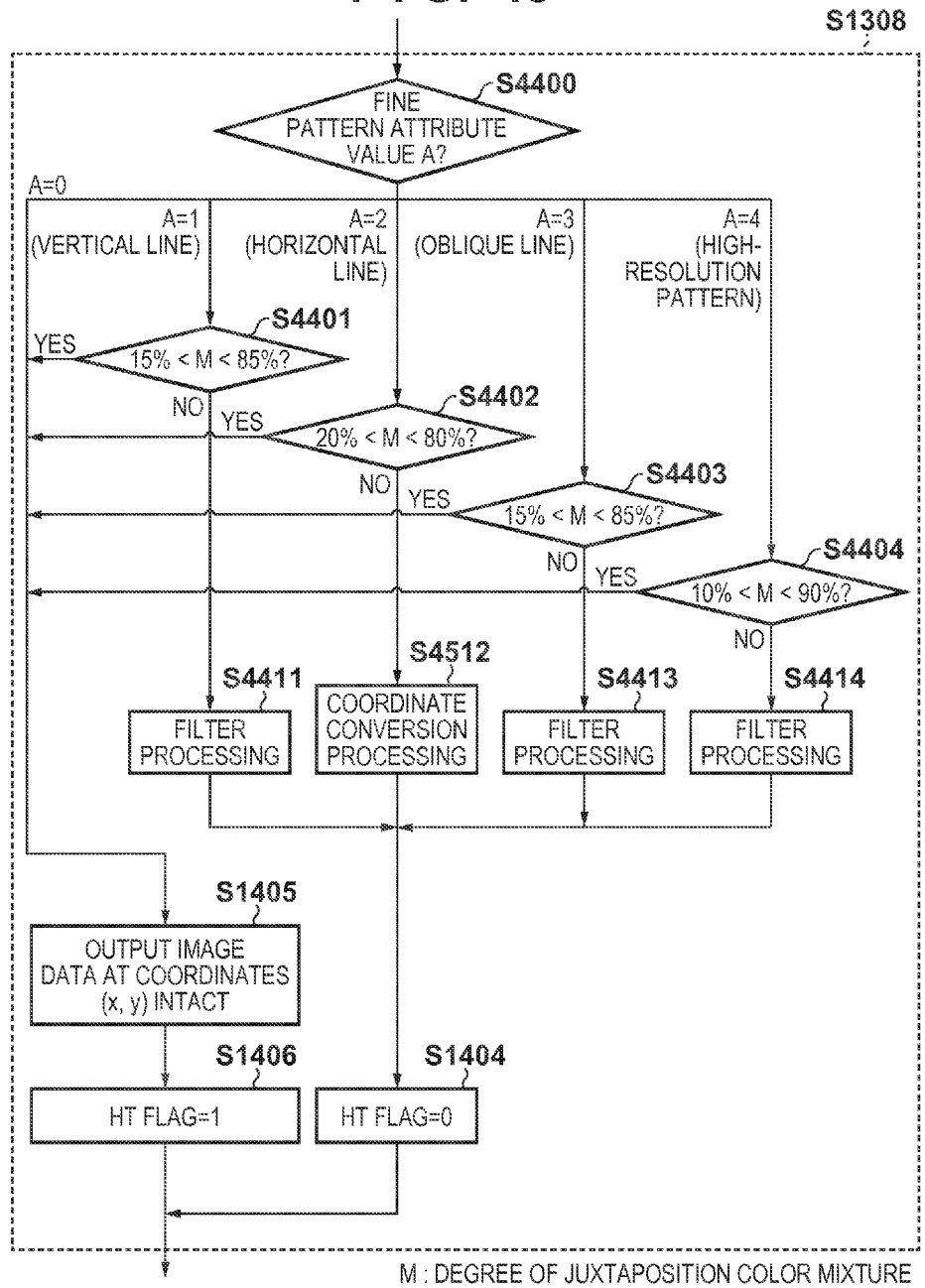
FIG. 45 is a flowchart showing the sequence of the filter processing (step S1308) executed by filter processors 104Y, 104M, 104C, and 104K according to the fourth embodiment of the present invention.

As shown in FIG. 45, this embodiment is characterized in that if the filter processor 104Y determines in step S4402 in the third embodiment that a degree of juxtaposition color mixture falls outside an appropriate range (adjustment of a degree of juxtaposition color mixture is required), it executes processing of step S4512 in place of step S4412. Since other processes executed in an image processing unit 40 are the same as those in the third embodiment, a description thereof will not be repeated.

In step S4512, the filter processor 104Y applies coordinate conversion processing required to adjust a degree of juxtaposition color mixture to a target pixel. The processing in step S4512 will be described in more detail below with reference to FIGS. 46 and 47. Assume that filter processors 104Y, 104M, 104C, and 104K hold in advance data shown in FIG. 47. In this embodiment, based on the data shown in FIG. 47, data of a pixel, which is specified as an adjustment target of a degree of juxtaposition color mixture for each color, is shifted to another pixel by a shift amount, which is set in advance for each color and pixel.

Figures 46, 47:
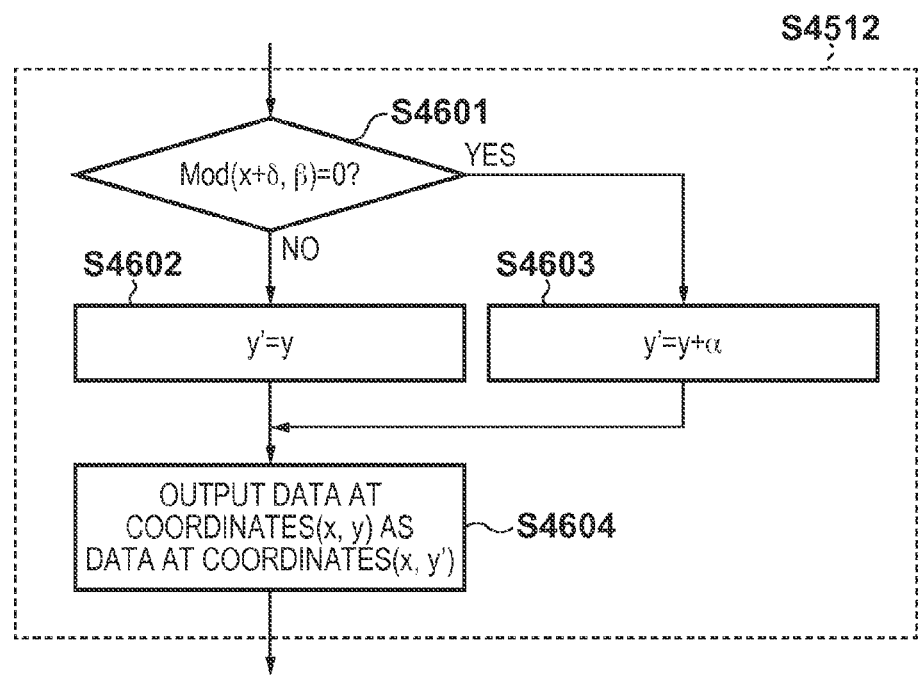
FIG. 46 is a flowchart showing the sequence of coordinate conversion processing (step S4512) according to the fourth embodiment of the present invention.
FIG. 47 is a table showing an example of parameters used in the coordinate conversion processing according to the fourth embodiment of the present invention.

In step S4512, the filter processor 104Y operates according to the flowchart shown in FIG. 46. The filter processor 104Y determines in step S4601 based on coordinates (x, y) of the target pixel and a cycle $\beta$ [dots] and phase $\delta$ [dots] for each color shown in FIG. 47 whether or not to execute coordinate conversion processing of a pixel value of the target pixel. More specifically, the filter processor 104Y determines whether or not a determination formula Mod(x+$\delta$, $\beta$)=0 is True. Note that Mod(x+$\delta$, $\beta$) represents a remainder obtained when (x+$\delta$) is divided by $\beta$.

For example, when an x coordinate of the target pixel is x=120, the filter processor 104Y calculates Mod(121, 6)=1 based on $\beta$=6 and $\delta$=1 corresponding to Y color, and determines that the determination formula is False. Note that when a color number i corresponds to another color, the following determination results are obtained for the same x coordinate. A filter processor 104M calculates Mod(120, 3)=0 based on $\beta$=3 and $\delta$=0 corresponding to M color, and determines that the determination formula is True. A filter processor 104C calculates Mod(120, 1)=0 based on $\beta$=1 and $\delta$=0 corresponding to C color, and determines that the determination formula is True. A filter processor 104K calculates Mod(124, 6)=4 based on $\beta$=6 and $\delta$=4 corresponding to K color, and determines that the determination formula is False.

According to the determination result in step S4601, if the determination result is True, the filter processor 104Y advances the process to step S4602; otherwise, it advances the process to step S4603.

In step S4602, the filter processor 104Y does not convert coordinates of a pixel value at the coordinates (x, y) corresponding to the target pixel, and decides them as coordinates (x, y') to be output. That is, the filter processor 104Y decides the coordinates (x, y') to be output=(x, y). On the other hand, in step S4603, the filter processor 104Y converts, based on a shift amount $\alpha$ (=1) [dot] corresponding to Y color shown in FIG. 47, coordinates (x, y) corresponding to the target pixel to coordinates (x, y+$\alpha$) by shifting a y coordinate by $\alpha$. That is, the filter processor 104Y decides the coordinates (x, y') to be output=(x, y+$\alpha$).

After step S4602 or S4603, the filter processor 104Y outputs data at the image position (x, y) as that at the coordinates (x, y') in step S4604, thus storing output image data in a bitmap memory 105Y. After step S4604, the filter processor 104Y advances the process to step S1404 (FIG. 45).

Figure 48A:
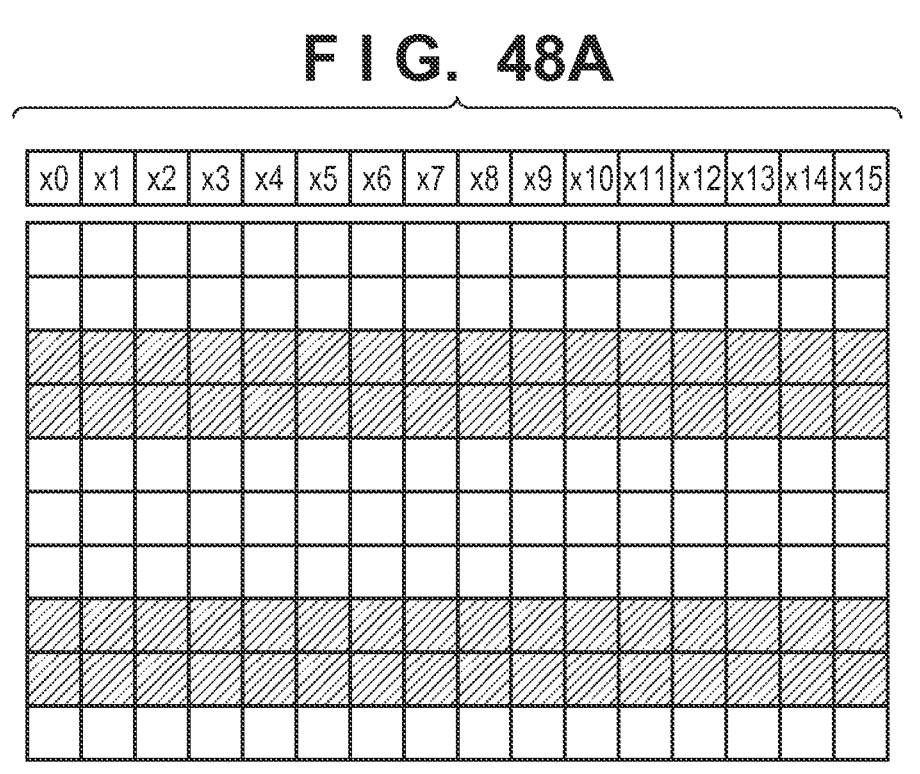
Figure 48C:
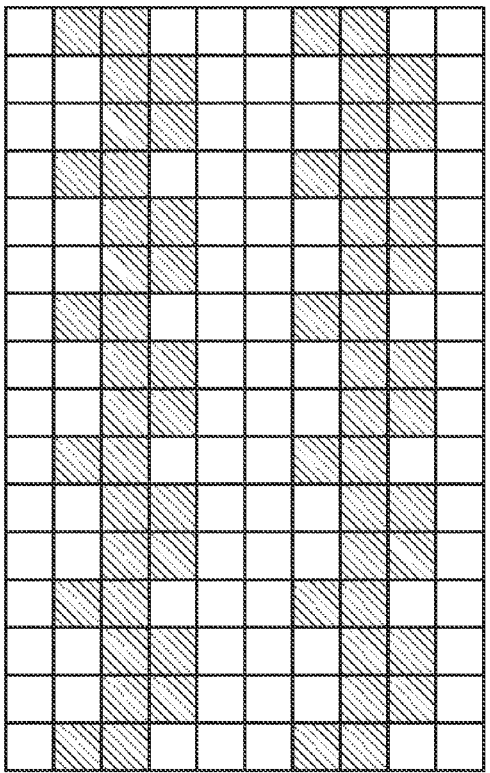
Figure 48B:
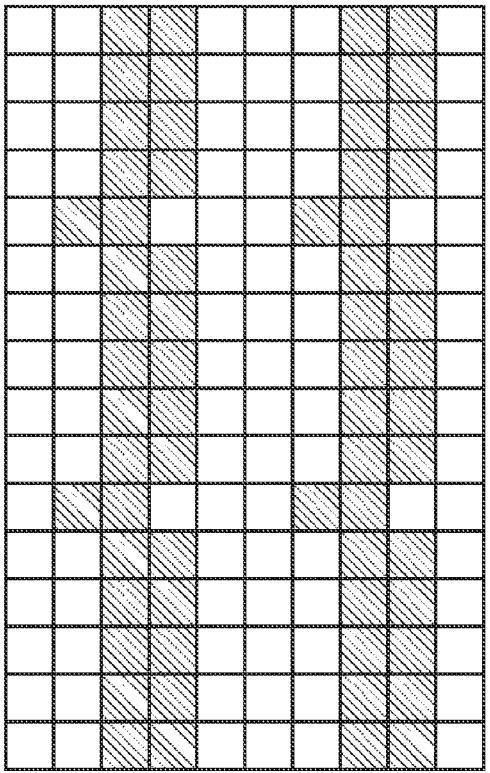
Figure 48E:
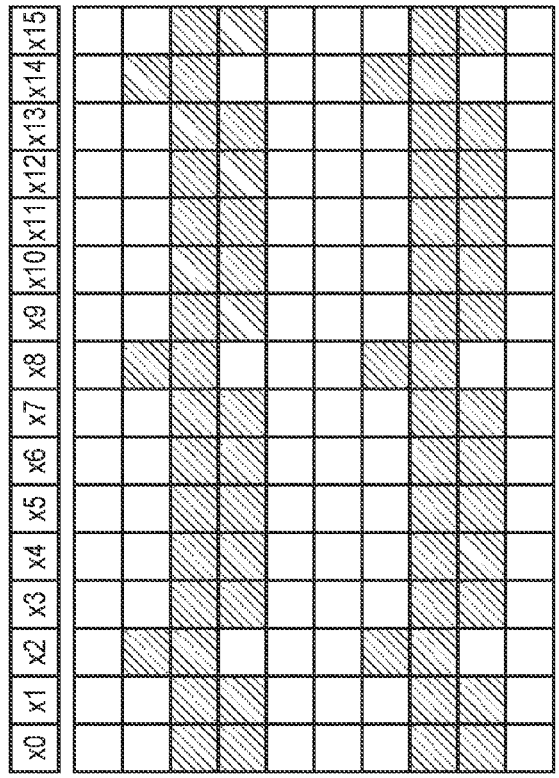

FIGS. 48A to 48E show an image obtained by the coordinate conversion processing in step S4512 described above. FIG. 48A shows a fine pattern image including fine lines each having a 2-dot width as an example of a fine pattern image including a horizontal line pattern. Assume that coordinates x0 to x15 indicate positions along the main scanning direction (X direction), and respectively correspond to values x=120 to 135.

FIGS. 48B to 48E respectively show Y, M, C, and K images obtained by the coordinate conversion processing (step S4512) according to this embodiment. Since a shift amount $\alpha$=0 for the C image shown in FIG. 48D, the images before and after the coordinate conversion processing remain unchanged. In the M image shown in FIG. 48C, dots are shifted by one dot in the sub-scanning direction at 3-dot periods depending on coordinates x. In the Y image shown in FIG. 48B, dots are shifted by one dot in the sub-scanning direction at 6-dot periods depending on coordinates x, but shifted dot positions have a phase difference for one dot with respect to the M image. In the K image shown in FIG. 48E, dots are shifted by one dot in the sub-scanning direction at 6-dot periods depending on coordinates x, but shifted dot positions have a phase opposite to that of the Y image and have a phase difference for one dot with respect to the M image.

In this manner, using the parameters shown in FIG. 47, positions (coordinates x) where dots are shifted by one dot in the sub-scanning direction have different periods or phases between different colors along the main scanning direction. As a result, when images of different colors overlap each other, degrees of overlapping of corresponding dots are changed, and degrees of juxtaposition color mixture in an output image are changed from those of an input image. Also, in this embodiment, in place of the blur processing to be applied to dots of an input image in the first to third embodiments, degrees of juxtaposition color mixture of the input image are changed by shifting dot positions. For this reason, in this embodiment, dot sizes are left unchanged upon adjustment of degrees of juxtaposition color mixture of the input image.

Therefore, according to this embodiment, characteristics of dots to be formed can be avoided from being unstable due to nonlinearity unique to the electrophotography system, and generation of color unevenness due to changes in juxtaposition color mixture state can be avoided as in the aforementioned embodiments. Especially, when dots included in an image are those having a tone value=100%, even after application of the coordinate conversion processing according to this embodiment, the tone value=100% is maintained intact, and the dots are maintained while keeping a stable state. As a result, high quality of an output image can be maintained.

Figure 48D:
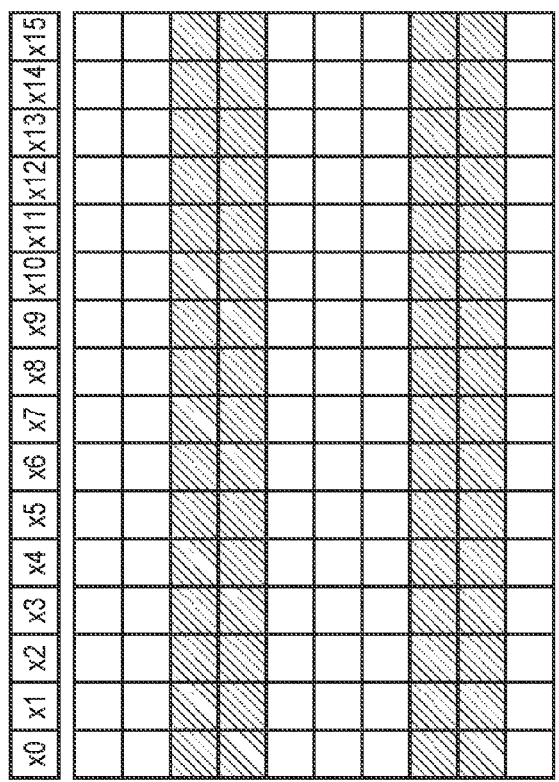

Also, according to this embodiment, degrees of juxtaposition color mixture of an input image can be adjusted by simple processing. For example, in the example shown in FIGS. 48A to 48E, a degree of juxtaposition color mixture between the C image which is shown in FIG. 48D and does not undergo the coordinate conversion and the M image which is shown in FIG. 48C and undergoes the coordinate conversion at the 3-dot periods is about 17%. Also, a degree of juxtaposition color mixture between the C image which is shown in FIG. 48D and the Y image which is shown in FIG. 48D and undergoes the coordinate conversion at the 6-dot periods is about 8%. In this manner, in this embodiment, the degree of juxtaposition color mixture is linearly changed depending on the period β used in the coordinate conversion processing. Therefore, by adjusting the parameters shown in FIG. 47, degrees of juxtaposition color mixture of an input image can be easily adjusted to appropriate degrees of juxtaposition color mixture.

Furthermore, using different values for different colors as the phase δ used in the coordinate conversion processing, degrees of juxtaposition color mixture of an input image can be easily adjusted. Especially, even when the period β and shift amount α are the same for a plurality of colors, degrees of juxtaposition color mixture can be surely adjusted by adjusting the phase δ. For this reason, degrees of juxtaposition color mixture can be adjusted using simpler parameters than adjustment of degrees of juxtaposition color mixture based on blur amounts B in the first to third embodiments.

However, setting of the period β requires the following attentions. For example, when the coordinate conversion processing is executed using different periods β for respective colors, an image after the coordinate conversion have periodicities of the periods β set for respective colors, and an interference occurs between images of different colors, thus deteriorating quality of an output image. In order to cope with this, for example, the periods β of respective colors can be set so that they have an integer multiple relationship. Thus, an interference never occurs at frequencies other than those corresponding to the set periods β.

Even when the aforementioned interference occurs, the interface which occurs in an output image can be obscured by allowing to generate only an interface at high frequency. For example, when periods β of two different colors are set to be different periods (2 dots and 3 dots), an interference pattern at 6-dot periods is generated. However, since the interference pattern at 6-dot periods includes relatively high-frequency interference components and has obscure characteristics, it does not pose a problem in a normal image. Alternatively, by setting the shift amount α to be a relatively small value, the interference pattern can be obscured. In this case, even when an interference pattern includes low-frequency components, an interference pattern intensity is small, and is not so conspicuous.

(Modifications)

Figure 49A:
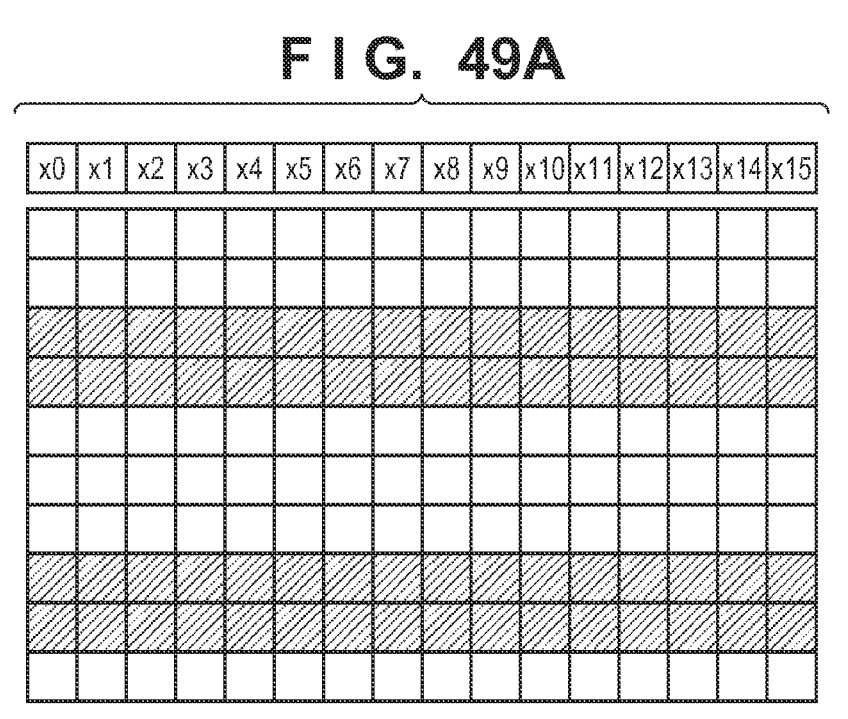
Figure 49C:
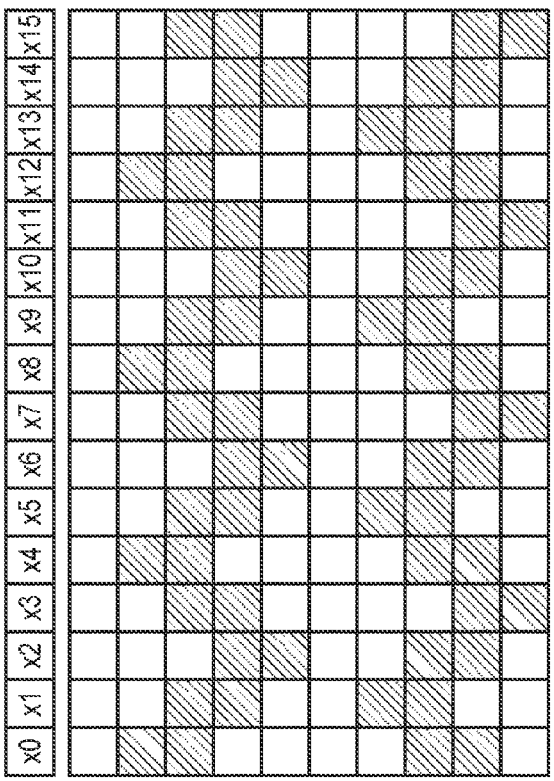

The image processing required to adjust degrees of juxtaposition color mixture according to this embodiment can also be implemented by different methods. As a method of executing image processing required to adjust degrees of juxtaposition color mixture without generating dots having small tone values and unstable characteristics, a method different from the aforementioned method (FIG. 45) will be described below. FIG. 49A shows an example of a fine pattern image including a horizontal line pattern before application of the image processing required to adjust degrees of juxtaposition color mixture to an input image. FIGS. 49B to 49E show images obtained by applying different image processes to the image shown in FIG. 49A.

Figure 49B:
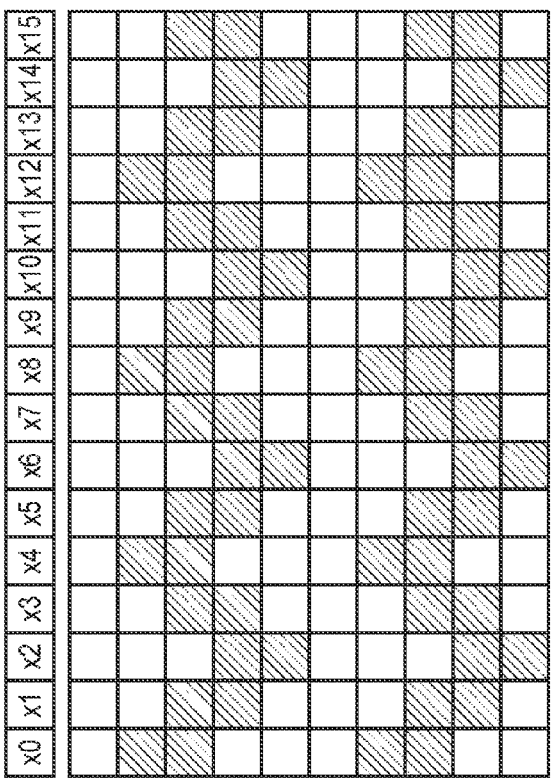

FIG. 49B shows a result obtained by applying, to an input image, coordinate conversion processing using a period β=4 dots in which a dot pattern is changed in a sinusoidal shape. In this coordinate conversion processing, for example, a coordinate after conversion can be calculated like:

$$y'=y+\text{Round}(\alpha \times \sin(2\pi(x+\delta)/\beta))$$

where Round(z) is a function of converting z into an integer. This coordinate conversion processing shifts a dot in two directions along the sub-scanning direction with respect to the target pixel compared to the processing shown in FIGS. 48A to 48E. For this reason, a degree of juxtaposition color mixture can be changed without changing a barycentric position of a line in the sub-scanning direction in an output image.

FIG. 49C shows a result obtained by applying, to an input image, coordinate conversion processing in which, for example, a phase δ is periodically changed depending on a coordinate y in the processing shown in FIG. 49B. This coordinate conversion processing uses, for example, a phase δ which is set using a function given by:

$$\delta(y)=h \times \text{Step}(\sin(2\pi(y+j)/\gamma))$$

where Step(z) is a unit step function which assumes 0 when z<0 and 1 when z≥0, and respective parameters are set as h=1, j=0.1, and γ=10. This coordinate conversion processing corresponds to that which sets a phase of a dot to be shifted in the sub-scanning direction according to a y coordinate in the sub-scanning direction. According to this processing, periodicity in the sub-scanning direction of a dot pattern after the coordinate conversion in a horizontal line pattern can be obscured compared to that shown in FIG. 49B, and a more natural fine pattern can be expressed in an output image (image to be formed).

Figure 49E:
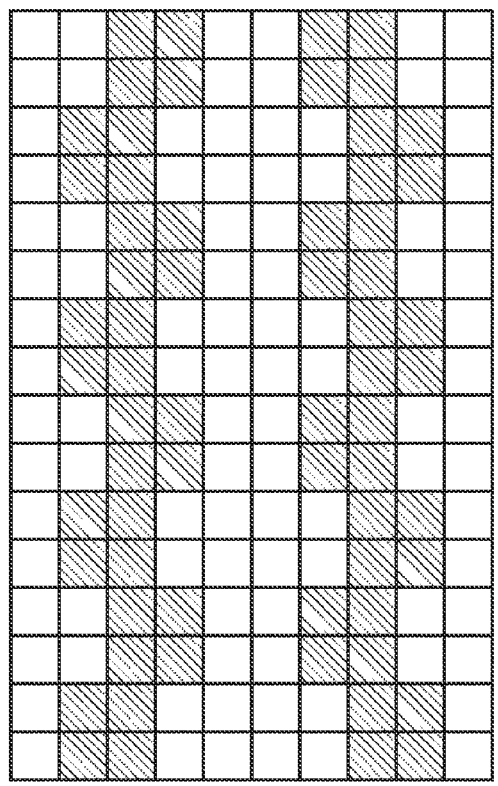
Figure 49D:
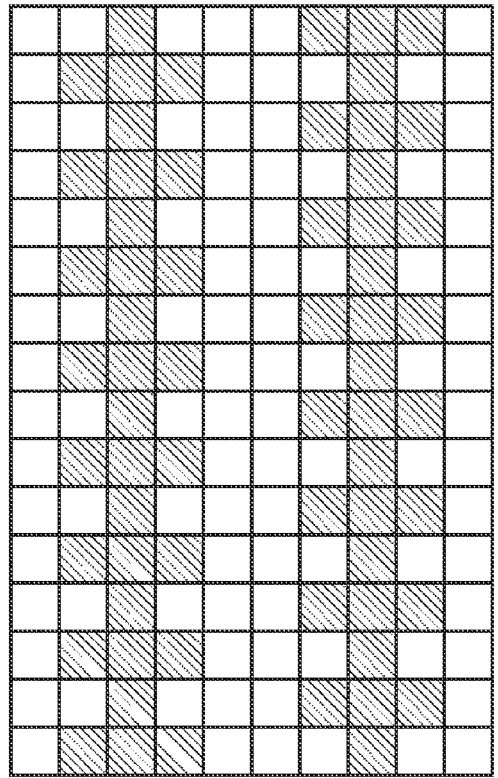

In addition to FIGS. 49B and 49C, coordinate conversion processing for changing a dot pattern included in an input image to a pattern shown in each of FIGS. 49D and 49E may be applied to the input image. FIG. 49D shows a result obtained by applying, to an input image, coordinate conversion processing for changing edge portions at high frequency without changing a barycentric position in the sub-scanning direction of a horizontal line. According to this coordinate conversion processing, since linearity of the horizontal line can be maintained, an image having a small difference from the input image (FIG. 49A) can be obtained. However, when the edge portions are changed at high frequency, as shown in FIG. 49D, dots may become unstable, and the edge portions may be blurred to some extent. By contrast, coordinate conversion processing which changes a dot pattern included in an input image to a pattern shown in FIG. 49E can reduce such blurred edge portions. That is, since a degree of coupling of dots which form a line in the main scanning direction (lateral direction) is stronger than that of the pattern shown in FIG. 49D, dots are formed more stably, thus reducing blurred edge portions.

As described above, according to this embodiment, when a specific fine pattern (horizontal line pattern) is detected from an input image, image processing different from the first to third embodiments is applied to the input image according to degrees of juxtaposition color mixture as that required to adjust degrees of juxtaposition color mixture. More specifically, processing for changing a coordinate of a pixel as a target of the image processing based on the parameters, which are set in advance, is executed. With this processing, a dot having a small size indicating unstable characteristics can be avoided from being formed as a result of adjustment of a degree of juxtaposition color mixture. As a result, image quality of an image to be formed can be further improved compared to the first to third embodiments.

Also, according to this embodiment, a degree of juxtaposition color mixture can be easily adjusted based on settings of simple parameters. Since the aforementioned parameters can be selected according required image quality, image processing cost, and the like, degrees of freedom in unit design required to execute image processing for an input image upon adjustment of degrees of juxtaposition color mixture can be increased.

Note that in this embodiment, the aforementioned coordinate conversion processing is executed only when an input image includes a horizontal line pattern, as shown in FIG. 45. Alternatively, the aforementioned coordinate conversion processing may be applied to other specific fine pattern images. Thus, even when an input image includes a specific fine pattern image other than the horizontal line pattern image, the aforementioned effects can be obtained.

[Other Embodiments]

The processing executed by the image processing unit 40 described in the aforementioned embodiments is not limited to the image forming apparatus 10, but it may be executed by a host computer (host PC) which supplies image data required for image formation to the image forming apparatus 10. In this case, this host PC functions as an image processing apparatus of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087930, filed Apr. 6, 2012, which is hereby incorporated by reference herein in its entirety.

What is claimed is:

1. An image processing apparatus for executing image processing for input image data, which includes a plurality of color component data corresponding to a plurality of colors and is required to form a multi-color image, comprising:

a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors;

a detection unit configured to detect a specific pattern in the input image data, and to detect pixels corresponding to the specific pattern;

a specifying unit configured to specify, in the input image data, a pixel which corresponds to the specific pattern detected by the detection unit, and the parameter calculated by the calculation unit of which does not exhibit a value within a predetermined range; and an execution unit configured to execute, for the input image data, image processing for adjusting the parameter of the pixel specified by the specifying unit to fall within the predetermined range, the image processing being blur processing using a blur amount which is configured to adjust the parameter of the specified pixel to fall within the predetermined range, wherein the detection unit detects a plurality of different specific patterns in the input image data, and detects pixels corresponding to a detected pattern of the plurality of specific patterns, different ranges are set in advance respectively for the plurality of specific patterns as the predetermined range, the specifying unit specifies a pixel which corresponds to the pattern detected by the detection unit of the plurality of specific patterns in the input image data, and the parameter calculated by the calculation unit of which does not exhibit a value within an range corresponding to the detected pattern, and the execution unit executes the blur processing using a blur amount corresponding to the pattern detected by the detection unit of a plurality of different blur amounts.

2. The apparatus according to claim 1, wherein the execution unit executes the blur processing using different blur amounts respectively for the plurality of color component data.

3. The apparatus according to claim 1, further comprising a storage unit configured to store a plurality of maximum values of the blur amount, which respectively correspond to different colors, and correction values, for respective pixels, to be applied to the input image data and required to correct misregistration that occurs in an image to be formed, wherein the execution unit generates, for respective colors, blur amounts according to a correction value to be applied to the specified pixel of the correction values stored in the storage unit so as to have the plurality of maximum values as upper limits, and executes the blur processing using the generated blur amounts respectively for the plurality of color component data.

4. The apparatus according to claim 1, wherein the blur processing is executed as filter processing using a Gaussian filter for the specified pixel and neighboring pixels of the specified pixel, and the blur amount corresponds to a standard deviation of a plurality of filter coefficients of the Gaussian filter.

5. The apparatus according to claim 1, wherein density correction and halftone processing are applied to the pixel which is specified by the specifying unit that the parameter exhibits a value within the predetermined range.

6. The apparatus according to claim 1, wherein the image processing is processing for shifting, for each of the plurality of colors, data of the specified pixel to another pixel by shift amounts which are set in advance for respective colors and pixels.

7. The apparatus according to claim 6, wherein the image processing is processing for shifting data of the specified pixel to a neighboring pixel.

8. The apparatus according to claim 6, wherein the image processing is processing for shifting data of the specified pixel to be pixel data having a periodicity.

9. The apparatus according to claim 8, wherein the image processing is processing for shifting data of the specified pixel to be pixel data having a periodicity in correspondence with periodicities for respective colors.

10. The apparatus according to claim 1, wherein the calculation unit calculates, using color component data corresponding to specific two colors of the plurality of color component data included in the input image data, the parameter indicating a color mixture state between the specific two colors for each pixel.

11. The apparatus according to claim 10, wherein the calculation unit comprises:
a unit configured to calculate an integral value by integrating pixel values of a plurality of pixels within a predetermined range, which is defined for a target pixel and includes the target pixel, for each of the plurality of color component data;
a unit configured to decide top two colors corresponding to the large integral values of the plurality of colors as the specific two colors, in association with the target pixel; and
a unit configured to calculate the parameter indicating the color mixture state between the specific two colors using color component data corresponding to the specific two colors in association with the target pixel.

12. The apparatus according to claim 10, wherein the calculation unit comprises:
a unit configured to calculate a first integral value by integrating pixel values of a plurality of pixels within a predetermined range, which is defined for a target pixel and includes the target pixel, for each of the plurality of color component data;
a unit configured to decide top two colors corresponding to the large first integral values of the plurality of colors as the specific two colors in association with the target pixel;
a unit configured to calculate respective differences between pixel values of color component data corresponding to the specific two colors for respective pixels within the predetermined range defined for the target pixel and to calculate a second integral value by integrating absolute values of the differences; and
a unit configured to calculate the parameter indicating the color mixture state between the specific two colors by dividing the second integral value by a sum of the first integral values corresponding to the specific two colors in association with the target pixel.

13. The apparatus according to claim 1, further comprising:
a holding unit configured to hold correction values for respective pixels in a main scanning direction of a scanning line, the correction values being required to correct a misregistration of an image to be formed caused when the scanning line of a light beam used to scan a surface of a photosensitive member is deviated from an ideal position on the surface of the photosensitive member;
a first correction unit configured to correct the misregistration generated in an image to be formed based on the input image data by a correction amount for a one-pixel unit by shifting, in accordance with the correction value held in the holding unit, a corresponding pixel in the input image data by the one-pixel unit in a sub-scanning direction of the scanning line; and
a second correction unit configured to correct the misregistration generated in the image to be formed based on the input image data by a correction amount less than one pixel by adjusting, in accordance with the correction values held in the holding unit, a pixel value of a corresponding pixel in the input image data and pixel values of pixels which neighbor the corresponding pixel in the sub-scanning direction.

14. An image forming apparatus comprising:
a photosensitive member;
an image processing apparatus configured to execute image processing for input image data, which includes a plurality of color component data corresponding to a plurality of colors and is required to form a multi-color image;
an exposure unit configured to expose a surface of the photosensitive member by scanning the surface of the photosensitive member with a light beam based on the input image data which has undergone the image processing by the image processing apparatus; and
a developing unit configured to develop an electrostatic latent image formed on the surface of the photosensitive member by exposure of the exposure unit and to form an image to be transferred onto a printing material on the surface of the photosensitive member,
wherein the image processing apparatus comprises:
a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors;
a detection unit configured to detect a specific pattern in the input image data, and to detect pixels corresponding to the specific pattern;
a specifying unit configured to specify, in the input image data, a pixel which corresponds to the specific pattern detected by the detection unit, and the parameter calculated by the calculation unit of which does not exhibit a value within a predetermined range; and
an execution unit configured to execute, for the input image data, image processing for adjusting the parameter of the pixel specified by the specifying unit to fall within the predetermined range,
the image processing being blur processing using a blur amount which is configured to adjust the parameter of the specified pixel to fall within the predetermined range,
wherein the detection unit detects a plurality of different specific patterns in the input image data, and detects pixels corresponding to a detected pattern of the plurality of specific patterns,
different ranges are set in advance respectively for the plurality of specific patterns as the predetermined range, the specifying unit specifies a pixel which corresponds to the pattern detected by the detection unit of the plurality of specific patterns in the input image data, and the parameter calculated by the calculation unit of which does not exhibit a value within an range corresponding to the detected pattern, and the execution unit executes the blur processing using a blur amount corresponding to the pattern detected by the detection unit of a plurality of different blur amounts.

15. A control method of an image processing apparatus for executing image processing for image data, which includes a plurality of color component data corresponding to a plurality of colors and is required to form a multi-color image, comprising:

a step of calculating a parameter, which represents a color mixture state when dots of respective colors formed using pixel values of the respective colors included in the input image data are superposed on each other, and which is changed according to a degree of overlapping of the dots of the respective colors, for each pixel in the input image data;

a step of detecting a specific pattern in the input image data, and to detect pixels corresponding to the specific pattern;

a step of specifying a pixel, which corresponds to the specific pattern detected in the step of detecting, and the parameter calculated in the step of calculating of which does not exhibit a value within a predetermined range; and a step of executing, for the input image data, image processing required to adjust the parameter of the pixel specified in the step of specifying to fall within the predetermined appropriate range, the image processing being blur processing using a blur amount which is configured to adjust the parameter of the specified pixel to fall within the predetermined range, wherein the detecting step detects a plurality of different specific patterns in the input image data, and detects pixels corresponding to a detected pattern of the plurality of specific patterns, different ranges are set in advance respectively for the plurality of specific patterns as the predetermined range, the specifying step specifies a pixel which corresponds to the pattern detected by the detection unit of the plurality of specific patterns in the input image data, and the parameter calculated in the calculation step of which does not exhibit a value within an range corresponding to the detected pattern, and the executing step executes the blur processing using a blur amount corresponding to the pattern detected in the detecting step of a plurality of different blur amounts.

16. A non-transitory computer-readable storage medium storing a program for causing a computer to function as each unit of an image processing apparatus according to claim 1.

17. An image processing apparatus for executing image processing for input image data, which includes a plurality of color component data corresponding to a plurality of colors and is required to form a multi-color image, comprising:

a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors;

a detection unit configured to detect a specific pattern in the input image data, and to detect pixels corresponding to the specific pattern;

a specifying unit configured to specify, in the input image data, a pixel which corresponds to the specific pattern detected by the detection unit, and the parameter calculated by the calculation unit of which does not exhibit a value within a predetermined range; and an execution unit configured to execute, for the input image data, image processing for adjusting the parameter of the pixel specified by the specifying unit to fall within the predetermined range, wherein the calculation unit calculates, using color component data corresponding to specific two colors of the plurality of color component data included in the input image data, the parameter indicating a color mixture state between the specific two colors for each pixel, and wherein the calculation unit comprises:

a unit configured to calculate an integral value by integrating pixel values of a plurality of pixels within a predetermined range, which is defined for a target pixel and includes the target pixel, for each of the plurality of color component data;

a unit configured to decide top two colors corresponding to the large integral values of the plurality of colors as the specific two colors, in association with the target pixel; and a unit configured to calculate the parameter indicating the color mixture state between the specific two colors using color component data corresponding to the specific two colors in association with the target pixel.

18. An image processing apparatus for executing image processing for input image data, which includes a plurality of color component data corresponding to a plurality of colors and is required to form a multi-color image, comprising:

a calculation unit configured to calculate, for each pixel in the input image data, a parameter which represents a color mixture state when dots of respective colors formed using pixel values of the respective colors included in the input image data are superposed on each other, and which is changed according to a degree of overlapping of the dots of the respective colors;

a detection unit configured to detect a specific pattern in the input image data, and to detect pixels corresponding to the specific pattern;

a specifying unit configured to specify, in the input image data, a pixel which corresponds to the specific pattern detected by the detection unit, and the parameter calculated by the calculation unit of which does not exhibit a value within a predetermined range;

an execution unit configured to execute, for the input image data, image processing for adjusting the parameter of the pixel specified by the specifying unit to fall within the predetermined range;

a holding unit configured to hold correction values for respective pixels in a main scanning direction of a scanning line, the correction values being required to correct a misregistration of an image to be formed caused when the scanning line of a light beam used to scan a surface of a photosensitive member is deviated from an ideal position on the surface of the photosensitive member;

a first correction unit configured to correct the misregistration generated in an image to be formed based on the input image data by a correction amount for a one-pixel unit by shifting, in accordance with the correction value held in the holding unit, a corresponding pixel in the input image data by the one-pixel unit in a sub-scanning direction of the scanning line; and a second correction unit configured to correct the misregistration generated in the image to be formed based on the input image data by a correction amount less than one pixel by adjusting, in accordance with the correction values held in the holding unit, a pixel value of a corresponding pixel in the input image data and pixel values of pixels which neighbor the corresponding pixel in the sub-scanning direction.

* * * * *